United States Patent
Olsen et al.

(10) Patent No.: US 8,490,916 B2
(45) Date of Patent: Jul. 23, 2013

(54) SUSPENSION SYSTEM FOR AIRCRAFT AUXILIARY POWER UNIT WITH ELASTOMERIC MEMBER

(75) Inventors: Kirk W. Olsen, Erie, PA (US); Frank J. Krakowski, Erie, PA (US)

(73) Assignee: Lord Corporation, Cary, NC (US)

( * ) Notice: Subject to any disclaimer, the term of this patent is extended or adjusted under 35 U.S.C. 154(b) by 1126 days.

(21) Appl. No.: 12/288,434

(22) Filed: Oct. 20, 2008

(65) Prior Publication Data
US 2010/0038471 A1 Feb. 18, 2010

Related U.S. Application Data

(60) Provisional application No. 60/981,460, filed on Oct. 19, 2007.

(51) Int. Cl.
*B64D 27/00* (2006.01)
*F02C 7/20* (2006.01)

(52) U.S. Cl.
USPC ............... 244/54; 244/58; 248/557; 60/797

(58) Field of Classification Search
USPC ......... 244/54, 58; 248/554–557; 60/796–797; 522/158, 156; 524/565; 525/64, 66, 68, 329.1, 525/329.2, 329.3
See application file for complete search history.

(56) References Cited

U.S. PATENT DOCUMENTS

| | | | |
|---|---|---|---|
| 1,901,860 A | 3/1933 | Austin | |
| 2,684,819 A | 7/1954 | Leggett et al. | |
| 2,720,370 A * | 10/1955 | Hasbrouck | 248/556 |
| 3,073,557 A | 1/1963 | Davis | |
| 3,727,862 A | 4/1973 | Kaufhold | |
| 4,050,665 A | 9/1977 | Matthews et al. | |
| 4,514,458 A | 4/1985 | Thorn et al. | |
| 4,571,936 A * | 2/1986 | Nash et al. | 60/797 |
| 4,717,094 A | 1/1988 | Chee | |
| 4,852,848 A | 8/1989 | Kucera | |

(Continued)

FOREIGN PATENT DOCUMENTS

| | | |
|---|---|---|
| AU | 2003238214 A1 | 12/2003 |
| DE | 10225795 A1 | 12/2003 |
| WO | 03042309 A | 5/2003 |
| WO | 2006108028 A | 10/2006 |

OTHER PUBLICATIONS

Troy Chemical Corporation, Polyphase® 641, A Fungicide for use in Aqueous and Solvent Systems such as Oleo-resinous and Latex Paints, Dec. 21, 2005, 2 pages.

(Continued)

*Primary Examiner* — Michael Carone
*Assistant Examiner* — Steven Hawk
(74) *Attorney, Agent, or Firm* — Richard G. Miller

(57) ABSTRACT

The present invention broadly comprises an aircraft motion control auxiliary power unit suspension system device, the aircraft motion control auxiliary power unit suspension system device comprising a first motion control nonelastomeric member and a second motion control nonelastomeric member, a first motion control elastomer member disposed to operatively interconnect the first motion control nonelastomeric member and the second motion control nonelastomeric member. The first motion control elastomer member includes an exterior surface coating formed from an elastomeric polymer dissolved in an organic solvent and the elastomeric polymer dissolved in the solvent is applied to an exterior surface of the first motion control elastomer member, the solvent evaporates, and the elastomeric polymer crosslinks.

16 Claims, 14 Drawing Sheets

U.S. PATENT DOCUMENTS

| | | | |
|---|---|---|---|
| 5,491,892 A | 2/1996 | Fritz et al. | |
| 5,902,050 A | 5/1999 | Balczun et al. | |
| 6,123,350 A | 9/2000 | Suzuki | |
| 6,129,177 A | 10/2000 | Gwinn | |
| 6,328,293 B1 * | 12/2001 | Olsen | 244/54 |
| 6,397,988 B1 | 6/2002 | Ptak | |
| 6,581,874 B2 | 6/2003 | Whiteford et al. | |
| 6,709,758 B2 * | 3/2004 | Halladay et al. | 428/462 |
| 6,777,026 B2 | 8/2004 | Halladay et al. | |
| 6,838,407 B2 | 1/2005 | Halladay et al. | |
| 6,844,412 B2 | 1/2005 | Halladay | |
| 6,918,987 B2 | 7/2005 | Halladay et al. | |
| 7,041,379 B2 | 5/2006 | Halladay et al. | |
| 7,183,354 B2 * | 2/2007 | Halladay et al. | 525/102 |
| 7,220,487 B2 * | 5/2007 | Halladay | 428/421 |
| 7,878,448 B2 * | 2/2011 | Olsen et al. | 244/54 |
| 2002/0084381 A1 | 7/2002 | Lemire | |
| 2002/0147273 A1 * | 10/2002 | Patel et al. | 525/93 |
| 2003/0010866 A1 | 1/2003 | Wilksch | |
| 2003/0104231 A1 * | 6/2003 | Halladay et al. | 428/473.5 |
| 2003/0152790 A1 * | 8/2003 | Halladay et al. | 428/500 |
| 2004/0048082 A1 * | 3/2004 | Halladay et al. | 428/500 |
| 2005/0153138 A1 * | 7/2005 | Halladay | 428/421 |
| 2008/0136071 A1 * | 6/2008 | Weisbeck et al. | 267/136 |

OTHER PUBLICATIONS

Sartomer Company, Inc., "Improving Properties of EPM and EPDM with Coagents", 15 pages, Exton, Pennsylvania, U.S.

Perkinelmer Instruments, W.J. Sichina, "Characterization of EPDM Elastomers Using DSC", 3 pages, 2000, U.S.

U.S. Department of Transportation, Federal Highway Administration, "Comprehensive Design Example for Prestressed Concrete (PSC) Girder Superstructure Bridge." Jul. 28, 2006.

Molded Dimensions, "Design & Application Guide", 2010.

Endine, "Rate Control, Vibration Isolation and Energy Absorption Solutions for Aviation Applications," Feb. 2005.

Lord Corporation, Elastomeric Rod End Bearings: A Solution for Improving Reliability and Maintainability, p. 1-24, 1984.

* cited by examiner

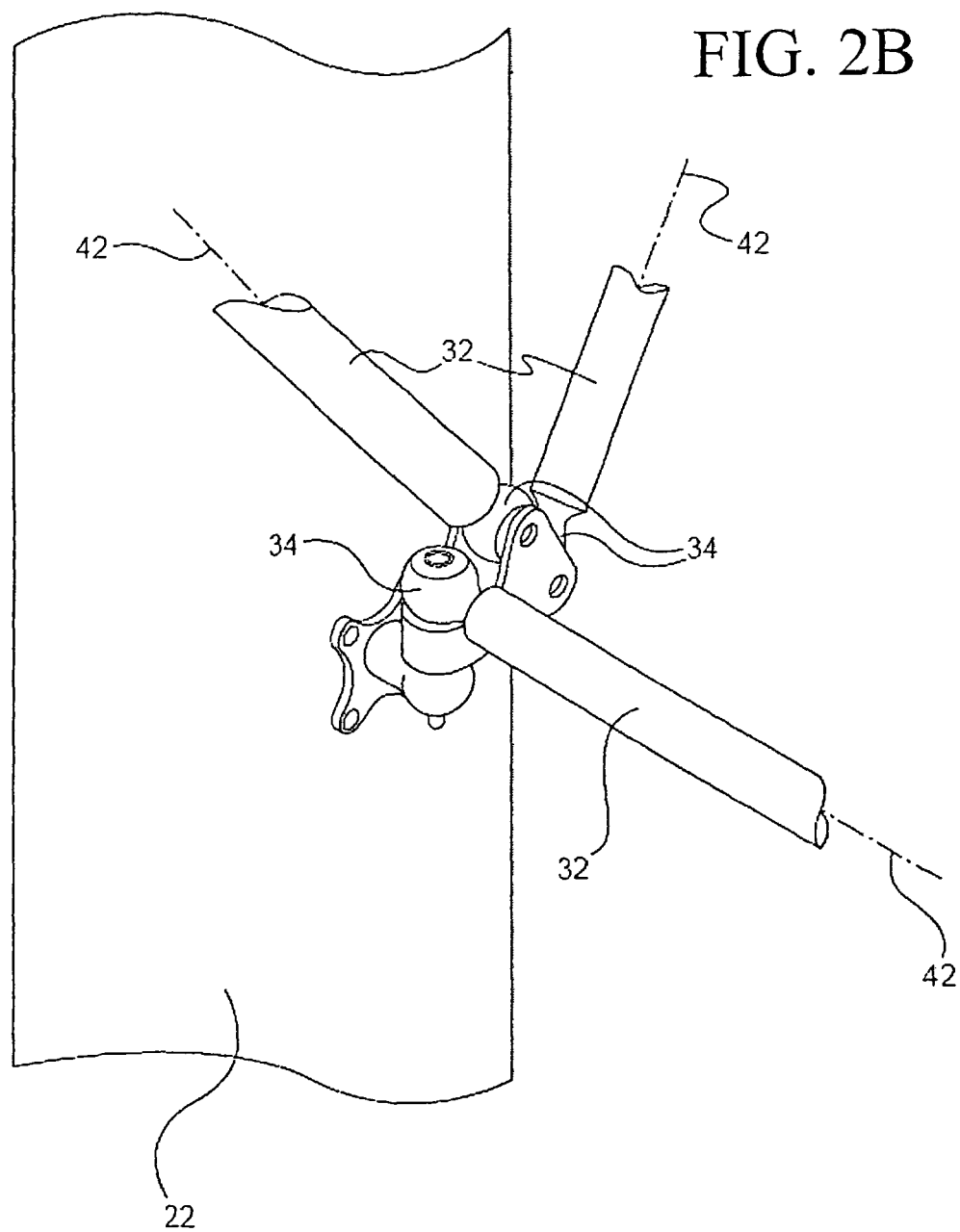

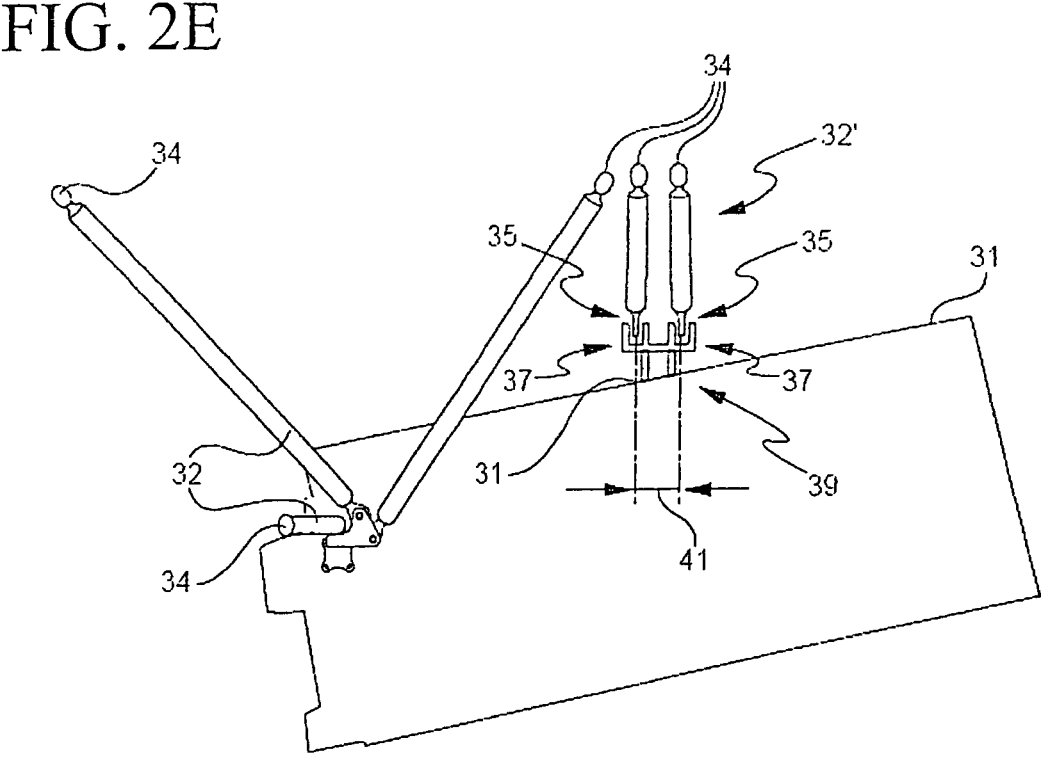

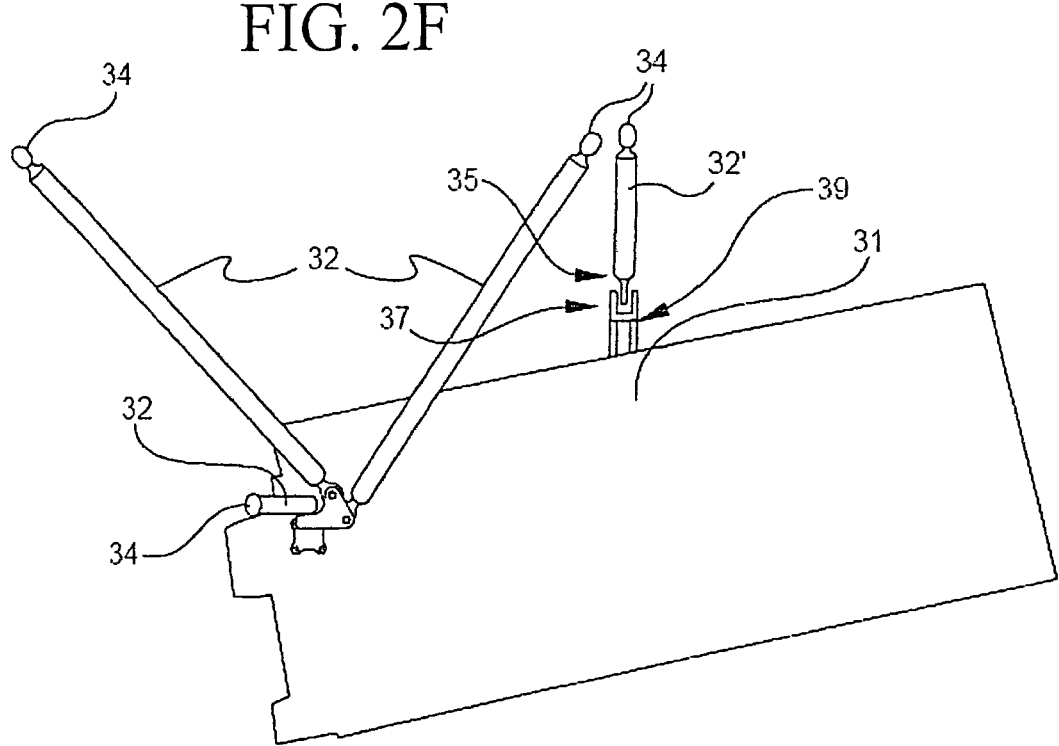

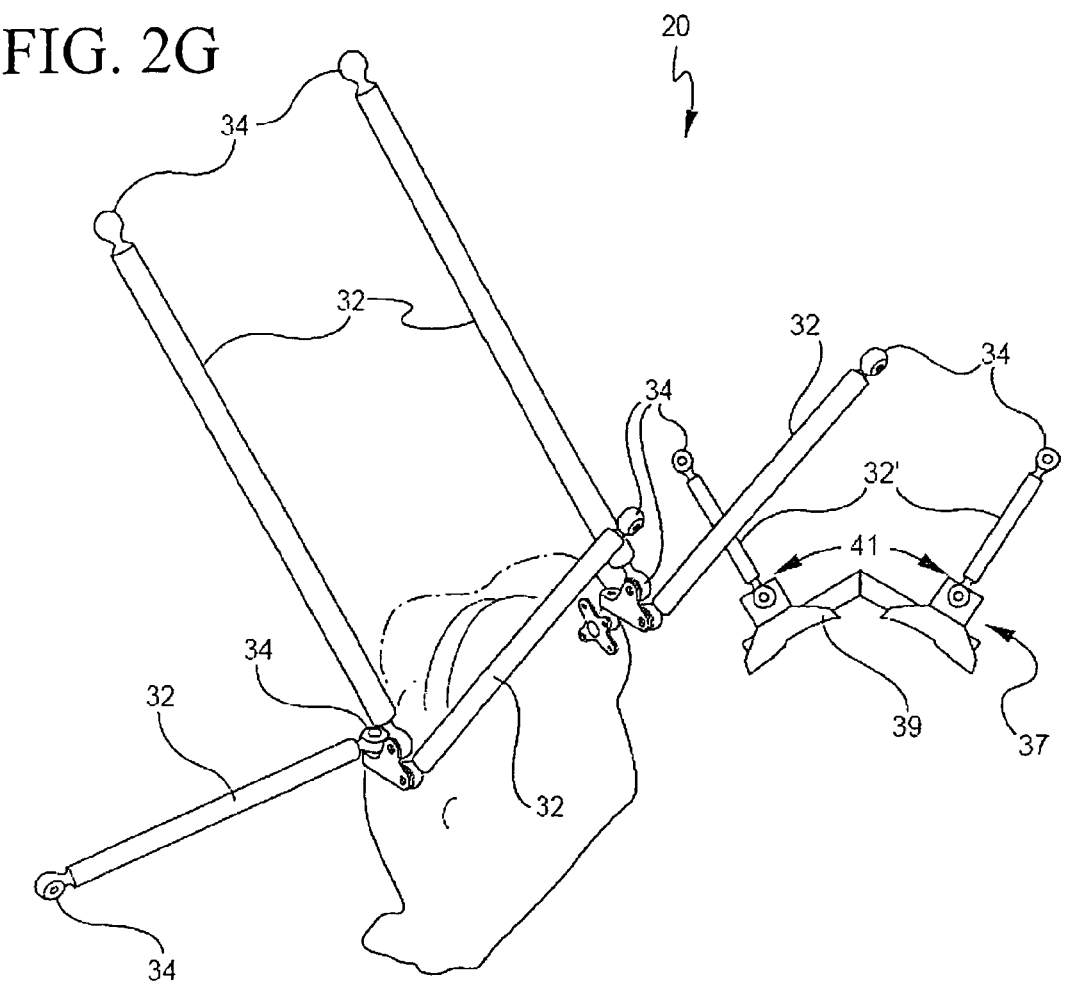

SECTION A-A

DETAIL B

SUSPENSION SYSTEM FOR AIRCRAFT AUXILIARY POWER UNIT WITH ELASTOMERIC MEMBER

CROSS REFERENCE

This application claims the benefit of, and incorporates by reference, U.S. Provisional Patent Application No. 60/981,460, filed on Oct. 19, 2007.

FIELD OF THE INVENTION

The present invention relates to an aircraft auxiliary power unit and a method of making an aircraft motion control device. More particularly the invention relates to an aircraft auxiliary power unit suspension system for isolating an aircraft auxiliary power unit having an at least first motion control elastomer member. The present invention further relates to coatings for aircraft elastomer substrates that provide resistance to solvents and fuels, fungi and microorganisms and enhanced ozone resistance for the underlying elastomer member.

BACKGROUND OF THE INVENTION

Elastomeric materials used in aircraft auxiliary power unit suspension systems are typically exposed to extremely high temperatures and degradative elements such as various solvents, oils, fuels and ozone. Aircraft elastomeric materials have a tendency to degrade when exposed to highly elevated temperatures, and there is a continuing search within the aircraft industry to provide elastomeric articles that are resistant to extreme heat and degradative elements.

One type of material found to be tolerate of high temperatures and resistant to degradation upon exposure to solvents, oils, fuels and ozone is silicone. Thus, elastomeric materials used in auxiliary power unit suspension systems were often made of a temperature resistant and drift and set resistant silicone elastomer. The low tensile strength of silicone elastomer, however, is inadequate for some auxiliary power unit suspension systems.

Another type of elastomeric material, EPDM (ethylene propylene diene terpolymers) is known to have a high tensile and tear strength and is resistant to extreme heat. However, EPDM is known to degrade upon exposure to solvents, oils, fuels and ozone and therefore is also inadequate for auxiliary power unit suspension systems.

Thus, what is needed, then, is an elastomeric material that has a high tensile and tear strength, but is resistant to such degrading materials. An elastomeric material that is resistant to extreme heat is also desired.

Further, there is a need for an effective and economical means for making aircraft auxiliary power unit suspension systems with improved performance and reliability. There is a need for economically feasible aircraft auxiliary power unit suspension system for isolating an aircraft auxiliary power unit in an aircraft. There is a need for a robust system and method of making isolating aircraft auxiliary power unit suspension systems.

SUMMARY

An embodiment of the invention includes a method of making an aircraft motion control device. The aircraft motion control device is preferably an aircraft auxiliary power unit suspension system motion control device including a suspension mount linkage having an elastomeric rod end. Preferably the method includes providing a first motion control nonelastomeric member (an outer rigid member), a second motion control nonelastomeric member (an inner rigid member), and a first motion control elastomer, the first motion control elastomer having an exterior surface. Preferably, the method includes providing an elastomeric coating composition, wherein the elastomeric coating composition comprises an elastomeric polymer dissolved in an organic solvent. The method also preferably includes applying the elastomeric coating composition to the exterior surface of the first motion control elastomer, wherein the organic solvent evaporates and the elastomeric polymer crosslinks. The method further preferably includes disposing the first motion control elastomer to operatively interconnect the first motion control nonelastomeric member and the second motion control nonelastomeric member.

Another embodiment of the invention includes an aircraft motion control auxiliary power unit suspension system device. The aircraft motion control auxiliary power unit suspension system device preferably comprises a first motion control nonelastomeric member (an outer rigid member) and a second motion control nonelastomeric member (an inner rigid member). The first motion control elastomer member is disposed to operatively interconnect the first motion control nonelastomeric member and the second motion control nonelastomeric member. The first motion control elastomer member includes an exterior surface coating formed from an elastomeric polymer dissolved in an organic solvent, wherein the elastomeric polymer dissolved in the solvent is applied to an exterior surface of the first motion control elastomer member, the solvent evaporates, and the elastomeric polymer crosslinks.

A further embodiment of the invention includes an aircraft motion control auxiliary power unit suspension system comprising a first suspension linkage including a first and a second terminal end, each having a helical threaded portion in the same orientation, a first elastomeric rod end having a threaded portion and a first motion control elastomer operatively interconnecting a first motion control nonelastomeric member and a second motion control nonelastomeric member. The threaded portion of the first elastomeric rod end includes a helical threaded portion having a hand corresponding to the helical threaded portion of the first terminal end of the first suspension linkage. The invention preferably includes a second elastomeric rod end having a threaded portion and a first motion control elastomer operatively connecting a first motion control nonelastomeric member and a second motion control nonelastomeric member. The threaded portion of the first elastomeric rod end includes a helical threaded portion having a hand corresponding to the hand of the helical threaded portion of the second terminal end of the first suspension linkage, wherein the helical threaded portion of the first elastomeric rod end and the helical threaded portion of the second elastomeric rod end are of the same hand.

In another embodiment the invention includes an aircraft suspension system device, comprising a first suspension linkage including a first and a second terminal end. Each terminal end includes a helical threaded portion of the same hand. The invention further includes a first rod end having a helical threaded portion wherein the helical threaded portion of the first rod end has a hand corresponding to the helical threaded portion of the first terminal end of the first suspension linkage. The first rod end includes a non-threaded stopper portion disposed to prevent the suspension link from moving in a first direction when the helical threaded portion of the first terminal end meets the non-threaded stopper portion of the first rod end. The invention also preferably includes a second rod end having a helical threaded portion. The helical threaded portion of the second rod end has a hand corresponding to the helical threaded portion of the second terminal end of the first suspension linkage. The second rod end includes a non-threaded stopper portion disposed to prevent the suspension link from moving in a second direction when the helical threaded portion of the second terminal end meets the non-threaded stopper portion of the second rod end. The hand of the helical threaded portion of the first rod end and the hand of the second rod end is the same.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principals and operation of the invention.

BRIEF DESCRIPTION OF THE DRAWINGS

FIGS. 2A-2G show APU rod end suspension systems.

DETAILED DESCRIPTION OF THE PREFERRED EMBODIMENTS

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

The invention includes an aircraft auxiliary power unit suspension system for isolating an aircraft auxiliary power unit having at least one aircraft auxiliary power unit operation frequency and a center of gravity. The aircraft auxiliary power unit suspension system is comprised of at least one rigid longitudinal suspension linkage, the suspension linkage terminating with a first low stiffness elastomeric rod end. The elastomeric rod end includes an elastomeric member coated with at least a first elastomeric coating composition. The low stiffness elastomeric rod end has a low spring rate wherein the aircraft auxiliary power unit suspension system provides the aircraft auxiliary power unit with a suspended auxiliary power unit natural frequency, the suspended auxiliary power unit natural frequency below the aircraft auxiliary power unit operation frequency. Preferably the suspended auxiliary power unit natural frequency is above a lower frequency limit, with the lower frequency being the main engine windmilling excitation frequency. Preferably the aircraft auxiliary power unit suspension system 20 isolates an aircraft auxiliary power unit 22 with a first low operation frequency of a generator 28, and a second high operation frequency of a turbine 30.

Figure 1A:
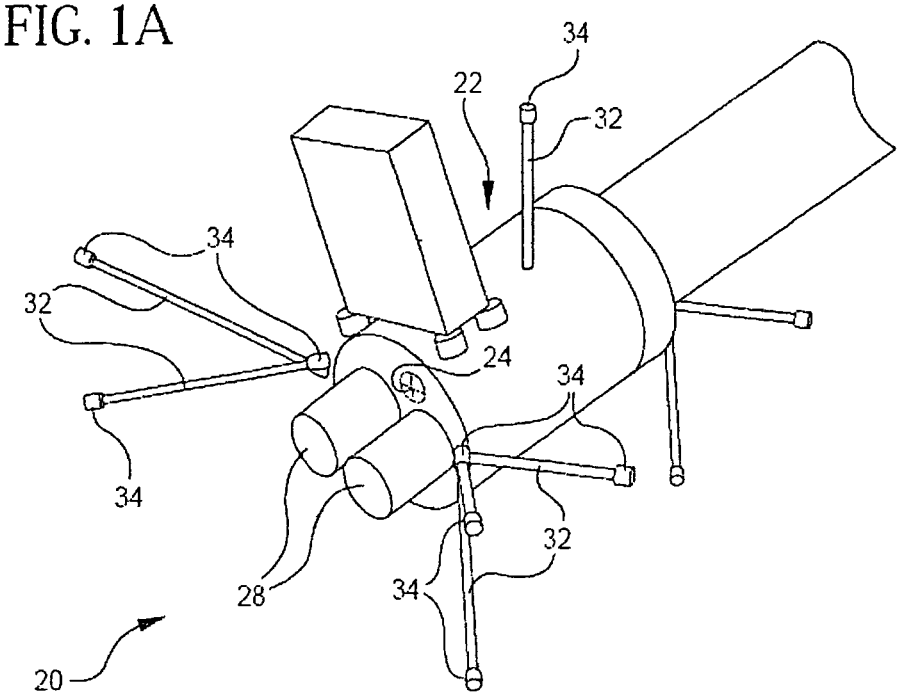
FIGS. 1A-D show aircraft auxiliary power unit (APU) suspension systems.
Figure 1B:
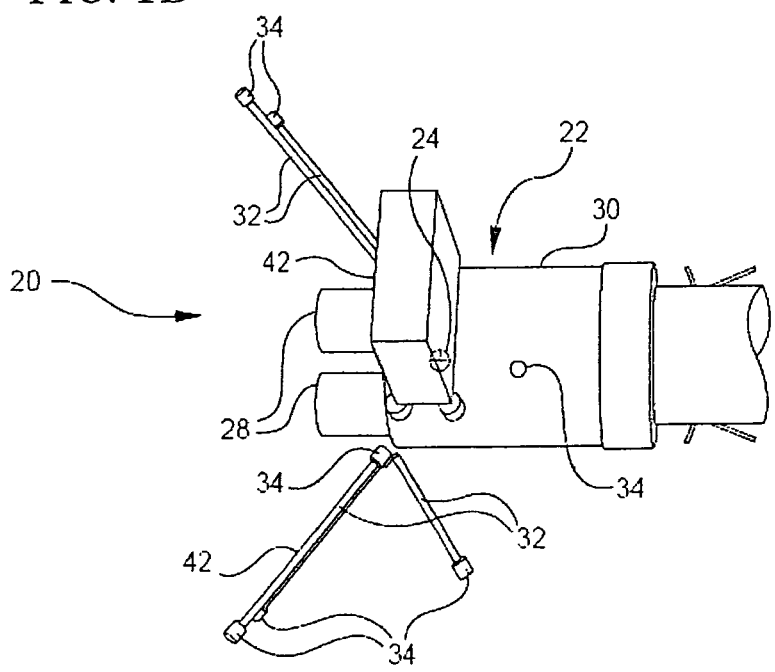
Figure 1C:
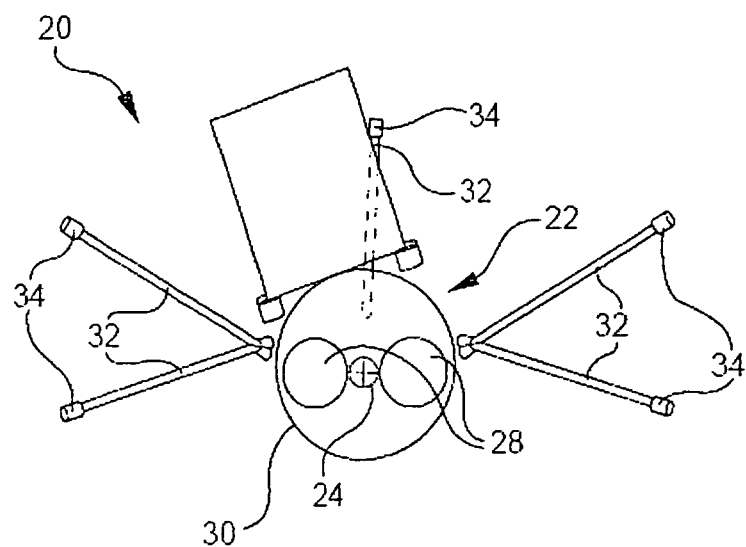
Figure 1D:
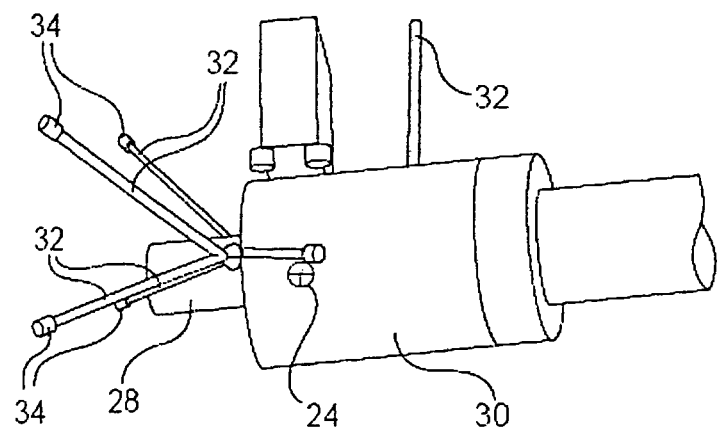

As shown in FIGS. 1A and 1B, the aircraft auxiliary power unit (hereinafter, APU) suspension system 20 includes longitudinal suspension linkages 32 that have low stiffness elastomeric rod ends 34 on both ends and longitudinal suspension linkages 32 with only a single rod end 34 on the longitudinal suspension linkage strut.

Preferably the aircraft auxiliary power unit suspension system 20 for isolating an aircraft auxiliary power unit 22 is at least partially focalized, with the suspension strut linkages 32 having an elastomeric spring line of action 42 running along the longitudinal length of the linkage 32 and through the rod end 34, wherein the elastomeric spring lines of action 42 intersect at a focal elastic center axis, with the focal elastic center axis proximate APU center of gravity 24. Preferably 3 elastic center axis planes intersect proximate the center of gravity 24 for a fully focalized system, preferably 2 elastic center axis planes intersect proximate the center of gravity 24 for a two thirds partially focalized system, and preferably the system is at least one third partially focalized with one elastic center axis plane proximate the center of gravity 24. Preferably the rod ends 34 provide for a focalized suspension system, with the suspension linkages 32 having an elastomeric spring line of action 42 running along the longitudinal length of the linkage 32 and through the rod end 34, wherein the elastomeric spring lines of action 42 intersect at a focal elastic center proximate the APU center of gravity 24. Preferably the APU 22 hangs from the structural surfaces of the aircraft on the suspension strut linkages 32, preferably with the majority of the center of gravity weight supported from above and the sides by the linkages 32, preferably while inhibiting a majority of the center of gravity weight from being supported from the bottom of the APU. Preferably the APU is hung by the linkages 32 (such as hung from front fire wall, ceiling) as compared with mounts below the center of gravity such as mounts between the APU bottom and aircraft floor. Preferably the long longitudinal linkage struts 32 are mainly under tension, not under compression, preferably at least some of the long longitudinal linkage struts 32, and preferably the majority are above the center of gravity 24, and not below the center of gravity.

Figure 2A:
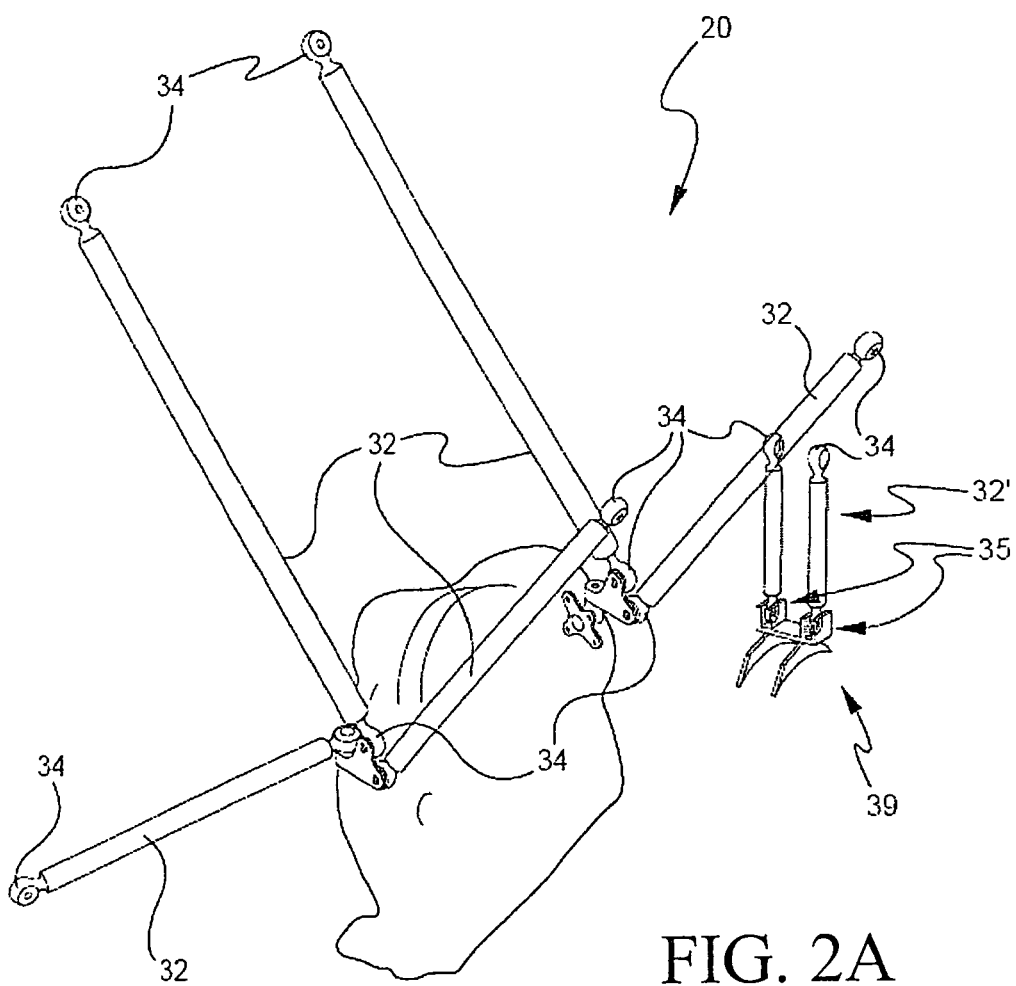
Figure 2C:
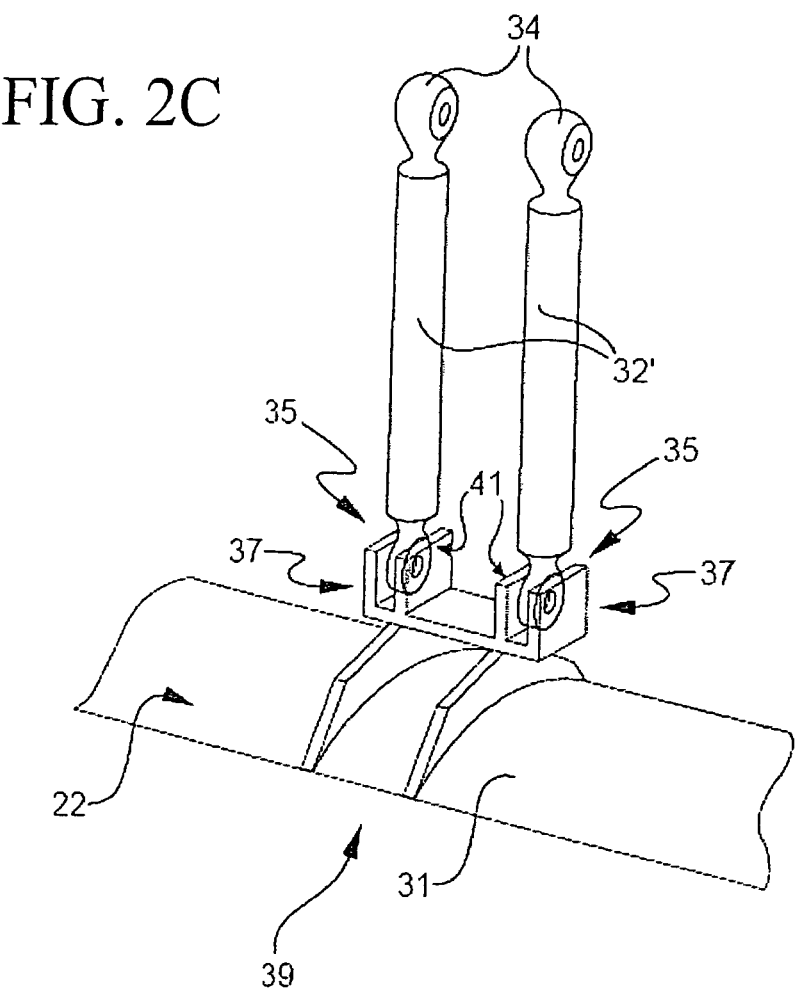
Figure 2D:
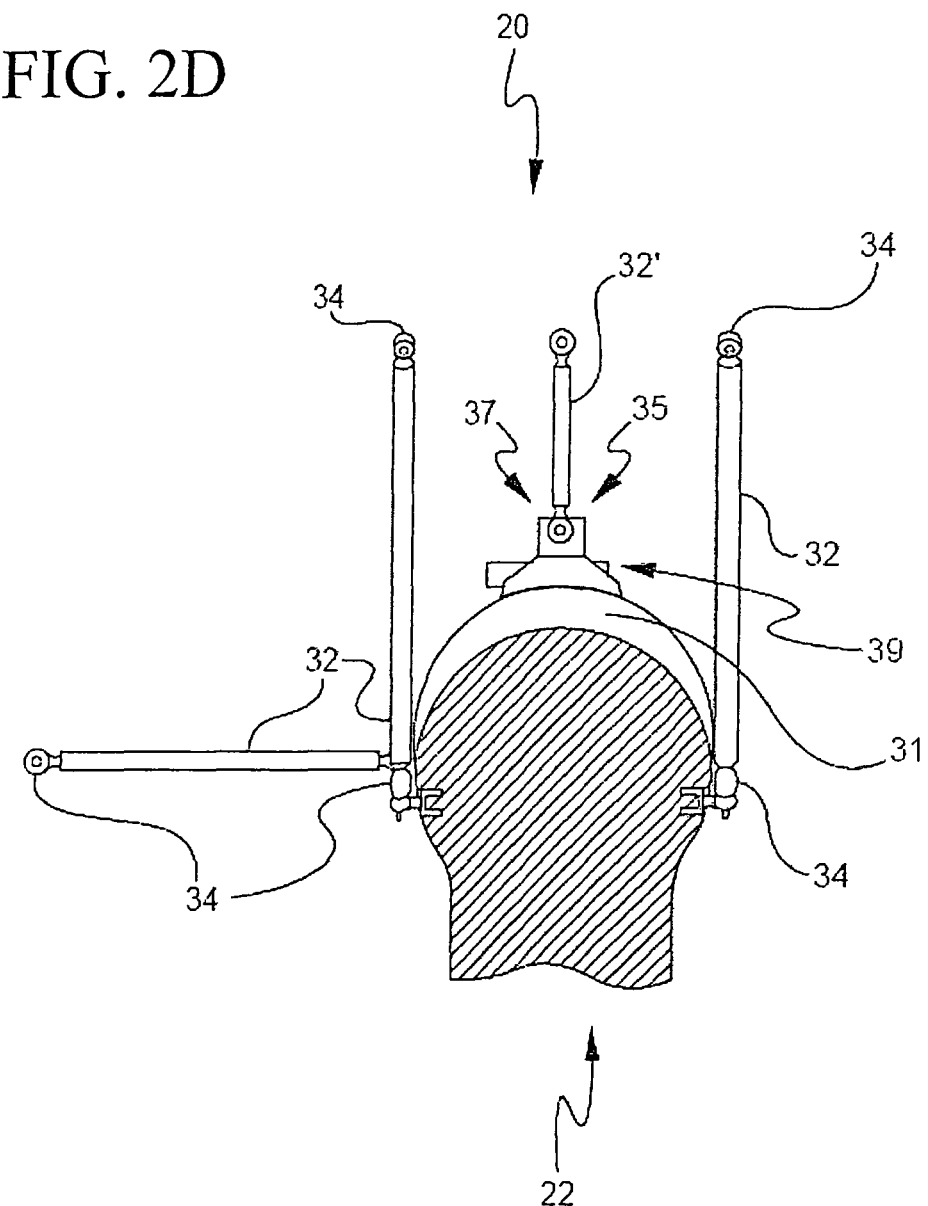

In preferred embodiments preferably at least one longitudinal suspension linkage strut 32 with only a single rod end 34 is utilized with the other longitudinal suspension linkages 32 with low stiffness elastomeric rod ends 34 on both ends. In a preferred embodiment two longitudinal suspension upper linkage struts 32' with only one rod end 34 each at the outboard end distal from the APU is utilized with the other longitudinal suspension linkages 32 with low stiffness elastomeric rod ends 34 on both ends. As shown in FIGS. 2A-2C in preferred embodiments at least two upper suspension linkages, preferably a first (fore) upper suspension linkage 32' and a second (aft) upper suspension linkage 32' provide an aligned pair of upper suspension linkages 32', with inboard non-compliant nonelastomeric metal spherical bearing linkage ends 35, preferably with the inboard non-compliant bearing linkage ends 35 comprised of metal spherical bearings. The distal ends of the upper suspension linkages 32' are preferably the outboard elastomeric rod ends 34. Preferably the first fore upper suspension linkage 32' and the second aft upper suspension linkage 32' are connected to the APU at a first fore and a second aft APU connection point 37 above the APU combustor section 31. Preferably, the first fore and second aft APU connection points 37 and the pair of upper suspension linkages 32' are aligned with the center of gravity 24 axis through the APU, preferably with an APU connection point bracket 39 having a fore linkage end attachment point 37 for the first upper suspension linkage 32' and an aft linkage end attachment point 37 for the second upper suspension linkage 32', preferably separated by a predetermine separation distance 41. Preferably the APU connection point bracket predetermine separation distance 41 is greater than the casing burn thru crack dimension for cracked combustion flame diameter for the APU turbine combustor 31. Preferably the aircraft auxiliary power unit 22 has a center of gravity 24. Preferably the aircraft auxiliary power unit suspension system first upper suspension linkage 32' and second upper suspension linkage 32' form a pair above the APU combustor 31. Preferably the first and second upper suspension linkages 32' are oriented with the aircraft auxiliary power unit center of gravity 24. Preferably the first suspension linkage 32' terminates with the first outboard low stiffness resilient rod end 34 and the distal first inboard linkage end 35 proximate the APU. Preferably the second suspension linkage 32 terminates with the second outboard low stiffness resilient rod end 34 and distal second inboard linkage end 35 proximate the APU. The low stiffness resilient rod ends 34 of the system preferably have low spring rates wherein the aircraft auxiliary power unit suspension system provides the aircraft auxiliary power unit with a suspended auxiliary power unit natural frequency, with the suspended auxiliary power unit natural frequency below the aircraft auxiliary power unit operation frequency. This orientation is preferred for aft end attachment fail-safe which minimizes APU deflections with the loss of one aft strut. In an alternative preferred embodiment is shown in FIG. 2D for forward mounting group loss (loss of the entire LH or RH attachment to the APU). In the preferred alternative embodiment full system fail-safety requirements (four fail-safe mounting groups), the two upper aft struts are arranged and oriented in a partially focalized manner (FIGS. 2E & 2F). The hard bearing attachment directly to the aft combustor case is preferably done with the APU connection point bracket predetermine separation distance 41 (fore and aft spacing) but clocked around the combustor attachment ring (FIG. 2E). In a preferred embodiment the upper linkages 32' are oriented at positions with the struts aligned so that their major axis points focused proximate or at the APU center of gravity (c.g.) (as projected on that plane), such as about the 10 o'clock and 2 o'clock positions separated by about ninety degrees, preferably pointing just beyond (below) the projected APU c.g. or at or least desirably (but acceptably) before (above) the projected APU c.g. These orientations permit partial focalization which minimizes APU motions and allow for safe retention of the APU should one aft strut fail or either of the forward LH or RH mounting groups should fail.

Figure 3:
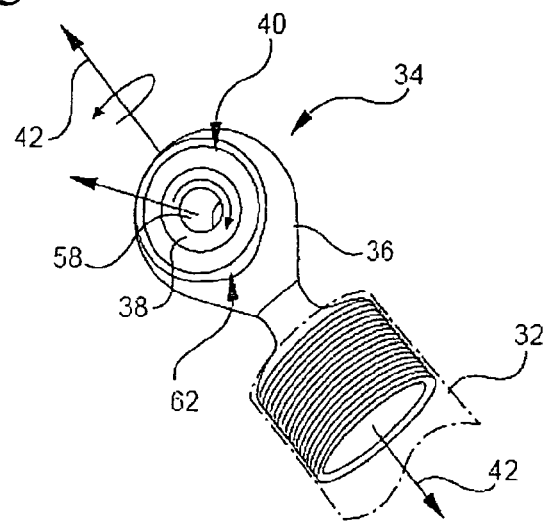
FIG. 3 shows an APU suspension system rod end.
Figure 4:
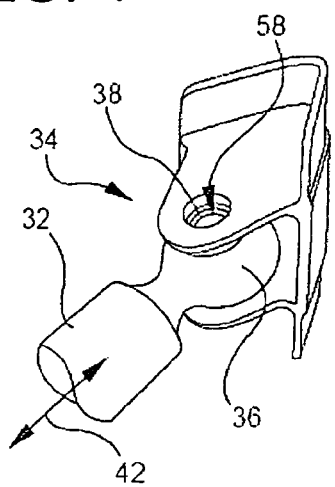
FIG. 4 shows an APU suspension system rod end.

Referring to FIG. 3, the suspension linkage 32 preferably terminates with a distal second low stiffness elastomeric rod end 34, wherein the first low stiffness elastomeric rod end 34 and the distal second low stiffness elastomeric rod end 34 in series provide the suspended auxiliary power unit natural frequency below the aircraft auxiliary power unit operation frequency. In preferred embodiments the two distal rod ends 34 have a doubled stiffness in comparison if only one rod end is used on each linkage. Rod end 34 preferably includes a rigid nonextensible outer member (a first motion control nonelastomeric member) 36, a rigid nonextensible inner member (a second motion control nonelastomeric member) 38, and an intermediate elastomer 40 between the rigid nonextensible outer member 36 and the rigid nonextensible inner member 38, the intermediate elastomer (a first motion control elastomer) 40 bonded to the rigid nonextensible inner member 38.

Figure 5:
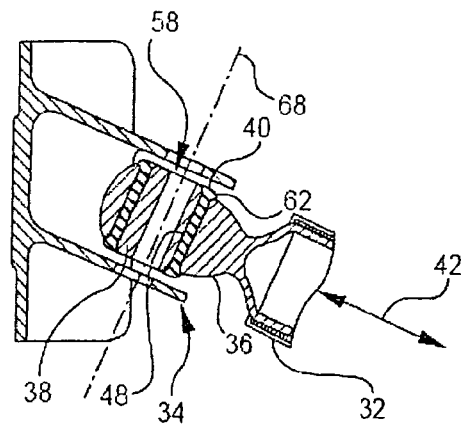
FIG. 5 shows an APU suspension system rod end.
Figure 6:
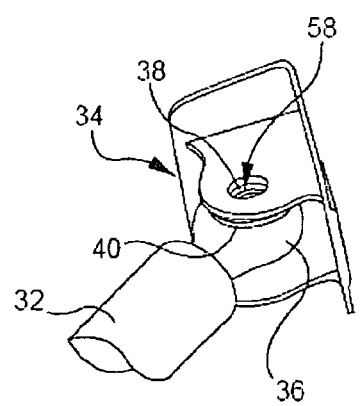
FIG. 6 shows an APU suspension system rod end.
Figure 7:
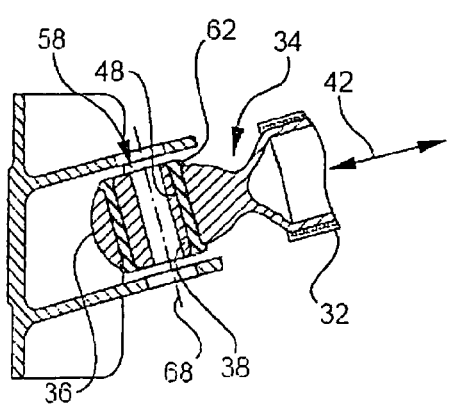
FIG. 7 shows an APU suspension system rod end.
Figure 8:
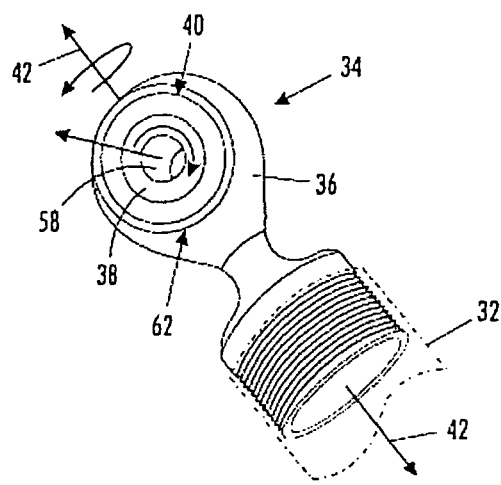
FIG. 8 shows an APU suspension system rod end.
Figure 9:
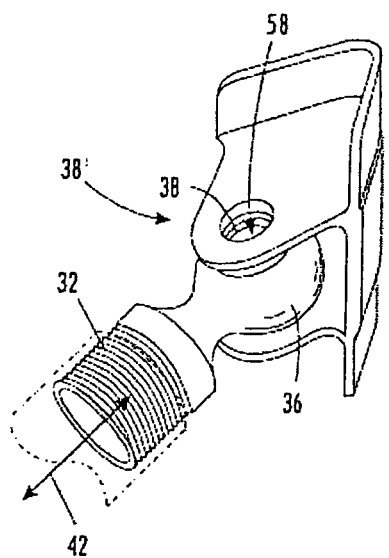
FIG. 9 shows an APU suspension system rod end.
Figure 10:
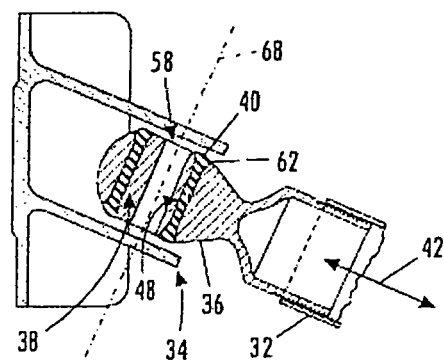
FIG. 10 shows an APU suspension system rod end.

Preferably the rigid nonextensible inner member 38 has an outer bonding surface 48 with the intermediate elastomer 40 bonded to the rigid nonextensible inner member outer bonding surface 48, such as shown in FIGS. 5 and 7.

Preferably the intermediate elastomer 40 has an intermediate elastomer thickness between the inner rigid member 38 and outer rigid member 36 that is greater than 0.05 inches (1.27 mm), preferably at least 0.06 inches (1.52 mm), and preferably at least 2 mm to give the rod end 34 the low spring rate. Preferably intermediate elastomer thickness is at least 0.1 inches (2.54 mm) to give the low spring rate, such as about 0.166 inches (4.2 mm). Preferably the rod end 34 low spring rate is less than 500,000 lbs./inch (87,000 N/mm), preferably with a static shear modulus less than 250 psi. Preferably the rod end 34 low spring rate is less than 500,000 lbs./inch, preferably <300,000 lbs./inch, preferably <250,000 lbs./inch, preferably <200,000 lbs./inch, preferably <100,000 lbs./inch, preferably <50,000 lbs./inch. Preferably the rod end 34 low spring rate is in the range from 20,000 to 100,000 lbs./inch, preferably in the range from 20,000 to 50,000 lbs./inch.

Preferably the rod end low spring rate is provided by the elastomer thickness in proportion to the load area to produce a low shape factor part, with a shape factor of 0.25 to 5, with the elastomer shape factor giving the low spring rate. Preferably the no greater than 50,000 lbs/inch rod ends 34 provide the aircraft auxiliary power unit suspension system 20 with a suspended auxiliary power unit natural frequency below the about 200 Hz APU generator frequency (200±50 Hz, preferably 200±25 Hz, such as about 175 Hz) and below the about 500 Hz APU turbine frequency (500±50, preferably 500±25 Hz, such as about 520 Hz). Preferably linkages 32 include rod ends 34 on both ends of the longitudinal strut rod, preferably with the system needing a Xlbs./inch stiffness for the linkage, the two rod ends 34 with twice the stiffness 2 Xlbs./inch stiffness are utilized to provide beneficial elastomer life performance and decreased post fire deflections for the linkage, such as for a linkage system need of 20,000 lbs./inch stiffness, 40,000 lbs./inch rod ends are used on both ends (two with twice the stiffness). As shown in FIG. 3 these low spring rates are the radial spring rates for the rod end ($K_{radial}$), with the spring line of action 42 along the longitudinal length of the linkage 32, with the other spring rates of the rod end (axial, cocking, torsional) are even lower, preferably an order of magnitude lower than the radial spring rate, preferably <50,000, preferably <20,000, preferably <10,000, preferably <5,000 lbs./inch. Linkages 32 with rod ends 34 preferably have low dynamic force transfer functions at the auxiliary power unit operation frequencies, preferably at both the low end generator frequency of about 176 Hz and the low end turbine frequency of about 517 Hz. For a linkage 32 with a single rod ends 34 preferably the low dynamic force transfer functions are <15%. For linkages 32 with rod ends 34 on both ends of the linkage preferably the low dynamic force transfer functions are <3%, preferably <2%.

The intermediate elastomer 40 can be formed from an elastomeric rubber material such as natural rubber, polyisoprene, polybutadine, isobutylene-isoprene, ethylene-propylene, and silicone. Preferably, the intermediate elastomer 40 is made of ethylene propylene diene terpolymers (EPDM), a temperature resistant elastomer, which comprises diene and ethylene. For linkages 32 with rod ends 34, 35 on both ends of the linkage, preferably the intermediate elastomer 40 is ethylene propylene diene terpolymers (EPDM) for both the inboard and outboard rod ends 34, 35. Preferably the rod end intermediate elastomer 40 is a peroxide curable EPDM elastomer. The EPDM formulation comprises 100 phr EPDM polymer, 50 phr semi-reinforcing carbon black, 1-30 phr paraffinic plasticizer and a suitable anti-degradation agent for EPDM, together with a peroxide cure system.

Before the intermediate elastomer 40 is disposed between the rigid nonextensible outer member 36 and the rigid nonextensible inner member 38, an exterior surface 41 of the intermediate elastomer 40 is preferably coated with at least a first elastomeric coating composition. Preferably, the intermediate elastomer 40 is coated with a second elastomeric coating composition as well. The elastomeric coating compositions are preferably each an elastomeric polymer dissolved in an organic solvent. When the elastomeric coating composition evaporates, the elastomeric polymer cross-links. The elastomeric polymer forming the exterior coating on the elastomeric member forms primarily organic cross-links within the coating itself, and inorganic cross-links to the elastomer member. Thereafter, the intermediate elastomer 40 is disposed between the rigid nonextensible outer member 36 and the rigid nonextensible inner member 38.

A preferable first elastomeric coating composition comprises a functionalized hydrogenated high molecular weight copolymer comprising 50-85% at least one repeating unit derived from a conjugated diene monomer; and an active hydrogen-bearing, or ethylenic unsaturated or hydrolysable group-bearing monomer, or graft-linked compound, or combinations thereof; the copolymer curable with either (b) heat or radiation or the coating composition contains (c) curing component comprising at least one isocyanate group; or a carbodiimide compound; an aldehyde source, an amino resin, or combinations thereof optionally with heat; and (c) a carrier liquid.

More specifically, the functionalized hydrogenated diene copolymers used herein are solid phase, high polymers, with a molecular weight of about 100,000 and higher, more typically 200,000 to 500,000. These polymers are distinguished from liquid, functionalized oligomers, such as well-known reactive terminal-group functional polymers ATBN and CTBN. The unsaturated functionalized polymer for preparing the hydrogenated coating polymer comprises broadly, from 50 to 85 percent by weight of conjugated diene monomer units, 5 percent to 50 percent by weight one or more non-conjugated, ethylenically unsaturated monomer units, and 1 to 20 percent by weight of a functional comonomer or graft-linked compound. The preferred conjugated diene monomer units are derived from 1,3-butadiene monomer, and the non-conjugated ethylenically unsaturated monomer units are derived from one or more ethylenically unsaturated monomers selected from unsaturated nitriles such as acrylonitrile and methacrylonitrile, and monovinyl aromatic hydrocarbons such as styrene and alkylstyrenes. Divinyl aromatic hydrocarbons such as divinyl benzene, dialkenyl aromatics such as diisopropenyl benzene are preferably absent. Other comonomers include alkyl(meth)acrylates such as methyl acrylate, methyl methacrylate, ethyl acrylate, butyl acrylate, 2-ethylhexyl acrylate or methacrylate, vinylpyridine, and vinyl esters such as vinyl acetate. The preferred functional comonomers are selected from unsaturated carboxylic acids and esters thereof such as acrylic acid, methacrylic acid, crotonic acid, itaconic acid, and maleic acid. The glass transition temperature (Tg) of the functionalized diene elastomer must not exceed −10° C., preferably −25° C., in order to provide acceptable flex-cracking resistance. The functionalized diene elastomer will be described as follows with respect to the most preferred embodiment as a functionalized butadiene acrylonitrile copolymer but applies equally to preparation of the myriad other suitable functionalized diene copolymers in light of the teachings herein. Nitrile elastomers offer beneficial characteristics such as low temperature flexibility, oil, fuel and solvent resistance as well as good abrasion and water-resistant qualities, making them suitable for use in on the intermediate elastomer 40 of the APU suspension system.

The first elastomeric coating composition is most preferably carried out with a functionalized hydrogenated nitrile rubber (HNBR). The functionalization of HNBR with reactive functionality provides critical enabling methods for crosslinking the coating composition and obtaining the essential level of adhesion to the intermediate elastomer 40. Without adequate adhesion to the intermediate elastomer 40, coatings exhibit premature flex-cracking and/or delamination. The functional groups can be generally classified as containing active hydrogen groups, ethylenic unsaturated groups or hydrolyzable groups. Crosslinking can be effected through the addition of crosslinking components mentioned herein, by exposure to moisture, heat (infra-red, thermal), by UV radiation, or by e-beam radiation. Depending on the reactive functionality incorporated into the diene copolymer, some functionalized HNBR embodiments mentioned herein below are self-curing without added crosslinker, and all can be or are cured with suitable crosslinking components added to the functionalized HNBR such as but not limited to dinitrosobenzene, ZnO, gamma-POM, resoles, multifunctional amine, isocyanates, acrylates, dicyandiamide, dicarboximides, and formaldehyde (or UF, MF) resins.

The term "functionalized" means that a comonomer or graft-linked compound is incorporated in or covalently bonded to the polymer structure, and provides a group capable of reacting with a crosslinker such as a diisocyanate. Functionalized HNBR can be prepared by a variety of ways known in the art including: (1) Functionalization of NBR using metathesis, followed by hydrogenation of the modified NBR to give functionalized HBNR and (2) the reaction of NBR with methylolated phenols followed by hydrogenation of the modified NBR to give functionalized HBNR. Functional groups can be incorporated by the use of functional-group-containing comonomers and graft-linkable, functional-group-bearing compounds. Various known isocyanate-reactive functional groups can be utilized. Hydroxy-functional comonomers are readily adaptable. Carboxy-functional comonomers are readily adaptable to form a copolymer of carboxylated hydrogenated nitrile rubber. The functionalized hydrogenated nitrile rubber can be defined as a polymer comprising at least one diene monomer, nitrile monomer, and a functional group-bearing comonomer which has been polymerized into the backbone of the polymer or graftlinked functional group containing compound or a combination thereof. When the abbreviation HNBR is utilized herein, it is to be understood that the term refers to rubbers which can include diene monomer other than 1,3 butadiene, and comonomers other than acrylonitrile, unless specifically stated. It is also important to note that additional monomers can be polymerized along with or grafted to the diene monomer to form the functionalized HNBR. The additional monomers can, for example, provide at least one functional group to facilitate crosslinking.

Functionalization of HNBR with phenol functionality can be carried out with the unsaturated un-hydrogenated polymer by addition of methylol phenol under heat and optionally catalyzed by suitable Lewis acid. Addition can be through the nitrile or carboxyl groups by ester formation, or addition at allylic sites. Preferably a metathesis reaction of an ethylenic unsaturated compound bearing a phenol group can be done in solvent or water. Alternatively, an olefinic bearing methylolated phenol can be metathesized with NBR, followed by hydrogenation. The phenol functionalized NBR is subsequently hydrogenated. A methylolation reaction can be undertaken using a phenol functional NBR or HNBR with formaldehyde to generate a methylolated phenol functionality in the NBR, or with HNBR. Methylolated phenols can form covalent bonds with NBR and NBR copolymers by a variety of chemical reactions as reported in the literature. See, A. Knop and L. Pilato, "Phenolic Resins Chemistry and Applications and Performance" Springer-Verlag, New York 1985, Chapter 19 pg 288-297. The following structural diagrams illustrate functionalizing with a phenolic bearing compound.

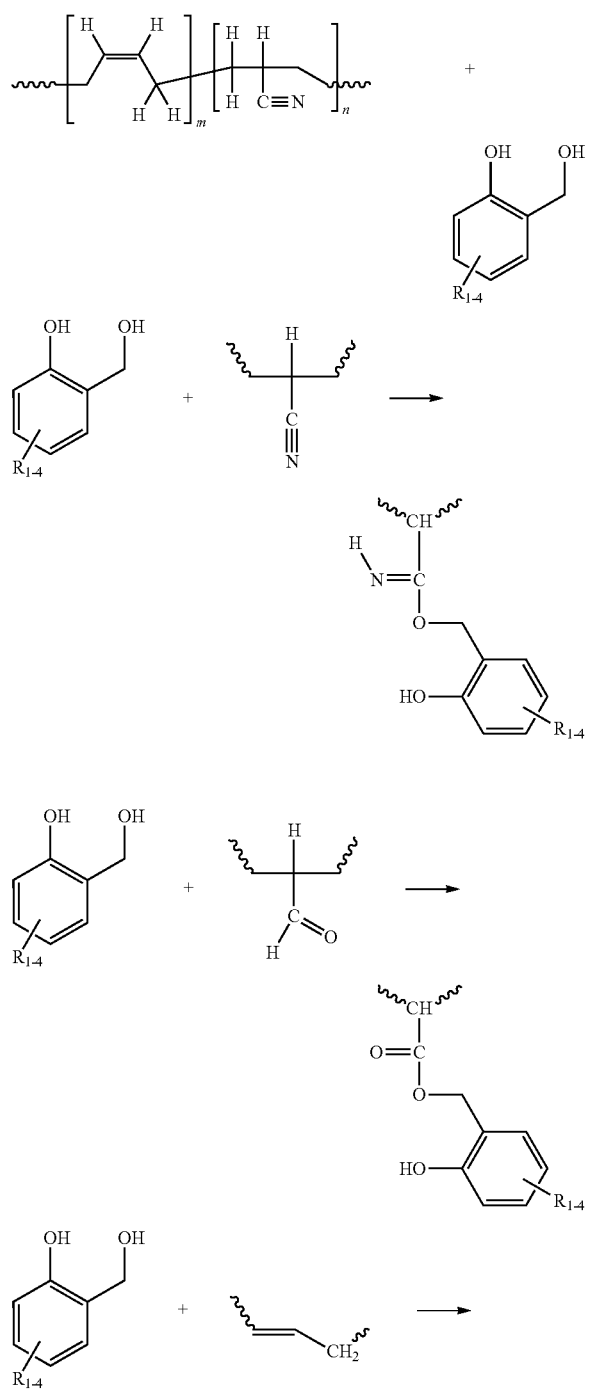

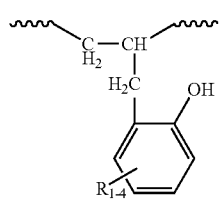

While it is possible to combine any methylolated phenol with NBR, mono-methylolated phenols are especially preferred. The combination of Mono-methylolated phenols with NBR polymers yields phenol functionalized-NBR products which are stable. After hydrogenation of the phenol-modified NBR according to known procedures in the art (e.g. cat. hydrogenation), a stable phenol-modified HNBR copolymer is obtained. The phenol-functionalized HNBR copolymer can be crosslinked with a variety of well-known crosslinkers for phenolic resins including those selected from the class of chemical compounds dicarboximides, isocyanate, and formaldehyde source (paraformaldehyde, gamma-POM, hexamethylene amine, phenolic resoles or etherified phenols).

Known procedures in the art can be used to prepare a phenol functional polymer via a phenol monomer with methylolated phenol functionalized BNR/HBNR. The phenol functionalized NBR/HNBR can be prepared by either the mono-methylolated phenol or by metathesis involving unsaturated monomer with the unsaturated NBR. The methylolated phenol functionalized NBR/HBNR prepared by metathesis utilizes a methylolated phenolic monomer with NBR. Methylolated phenol functionalized NBR/HNBR is capable of self-curing (i.e. without an external curing agent). Methylolated phenol functionalized NBR/HNBR derivatives are capable of curing with other coating components, such as phenolic novolaks, active hydrogen reactive crosslinkers and rubber/elastomer toughening agents. Methylolated phenol functional HNBR can be used with known vulcanizing agents for rubber. The vulcanization reaction is based on the formation of either a quinone methide or a benzylic carbenium that is generated by the thermal or catalytic activation of the methylolated phenols. The quinone methide intermediate reacts by abstraction of allylic hydrogen. Alternatively, methylolated phenols under acidic catalyzed conditions can generate reactive benzyl carbenium ions which will react with unsaturated polymers in the substrate.

When the reactive functional group on the HNBR is phenol, then isocyanate, dicarboximide, formaldehyde source, and resole curing agents are useful for crosslinking the phenol-functionalized HNBR and developing adhesion to the elastomer substrate. Likewise, amine-functionalized HNBR can be crosslinked using isocyanate or dicarboximide, a formaldehyde source, and resoles, as examples. Epoxy functionalized HNBR can be crosslinked and cured with appropriate amines and dicyandiamide components as are well-known in the art of Epoxy adhesives.

Isocyanate functionalized HNBR can be crosslinked or cure by moisture or by the addition of other curative agents such as amine or polyols. Incorporation of the isocyanate as part of the HNBR is particularly desirable because it reduces that amount of free monomeric and therefore volatile isocyanate and its reported health and safety issues. Maleimide functionalized HNBR can be crosslinked either by the addition of a free radical initiator or by Michael addition reactions. Ethylenic unsaturated acrylate-functionalized HNBR is capable of free radical, UV and e-beam curing. Anhydride functional HNBR can be cured using amines and components described in the art for anhydride-epoxy adhesives. Silyl ether and chlorides are moisture curing. Diels-Alder adducts are self-curing or by the addition of known metathesis catalysts.

To provide the ethylenically unsaturated nitrile-conjugated diene rubber with high saturation, the hydrogenation of nitrile rubber is conducted. Generally any of the numerous known processes for hydrogenation can be utilized, including but not limited to, solution hydrogenation and oxidation/reduction hydrogenation. The hydrogenation serves to saturate at least 80% of the unsaturated bonds of the rubber. When the degree of saturation is less than 80%, the rubber's heat resistance is low. The more preferred degree of saturation of the rubber is 95-99.99%.

The preferred conjugated diene monomers useful for preparing the carboxylated acrylonitrile-butadiene copolymers which are further hydrogenated can be any of the well-known conjugated dienes including dienes having from about 4 to about 10 carbon atoms, such as, but not limited to, 1,3-butadiene; 2-methyl-1,3-butadiene, 2,3-dimethyl-1,3-butadiene; 1,3-pentadiene; 1,3-hexadiene; 2,4-hexadiene; 1,3-heptadiene; piperylene; and isoprene, with 1,3-butadiene presently being preferred.

The unsaturated nitrile monomers copolymerized to form a carboxylated acrylonitrile-diene copolymer typically correspond to the following formula:

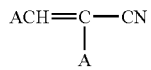

wherein each A is hydrogen or a hydrocarbyl group having from 1 to about 10 carbon atoms. Examples of A groups include alkyl and cycloalkyl, such as methyl, ethyl, isopropyl, t-butyl, octyl, decyl, cyclopentyl, cyclohexyl, etc., and aryls such as phenyl, tolyl, xylyl, ethylphenyl, t-butylphenyl, etc. Acrylonitrile and methacrylonitrile are the presently preferred unsaturated nitriles.

The HNBR of the first coating also includes functional group containing monomers which are polymerized into the backbone of the HNBR, or functional group containing compounds which have been grafted to the HNBR, or a combination thereof.

Carboxyl group containing monomers are optionally utilized in the rubbers of the first coating composition. Carboxyl groups are derived from α,β-unsaturated monocarboxylic acid monomers with 3 to about 5 C-atoms such as acrylic acid, methacrylic acid and crotonic acid and/or other known carboxyl group-containing monomers such as, but not limited to α,β-unsaturated dicarboxylic acids with 4 to about 5 or about 6 C-atoms, e.g., maleic acid, fumaric acid, citraconic acid and itaconic acid. The bound unsaturated carboxylic acid may be present in an amount of from about 1 to about 10 weight percent of the copolymer, with this amount displacing a corresponding amount of the conjugated diolefin. Preferably, the monomer is an unsaturated mono- or di-carboxylic acid derivative (e.g., esters, amides and the like). Functions of the carboxyl group containing monomers include serving as a crosslinking site and enhancing adhesion.

Additional, optional functional monomers can be polymerized into the backbone of the HNBR copolymer. Examples of the functional ethylenically unsaturated monomers which are copolymerizable with the nitrile monomers and the conjugated diene monomers are: hydrazidyl-group containing ethylenic unsaturated monomers, amino-group-bearing ethylenic unsaturated monomers, thiol-group bearing unsaturated ethylenic unsaturated monomers, unsaturated carboxylic acids such as acrylic acid, methacrylic acid, itaconic acid and maleic acid and salts thereof, alkyl esters of unsaturated carboxylic acids such as various acrylates, for example methyl acrylate and butyl acrylate; alkoxyalkyl esters of unsaturated carboxylic acids such as methoxy acrylate, ethoxyethyl acrylate, methoxyethyl acrylate, acrylamide, and methacrylamide.

Also suitable as functional comonomers are various classes of monomers such as N,N-disubstituted-aminoalkyl acrylates; N,N-disubstituted-aminoalkyl methacrylates; N,N-disubstituted-amino alkyl acrylamides; N,N-disubstituted-aminoalkyl methacrylamides; hydroxyl-substituted-alkyl acrylates and hydroxyl-substituted-alkyl methacrylates, N-alkylol substituted acrylamides such as N-methylolacrylamide, N,N'-dimethylolacrylamide and N-ethoxymethylolacrylamide; N-substituted methacrylamides such as N-methylolmethacrylamide, N,N'-dimethylolmethacrylamide and N-ethoxymethylmethacrylamide especially where free radical initiated copolymerization occurs in the presence of an alkylthiol compound having 12 to 16 carbon atoms three tertiary carbon atoms.

Of these polar group-containing vinyl monomers, N,N-disubstituted-aminoalkyl acrylates, N,N-disubstituted-aminoalkyl methacrylates, N,N-disubstituted-aminoalkyl acrylamides and N,N-disubstituted-aminoalkyl methacrylamides are preferable.

As specific examples of N,N-disubstituted-aminoalkyl acrylates, there can be mentioned acrylic acid esters such as N,N-dimethylaminomethyl acrylate, N,N-dimethylaminoethyl acrylate, N,N-dimethylaminopropyl acrylate, N,N-dimethylaminobutyl acrylate, N,N-diethylaminoethyl acrylate, N,N-diethylaminopropyl acrylate, N,N-diethylaminobutyl acrylate, N-methyl-N-ethylaminoethyl acrylate, N,N-dipropylamlnoethyl acrylate, N,N-dibutylaminoethyl acrylate, N,N-dibutylaminopropyl acrylate, N,N-dibutylaminobutyl acrylate, N,N-dihexylaminoethyl acrylate, N,N-dioctylaminoethyl acrylate and acryloyl morpholine. Of these, N,N-dimethylaminoethyl acrylate, N,N-diethyluninoethyl acrylate, N,N-dipropylaminoethyl acrylate, N,N-dioctylaminoethyl acrylate and N-methyl-N-ethylaminoethyl acrylate are preferable.

As specific examples of N,N-disubstituted-aminoalkyl methacrylates, there can be mentioned methacrylic acid esters such as N,N-dimethylaminomethyl methacrylate N,N-dimethylaminoethyl methacrylate, N,N-dimethylaminopropyl methacrylate, N,N-dimethylaminobutyl methacrylate, N,N-diethylaminoethyl methacrylate, N,N-diethylaminopropyl methacrylate, N,N-diethylaminobutyl methacrylate, N-methyl-N-ethylaminoethyl methacrylate, N,N-dipropylaminoethyl methacrylate. N,N-dibutylaminoethyl methacrylate, N,N-dibutylaminopropyl methacrylate, N,N-dibutylaminobutyl methacrylate, N,N-dihexylaminoethyl methacrylate and N,N-dioctylaminoethyl methacrylate. Of these, N,N-dimethylaminoethyl methacrylate, N,N-diethylaminoethyl methacrylate, N,N-dipropylaminoethyl methacrylate, N,N-dioctylaminoethyl methacrylate and N-methyl-N-ethylaminoethyl methacrylate are preferable.

As specific examples of N,N-disubstituted-aminoalkyl acrylamides, there can be mentioned acrylamide compounds such as N,N-dimethylaminomethyl acrylamide, N,N-dimethylaminoethyl acrylamide, N,N-dimethylaminopropyl acrylamide, N,N-dimethylaminobutyl acrylamide, N,N-diethylaminoethyl acrylamide, N,N-diethylaminopropyl acrylamide, N,N-diethylaminobutyl acrylamide, N-methyl-N-ethylaminoethyl acrylamide, N,N-dipropylaminoethyl acrylamide, N,N-dibutylaminoethyl acrylamide, N,N-dibutylaminopropyl acrylamide, N,N-dibutylaminobutyl acrylamide, N,N-dihexylaminoethyl acrylamide N,N-dihexylaminopropyl acrylamide and N,N-dioctylaminopropyl acrylamide. Of these, N,N-dimethylaminopropyl acrylamide, N,N-dlethylaminopropyl acrylamide and N,N-dioctylaminopropyl acrylamide are preferable.

As specific examples of N,N-disubstituted-aminoalkyl methacrylamides, there can be mentioned methacrylamide compounds such as N,N-dimethylaminomethyl methacrylamide, N,N-dimethylaminoethyl methacrylamide, N,N-dimethylaminopropyl methacrylamide, N,N-dimethylaminobutyl methacrylamide, N,N-diethylaminoethyl methacrylamide, N,N-diethylaminopropyl methacrylamide, N,N-diethylaminobutyl methacrylamide, N-methyl-N-ethylaminoethyl methacrylamide, N,N-dipropylaminoethyl methacrylamide, N,N-dibutylaminoethyl methacrylamide, N,N-dibutylaminopropyl methacrylamide, N,N-dibutylaminobutyl methacrylamide, N,N-dihexylaminoethyl methacrylamide, N,N-dihexylaminopropyl methacrylamide and N,N-dioctylaminopropyl methaorylamide. Of these, N,N-dimethylaminopropyl methacrylamide, N,N-diethylaminopropyl methaorylamide and N,N-dioctylaminopropyl methacrylamide are preferable.

As specific examples of the hydroxy-substituted-alkyl acrylates and hydroxy-substituted-alkyl methacrylates, there can be mentioned hydroxymethyl acrylate, 2-hydroxyethyl acrylate, 2-hydroxypropyl acrylate, 3-hydroxypropyl acrylate, 3-chloro-2-hydroxypropyl acrylate, 3-phnoxy-2-hydroxypropyl acrylate, hydroxymethyl methacrylate, 2-hydroxyethyl methacrylate, 2-hydroxypropyl methacrylate, 3-hydroxypropyl methacrylate, 3-chloro-2-hydroxypropyl methacrylate and 3-phnoxy-2-hydroxypropyl methacrylate. Of these, hydroxymethyl acrylate, 2-hydroxyethyl acrylate, hydroxymethyl methacrylate and 2-hydroxyethyl methacrylate are preferable.

The HNBR copolymers are polymerized by reaction of the any of the aforementioned exemplary conjugated dienes, unsaturated nitrile, and unsaturated functional-group containing comonomers in the presence of a free radical initiator by methods well known to those skilled in the art. Suitable free radical initiators are beyond the scope of this disclosure, and are typically organic oxides, peroxides, hydroperoxides, and azo compounds, etc., such as hydrogen peroxide, benzoyl peroxide, cumene hydroperoxide, di-tert-butyl peroxide, ascaridole, acetyl peroxide, tert-butyl hydroperoxide, trimethylamine oxide, dimethylaniline oxide, isopropylperoxydicarbonate, diisobutylene ozonide, peracetic acid, nitrates, chlorates, perchiorates, azobisisobutyronitrile, etc.

Hydrogenation of nitrile rubber is known to the art and to the literature. For example, a preferred commercially available X-HNBR (carboxylated-HNBR) is made from a carboxylated nitrile-diene copolymer that is hydrogenated in two steps. It is known that the C—C double bonds of the 1,2-vinyl-configured butadiene units in NBR are hydrogenated very rapidly, followed by the 1,4-cis configured units. The 1,4-trans configured butadiene units are hydrogenated comparatively slowly. The NBR products used for hydrogenation are distinguished by a predominant proportion of the 1,4-trans configured double bonds.

In the 2-stage hydrogenation carbon-to-carbon double bonds are first reduced, followed by reduction of the carbon-to-nitrogen bond. As is known in the art, this procedure avoids the gelation of the hydrogenated polymers which may occur if the reduction is carried out in one step. In the first step, a different catalyst may be used, for example, a palladium or ruthenium catalyst. If desired, however, the nitrile groups alone may be reduced by proper choice of the catalyst, leaving unsaturated carbon-to-carbon bonds in the linear polymeric chain. It is possible also to use a combination of noble metal and nickel or cobalt, operating first at a relatively low temperature, then at a higher temperature. Other techniques for hydrogenating acrylonitrile-butadiene copolymers are disclosed in, for example, U.S. Pat. Nos. 4,581,417; 4,631,315; and 4,795,788; the disclosures of which are incorporated herein by reference.

A partly or completely hydrogenated nitrile rubber (HNBR) is also described in several specifications (for example DE-OS No. (German Published Specification) 2,539,132; DE-OS No. (German Published Specification) 3,329,974; DE-OS No. (German Published Specification) 3,046,008 and 3,046,251; and European Patent No. A-111, 412). All of these specifications describe a process for the preparation of a partly or completely hydrogenated NBR which can be vulcanized (for example with the aid of sulphur vulcanization systems or peroxide vulcanization systems). The HNBR is prepared in solution which is later converted into solid rubber.

A hydroxylated rubber is described in U.S. Pat. No. 6,252,008 herein incorporated by reference. The rubber contains in the region of 0.1 to 5 wt. % of bonded hydroxyl groups.

Also, hydrogenation of X-HNBR latex can be carried out by known conventional techniques. A carboxylated NBR polymer latex made conventionally using anionic surfactants is combined with (1) an oxidant selected from the group consisting of oxygen, air and hydroperoxides; (2) a reducing agent selected from hydrazine and hydrates thereof; and (3) a metal ion activator; (b) and heating the mixture to a temperature from 0° C. to the reflux temperature of the reaction mixture. This technique is taught in U.S. Pat. No. 4,452,950, assigned to Goodyear Tire and Rubber Co., herein incorporated by reference.

Furthermore, a hydrogenation process carried out in organic solution is known from U.S. Pat. No. 4,207,409, also incorporated by reference, in which process an NBR polymers manufactured by anionic polymerization, is taken up in solution in the presence of a catalyst mixture comprising a soluble compound of iron, cobalt or nickel, an aluminum-organic compound and water.

The most preferred acrylonitrile-butadiene copolymers are typically hydrogenated to an extent such that the final product has an unsaturation level of from about 1 to 20 mole percent, desirably from about 1 to about 10 or 15 mole percent, and preferably from about 1 to about 5 mole percent.

A suitable carboxylated hydrogenated nitrile rubber X-HNBR is manufactured by Bayer under a trade name of "Therban®," for example Therban KA 8889. X-HNBR may have an iodine value of preferably about 50% or less, more preferably about 3 to 40%, most preferably from about 8 to 30%. Resistance against heat and demanding solvents can be increased when X-HNBR having an iodine value of 50% or less (high hydrogenation ratio) is used, and rubber elasticity at a low temperature can be maintained by the use of the X-HNBR rubber having a low hydrogenation ratio. The central value of the nitrile content of HNBR is preferably from about 15 to 60%, more preferably from about 30 to 55%, most preferably from about 40 to 50%. Resistance against solvents can be increased by the use of HNBR having a nitrile content of about 15% or more, particularly about 30% or more, and low-temperature resistance can be kept by the use of the rubber having a nitrile content of about 60% or less, particularly about 50% or less. In addition, its Mooney viscosity as the central value of $ML_{1+4}$ (100° C.) (hereinafter referred to as "Mooney viscosity") is preferably from about 40 to 100, and for a coating, lower Mooney viscosity of 40-60 is preferred.

When X-HNBR having a Mooney viscosity falling within this range is used, the coating composition exhibits high resistance against organic liquids and good flexibility and low-temperature resistance.

The HNBR of the first coating can also have crosslinker reactive functional groups graft-linked thereto; either before or after hydrogenation. As examples of the unsaturated compound having a functional group, may be mentioned vinyl compounds having a functional group, and cycloolefins having a functional group. The introduction of the functional group by the graft-modifying method can be carried out by reacting the HNBR with a functional group-containing unsaturated compound in the presence of an organic peroxide. No particular limitation is imposed on the functional group-containing unsaturated compound. However, epoxy group-containing unsaturated compounds, carboxyl group-containing unsaturated compounds, hydroxyl group-containing unsaturated compounds, silyl group-containing unsaturated compounds, unsaturated organosilicon compounds, etc. are mentioned for reasons of improvements of crosslinking density and adhesion to substrates at a low modification rate.

Examples of the epoxy group-containing unsaturated compounds or epoxy group-containing cycloolefins include glycidyl esters of unsaturated carboxylic acids such as glycidyl acrylate, glycidyl methacrylate and glycidyl p-styryl-carboxylate; mono- or polyglycidyl esters of unsaturated polycarboxylic acids such as endo-cis-bicyclo[2,2,1]hept-5-ene-2,3-dicarboxylic acid and endo-cis-bicyclo[2,2,1]hept-5-ene-2-methyl-2,3-dicarboxylic acid; unsaturated glycidyl ethers such as allyl glycidyl ether, 2-methyl-allyl glycidyl ether, glycidyl ether of o-allylphenol, glycidyl ether of m-allylphenol and glycidyl ether of p-allylphenol; and 2-(o-vinylphenyl)ethylene oxide, 2-(p-vinylphenyl)ethylene oxide, 2-(o-allylphenyl)-ethylene oxide, 2-(p-allylphenyl)ethylene oxide, 2-(o-vinylphenyl)propylene oxide, 2-(p-vinylphenyl) propylene oxide, 2-(o-allylphenyl)propylene oxide, 2-(p-allylphenyl)propylene oxide, p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinylcyclohexene monoxide and allyl-2,3-epoxycyclopentyl ether. These epoxy group-containing unsaturated compounds may be used either singly or in any combination thereof. As examples of the carboxyl group-containing unsaturated compounds, may be mentioned compounds described in Japanese Patent Application Laid-Open No. 271356/1993, for example, unsaturated carboxylic acids such as acrylic acid, methacrylic acid and α-ethylacrylic acid; and unsaturated dicarboxylic acid such as maleic acid, fumaric acid, itaconic acid, endo-cis-bicyclo-[2.2.1]hept-5-ene-2,3-dicarboxylic acid and methyl-endo-cis-bicyclo[2.2.1]hept-5-ene-2,3-dicarboxylic acid. Further, as examples of the unsaturated carboxylic acid derivatives, may be mentioned anhydrides, esters, halides, amides and imides of unsaturated carboxylic acids, and specific examples thereof include acid anhydrides such as maleic anhydride, chloromaleic anhydride, butenylsuccinic anhydride, tetrahydrophthalic anhydride and citraconic anhydride; esters such as monomethyl maleate, dimethyl maleate and glycidyl maleate; and malenyl chloride and maleimide. Of these, unsaturated dicarboxylic acids and anhydrides thereof are preferred for reasons of easy introduction of the functional group by a graft reaction, and the like, with acid anhydrides such as maleic anhydride and itaconic anhydride being particularly preferred.

Examples of the hydroxyl group-containing unsaturated compounds include allyl alcohol, 2-allyl-6-methoxyphenol, 4-allyloxy-2-hydroxybenzophenone, 3-allyloxy-1,2-propanediol, 2-allyldiphenol, 3-buten-1-ol, 4-penten-1-ol and 5-hexen-1-ol.

Examples of the silyl group-containing unsaturated compounds include chlorodimethylvinylsilane, trimethylsilylacetylene, 5-trimethylsilyl-1,3-cyclopentadiene, 3-trimethylsilylallyl alcohol, trimethylsilyl methacrylate, 1-trimethylsilyloxy-1,3-butadiene, 1-trimethylsilyloxycyclopentene, 2-trimethylsilyloxyethyl methacrylate, 2-trimethylsilyloxyfuran, 2-trimethylsilyloxypropene, allyloxy-t-butyldimethylsilane and allyloxytrimethylsilane.

Examples of the unsaturated organosilicon compounds include trisalkoxyvinylsilanes such as trimethoxyvinylsilane, triethoxyvinylsilane, tris(methoxyethoxy)vinylsilane. The alkoxy groups in such an unsaturated organosilicon compounds can be hydrolyzed into silanol groups.

The graft-modified HNBR can be obtained by graft-reacting one of the aforementioned ethylenic unsaturated compounds having a functional group with the HNBR under generation of a radical. As methods for generating the radical, may be mentioned (i) a method making use of an organic peroxide, (ii) a method making use of a photo-induced radical generator, (iii) a method by irradiation of energy rays, and (iv) a method by heating.

(i) Method making use of an organic peroxide: As the organic peroxide, for example, organic peroxides, organic peresters, etc. may be preferably used. As specific examples of such an organic peroxide, may be mentioned benzoyl peroxide, dichlorobenzoyl peroxide, dicumyl peroxide, di-tert-butyl peroxide, 2,5-dimethyl-2,5-di(peroxide benzoate)hexyne-3, 1,4-bis(tert-butyl peroxyisopropyl)benzene, lauroyl peroxide, tert-butyl peracetate, 2,5-dimethyl-2,5-di(tert-butyl peroxy)hexyne-3, 2,5-dimethyl-2,5-di(tert-butyl peroxy) hexane, tert-butyl perbenzoate, tert-butyl perphenylacetate, tert-butyl perisobutyrate, tert-butyl per-sec-octoate, tert-butyl perpivalate, cumyl perpivalate and tert-butyl perdiethylacetate. For the first coating composition, azo compounds may also be used as the organic peroxides. As specific examples of the azo compounds, may be mentioned azobisisobutyronitrile and dimethyl azoisobutyrate.

Of these, benzoyl peroxide, and dialkyl peroxides such as dicumyl peroxide, di-tert-butyl peroxide, 2,5-dimethyl-2,5-di(tert-butyl peroxide)hexyne-3, 2,5-dimethyl-2,5-di(tert-butyl peroxy)hexane and 1,4-bis(tert-butyl peroxyisopropyl)benzene are preferably used.

These organic peroxides may be used either singly or in any combination thereof. A proportion of the organic peroxide used is generally within a range of 0.001 to about 10 parts by weight, preferably about 0.01 to about 5 parts by weight, more preferably about 0.1 to about 2.5 parts by weight per 100 parts by weight of the unmodified HNBR. When the proportion of the organic peroxide used falls within this range, the rate of reaction of the functional group-containing unsaturated compound, and various properties of the resulting functional group-containing polymer, are balanced with one another at a high level. It is hence preferable to use the organic peroxide within such a range.

No particular limitation is imposed on the graft-modifying reaction, and the reaction may be carried out in accordance with any of the methods known per se in the art. The graft reaction can be conducted at a temperature of generally 0 to 400° C., preferably 60 to 350° C. The reaction time is generally within a range of 1 minute to 24 hours, preferably 30 minutes to 10 hours. After completion of the reaction, a solvent such as methanol is added in a great amount to the reaction system to deposit a polymer formed, and the polymer can be collected by filtration, washed and then dried under reduced pressure.

(ii) Method making use of a photo-induced radical generator: The method making use of the photo-induced radical generator is a method in which after the photo-induced radical generator is added, the resultant mixture is exposed to ultraviolet light to generate a radical, and any conventionally known method may be used. The photo-induced radical generator may be any substance so far as it is activated by irradiation of ultraviolet light. Specific examples thereof include carbonyl compounds such as benzoin, benzoin methyl ether, benzoin isopropyl ether, benzoin isobutyl ether, acetoin, butyroin, toluoin, benzyl, benzophenone, 2,2-dimethoxy-2-phenylacetophenone, alpha-hydroxycyclohexyl phenyl ketone, p-isopropyl-α-hydroxyisibutylphenone, alpha, alpha-dichloro-4-phenoxyacetophenone, methylphenyl glyoxylate, ethylphenyl glyoxylate, 4,4-bis(dimethylaminophenone) and 1-phenyl-1,2-propandione-2-(o-ethoxylcarbonyl).oxime; sulfur compounds such as tetramethylthiuram monosulfide and tetramethylthiuram disulfide; azo compounds such as azobisisobutyronitrile and azobis-2,4-dimethylvaleronitrile; peroxide compounds such as benzoyl peroxide and di(t-butyl)peroxide; acylphosphine oxides such as 2,4,6-trimethylbenzoyldiphenylphosphine oxide.

A proportion of the photo-induced radical generator used is generally within a range of 0.001 to about 10 parts by weight, preferably about 0.01 to about 5 parts by weight, more preferably about 0.1 to about 2.5 parts by weight, in terms of a charged proportion upon the reaction, per 100 parts by weight of the unmodified HNBR. When the proportion of the photo-induced radical generator used falls within this range, the rate of reaction of the functional group-containing unsaturated compound, and various properties of the resulting functional group-containing polymer, are balanced with one another at a high level. It is hence preferable to use the photo-induced radical generator within such a range.

(iii) Method by irradiation of energy rays: The method by irradiation of energy rays is a publicly known method in which active energy rays such as alpha-rays, beta-rays and gamma-rays are irradiated to generate a radical. In particular, it is desired that ultraviolet light be used from the viewpoints of efficiency, practicability and profitability.

(iv) Method by heating: The radical generating method by heating is carried out by heating in a temperature range of 100 to 390° C. Both publicly known solution method, and melting and kneading method may be used. Of these, the melting and kneading method using an extruder or the like by which shear stress is applied upon heating is preferred from the viewpoint of reaction efficiency.

Direct modification of carbon-carbon unsaturated bonds in the NBR or HNBR can also be utilized to add functional groups thereto. The carbon-carbon unsaturated bonds are present in the precursor NBR and as residual unsaturation in the HNBR, therefore the modified HNBR can be obtained by modifying the carbon-carbon unsaturated bonds to add a functional group to the addition polymer.

No particular limitation is imposed on the method for introducing the functional group, and examples thereof include (a) a method by oxidation of unsaturated bonds, (b) the aforementioned method by an addition reaction of a compound containing at least one functional group in its molecule to unsaturated bonds, and (c) the methods mentioned herein of introducing an epoxy group, carboxyl group, hydroxyl group, or aforementioned reaction of an olefinic bond of the NBR or HNBR polymer with an unsaturated, preferably a monounsaturated, carboxylic reactant. Alternatively, the polymer can be halogenated using chlorine or bromine-containing compounds. The halogenated polymer can then be reacted with the monounsaturated carboxylic acid. The polymer and the monounsaturated carboxylic reactant can also be contacted at elevated temperatures to cause a thermal "ene" reaction to take place. Alternatively, the monounsaturated carboxylic acid can be reacted with the polymer by free radical induced grafting. The polymer of the first coating composition can be functionalized by contact with a hydroxy aromatic compound in the presence of a catalytically effective amount of at least one acidic alkylation catalyst. The alkylated hydroxy aromatic compound can then be further reacted to form a derivative by Mannich Base condensation with an aldehyde and an amine reagent to yield a Mannich Base condensate. In yet another means to functionalize the polymer, the polymer may be contacted with carbon monoxide in the presence of an acid catalyst under Koch reaction conditions to yield the polymer substituted with carboxylic acid groups. In addition to the above methods of functionalization, the polymer of the first coating composition can be functionalized by methods of air oxidation, ozonolysis, hydroformylation, epoxidation and chloroamination, or the like by any other method (for example, Japanese Patent Application Laid-Open No. 172423/1994).

The curing component of the first coating composition contains at least one isocyanate group preferably a polyisocyanate, or at least one isocyanate group and a group that forms crosslinks with the functional groups of the HNBR, or is a polyisocyanate prepolymer, or is a carbodiimide or amino resin. The preferred curing component contains at least one isocyanate group, or a group bearing an isocyanate group, or a functional group reactive crosslinking group, or combinations thereof, and the like. The curing component is used at a level generally of from about 3 to about 30 wt. parts, desirably from about 5 to about 25 wt. parts, and preferably from about 10 to about 20 wt. parts per 100 wt. parts of said hydrogenated copolymer of a conjugated diene, unsaturated nitrile and grafted or copolymerized functional monomers, i.e. functionalized HNBR parts.

Suitable monomeric polyisocyanates include aliphatic diisocyanates containing from 2 to 40 carbons in the aliphatic radical may be used in the first coating composition. Exemplary polyisocyanates include ethylene diisocyanate, trimethylene diisocyanate, hexamethylene diisocyanate, propylene-1,2-diisocyanate, ethylidene diisocyanate, cyclopentylene-1,3-diisocyanate, the 1,2-, 1,3- and 1,4-cyclohexylene diisocyanates, the 1,3- and 1,4-phenylene diisocyanates, diphenylmethane diisocyanates, polymethyleneisocyanates, the 2,4- and 2,6-toluene diisocyanates, the 1,3- and 1,4-xylylene diisocyanates, bis(4-isocyanatoethyl)carbonate, 1,8-diisocyanato-p-methane, 1-methyl-2,4-diisocyanatocyclohexane, the chlorophenylene diisocyanates, naphthalene-1,5-diisocyanate triphenylmethane-4,4', triisocyanate, isopropylbenzene-alpha-4-diisocyanate, 5,6-bicyclo[2.2.1]hept-2-ene diisocyanate, 5,6-diisocyanatobutylbicyclo[2.2.1]hept-2-ene. Exemplary commercial products are trimethylhexamethylene diisocyanate available from VEBA, heptadecyl (C17) diisocyanate, DDI 1410 an aliphatic C-36 diisocyanate available from the Henkel Corporation of Minneapolis, Minn. and Isonate® 143L diisocyanate, a modified diphenylmethane diisocyanate (MDI) available from Upjohn Corp. Further urethane components are isophorone diisocyanate available from VEBA and Desmodur® N an aliphatic triisocyanate available from Mobay. Desmodur® N is more particularly defined as the reaction product of 3 moles of hexamethylene diisocyanate and water having an isocyanate equivalent weight as later defined of 191. Other adducts or prepolymers of the polyisocyanate include Desmodur® L and Mondur® CB which are the adducts of tolylene diisocyanate (TDI).

Examples of alicyclic polyisocyanates include 1,3-cyclopentene diisocyanate, 1,4-cyclohexane diisocyanate, 1,3-cyclohexane diisocyanate, 1-isocyanato-3,3,5-trimethyl-5-isocyanatomethyl-cyclohexane (isophorone diisocyanate, IPDI), 4,4'-methylenebis(cyclohexyl isocyanate), methyl-2,4-cyclohexane diisocyanate, methyl-2,6-cyclohexane diisocyanate and 1,3- or 1,4-bis(isocyanatomethyl)cyclohexane) and polyisocyanates (e.g., 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1) heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1) heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane and 6-(2-isocyanatoethyl)-2-isocyanatomethyl-2-(3-isocyanatopropyl)-bicyclo(2.2.1)heptane).

Blocked isocyanates, which are known, can be employed in the practice of forming the coatings. Any polyisocyanate can be blocked. Suitable blocking agents for reaction with the organic mono- or polyisocyanates are those isocyanate-reactive compounds, for example, phenols, lactams, oximes, imides, alcohols, pyrazoles, and the like. The reaction of the organic polyisocyanate and the blocking agent can be carried out by any of the methods known in the art. The reaction can be carried out in bulk or in inert solvent at temperatures of, for example, about 50-120° C. For completely-blocked isocyanates, equivalent ratios of isocyanate-reactive groups to isocyanate groups of 1/1-2/1 or higher can be utilized. Completely blocked isocyanates are preferredly used herein, but the ratio can be adjusted if only a partially-blocked polyisocyanate is desired.

The preferred monomeric isocyanates for organic solvent solution coatings of the first coating composition are derived from 1,6-diisocyanatohexane or 1-isocyanato-3,3,5-trimethyl-5-isocyanatomethyl-cyclohexane, and include derivatives such as an isocyanurate group-containing polyisocyanate based on 1,6-diisocyanatohexane and/or 1-isocyanato-3,3,5-trimethyl-5-isocyanatomethyl-cyclohexane, a uretdione group-containing diisocyanate based on 1,6-diisocyanatohexane and/or 1-isocyanato-3,3,5-trimethyl-5-isocyanatomethyl-cyclohexane, a urethane group-containing polyisocyanate based on 1,6-diisocyanatohexane and/or 1-isocyanato-3,3,5-trimethyl-5-isocyanatomethyl-cyclohexane, an allophonate group-containing polyisocyanate based on 1,6-diisocyanatohexane and/or 1-isocyanato-3,3,5-trimethyl-5-isocyanatomethyl-cyclohexane, a biuret group-containing polyisocyanate based on 1,6-diisocyanatohexane, bis-(6-isocyanatohexyl)-oxadiazinetrione and mixtures of these polyisocyanates.

The aqueous coating containing functionalized elastomer and crosslinker dispersed therein can be utilized shortly after preparation, such as by the use of an aqueous dispersed polyisocyanate such as disclosed in U.S. Pat. No. 5,202,377. Exemplary emulsifiable polyisocyanates taught in the '377 patent comprises a hydrophilic tertiary isocyanate functional oligomer rendered hydrophilic by partially reacting with a hydrophilic polyether. Other water dispersible isocyanates suitable for aqueous-based embodiments according to the invention are known. U.S. Pat. No. 4,663,377, teaches an emulsifiable polyisocyanate mixture comprising (a) a hydrophilic isocyanate-functional oligomer and (b) a polyisocyanate. A non-limiting example is the reaction product of an aliphatic polyisocyanate with a mono- or polyhydric, non-ionic polyalkylene ether alcohol having at least one polyether chain containing at least 10 ethylene oxide units. Water dispersible isocyanates which are preferred are based upon aliphatic and alicyclic isocyanates.

Coating compositions can be formed by combining (i) the water dispersible crosslinkers, such as carbodiimide, polyisocyanate with (ii) the separate aqueous solutions, emulsions or dispersions of the functionalized elastomer polymer containing functionality. Alternatively, the aqueous composition containing the functionalized elastomer can be combined with a separate aqueous dispersion containing the crosslinker such as is taught in U.S. Pat. No. 5,466,745 for the diisocyanate embodiment. The coating can be prepared by admixing the elastomer in aqueous medium with a non-aqueous, emulsifiable composition comprising an unblocked polyisocyanate crosslinking agent and a surface active isocyanate-reactive material. This alternative will introduce some volatile organic components when selecting solvents known as VOC, however there are other solvent diluents that can be used that are not considered VOC. A known procedure can be followed by (i) admixing an unblocked hydrophobic isocyanate and diluent with a mixture of a surface active isocyanate-reactive material and water to form a water-in-oil emulsion, then (ii) adding this emulsion to the aqueous medium containing the elastomer in proportions and under conditions to invert the isocyanate emulsion into an oil-in-water emulsion.

Polyisocyanates are also discussed in the following U.S. Pat. No. 4,553,377, and citing U.S. Pat. Nos. 6,221,995; 6,201,060; 6,153,690; 6,143,132; 6,139,675; 6,126,777; 6,087,439; 6,080,812; 6,051,634; 6,034,169; 6,008,289; 6,007,619 and 5,998,539.

Specific examples of commercial diisocyanates that may be mentioned, are 1,6-hexane diisocyanate (commercially available, for example, under the trade designation HMDI from Bayer), isophorone diisocyanate (commercially available, for example, under the trade designation IPDI from Huls), tetramethylxylene diisocyanate (commercially available, for example, under the trade designation m-TMXDI from Cytec), 2-methyl-1,5-pentane diisocyanate, 2,2,4-trimethyl-1,6-hexane diisocyanate, 1,12-dodecane diisocyanate and methylene bis(4-cyclohexyl isocyanate) (commercially available, for example, Desmodur® W from Bayer), and higher functional isocyanates such as a biuret of 1,6-hexane diisocyanate (commercially available, for example, as Desmodur® N from Bayer), an isocyanurate of 1,6-hexane diisocyanate (commercially available, for example, as Desmodur® N-3390 from Bayer), an isocyanurate of isophorone diisocyanate (commercially available, for example, as Desmodur® Z-4370 from Bayer), a reaction product of tetramethylxylene diisocyanate and trimethylol propane (commercially available, for example, as Cythane® 3160 from Cytec), and a reaction product of one mole of trimethylol propane and 3 moles of toluene diisocyante (commercially available, for example, as Desmodur® L from Bayer). The amount of di- or polyisocyanate included should be from 3 to 30 phr. Preferably the amount is from 8 to 15 phr.

Another class of crosslinking components are the various known isocyanatosilanes which contain an isocyanate group and another group capable of forming crosslinks, such as a hydrolyzable group, namely halogen, hydroxy, alkoxy, or acyloxy group; an epoxy-containing group; a mercapto group; a mercapto-containing group; a vinyl group; a vinyl-containing group; another isocyanate group; another isocyanate-containing group; an ureido group; an ureido-containing group; an imidazole group; or an imidazole-containing group. Such compounds are known in the art.

The preferred crosslink-forming group of the isocyanatosilane is an alkoxy group. Examples of commercially available isocyanato-alkoxy silanes which are suitable herein include gamma-isocyanatopropyltrimethoxysilane, available as Silquest® Y-5187 from OSi Specialties Group, a Witco company (OSi), and gamma-isocyanatopropyltriethoxysilane, available as Silquest® A-1310, also from OSi.

Examples of other suitable curing components are the carbodiimides. The polyfunctional carbodiimides exhibit suitable reactivity with functional group-containing elastomers used in the first coating composition. N-acylurea groups form between carboxylic sites. Carbodiimide linkages can also be formed between a carboxyl group and other functional groups contained in the functionalized elastomer, such as hydrazidyl, amino and/or thiol groups. Poly functional carbodiimides can be obtained from polyisocyanates using phospholine oxide as catalyst as is described, for example, in U.S. Pat. No. 2,941,966. Water dispersible carbodiimides can be formed by the addition of hydrophilic polyamines or polyols and carbodiimides containing isocyanate groups, by reacting the reactants in the presence of from 0.01 to 3% by weight, based on the reaction mixture, of a Sn catalyst as is taught in U.S. Pat. No. 4,321,394. The re-arrangement products can be produced at temperatures as low as 25-150° C., using such catalysts as tin(II)acetate or dibutyl tin diacetate. The hydroxyl-bearing compounds are preferred hydrophilic groups and include polyols containing from 2 to 8 hydroxyl groups, and especially those having a molecular weight in the range from 800 to 10,000. Exemplary polymeric polyols include for example, polyesters, polyethers, polythioethers, polyacetals. Hydrophillic polyfunctional carbodiimides containing hydrolyzable silane groups with polyfunctional carbodiimides, as is taught in U.S. Pat. No. 5,258,481.

Examples of suitable carbodiimide compounds used in the first coating composition are N,N'-dicyclohexylcarbodiimide, 1-ethyl-3-(3'-dimethylaminopropyl)carbodiimide, N-ethyl-N'-(3-dimethylaminopropyl)-carbodiimide, N'-diisopropyl-carbodiimide, N'N'-di-tert-butylcarbodiimide 1-cyclo-hexyl-3-(4-diethylaminocyclohexyl)carbodiimide, 1,3-di-(4-diethylaminocyclo-hexyl)carbodiimide, 1-cyclohexyl-3-(diethylaminoethyl)carbodiimide, 1-cyclohexyl-1-cyclohexyl-3-(2-morphonlinyl-(4)-ethyl)carbodiimide 1-cyclohexyl-3-(4-diethyl-aminocyclohexyl)carbodiimide, and the like. There are a variety of commercially available solvent soluble and water dispersible carbodiimides. Carbodiimide compounds are commercially available from Union Carbide Corp., USA under the UCARLNK® designation.

Amino resins are also curing components and refer to any material in the broad class of materials based on the reaction of formaldehyde with urea, melamine, benzoguanamine, or acetylguanamine. Such compounds are well known and described in, for example, "Kirk-Othmer Encyclopedia of Chemical Technology", $3^{rd}$ Ed. Volume 2, pages 440-469, Wiley-Interscience, 1978. Representative examples of such compounds include methylolated melamines; benzoguanamines; acetylguanamines; methylolated ureas such as dimethylolurea, dimethylolethyleneurea, tetramethylolacetylene urea, and dimethylolpropyleneurea; dimethylol derivatives of tetrahydro-5-alkyl-5-triazone; glyoxal resins such as dimethyloldihydroxyethyleneurea (DMDHEU) and tetramethylolglycoluril; methylated derivatives of any of the foregoing; and uron resins such as N,N'-bis(methoxymethyl)uron. Methylolacrylamide and methylolmethacrylamide are also included within the class of amino resins. Although the selection of particular amino resin is based on at least several considerations of coast, availability, ease of incorporation, cure kinetics, the choice is not critical in the practice of the invention. It is preferable to use water insoluble amino resins in aqueous compositions of the invention because they will have a longer shelf life.

The coating is applied in a carrier liquid. A carrier liquid can be either an organic solvent carrier, or water, predominantly, although minor amounts of one can be contained in the other for introducing materials, co-solvating, dispersing, such that, the carrier can comprise a minor proportion of solvent, or co-solvent along with a major proportion of water, as an example. The first coating composition is preferably applied to the intermediate elastomeric member 40 in the form of a solution using one or more organic solvent carriers. Examples of organic solvents useful in the first coating composition include ketones such as methylethyl ketone, methylisobutyl ketone, and diisobutyl ketone; acetates such as butyl acetate; toluene, xylene and their derivatives; nitropropane; and ethylene dichloride. The term solvent can be broadly defined as a carrier for the other components of the composition, wherein the solvent is capable of dissolving or maintaining the component in a substantially dispersed state or mixture.

The organic solvent of the first coating composition is typically utilized at about 70% to about 97% by weight of the total coating composition (solvent, functionalized HNBR, curing component and other optional components), and preferably from about 85% by weight to 95% by weight such that the coating composition has a total nonvolatile solids content ranging from about 3 to about 30% percent, and preferably from about 5 to about 15%.

An example of a further suitable procedure for preparing an aqueous based latex of a X-HNBR rubber is described in U.S. Pat. No. 4,826,721, herein incorporated by reference. The rubber component is dissolved in a solvent such as 3-chlorotoluene. An emulsifier such as abietic (rosin type) acid derivatives and dehydro abietic acid derivatives is also added. Water was also added to the composition. The composition was emulsified and subsequently the solvent is freed utilizing rotary evaporation, preferably under reduced pressure. X-HNBR latex is also available from Nippon Zeon of Japan. The aqueous latex coating compositions of the present invention generally have solids content 30 to 50 percent by weight.

Examples of organic solvents include, but are not limited to, any of the organic solvents listed above, and preferably methyl ethyl ketone, methyl isobutyl ketone, and methyl isopropyl ketone. The solvent, which can be a solvent mixture, preferably has a low water-solubility and optionally forms an azeotrope with water at a solvent content of more than about 50%, or a boiling point below about 95° C., and at least below the boiling point of water. The organic phase is emulsified in water by techniques known in the art using anionic, cationic, nonionic, or amphoteric emulsifiers or methyl cellulose. The aqueous organic solvent mixture is mixed under high shear and a phase inversion takes place wherein water becomes the continuous phase. The solvent is stripped off, typically by heating below the boiling point of water, and generally below 95° C. The curing component and additional components, if any, are added to the latex, preferably shortly before coating.

The first coating composition can be dried or cured to form substantially clear or transparent films when pigments are excluded. Alternatively, optional and preferred dyes or pigments can be readily incorporated. Colored coatings provided in accordance with the invention provide outstanding color and coating physical properties for long-term weathering uses. An extensive list of organic and inorganic pigments suitable for adding to rubber can be found in the current volume of the Rubber Blue Book, published by Lippincott & Peto Publications and well known to those versed in the art of formulating elastomers. As a brief overview, inorganic pigments such as iron oxide (rust red), chrome oxide (green), titanium dioxide or zinc oxide (white), ultramarine blue, and aluminum powder (silver) are used to make opaque coatings. As little as 1 phr carbon black is sufficient to color the coating black. Organic colors as typically use, can be incorporated for different coloring effects. The non-pigmented organic colorants leave the coating transparent but with a color or shade. These do not provide contrast on carbon-black pigmented elastomer substrates. In order for more intense coloration an organic pigment is combined with a higher opacity pigment. One to five parts by weight per 100 parts by weight of elastomer coating of titanium dioxide or two to 20 phr of aluminum powder works very well. Organic and inorganic pigments can be mixed into the solid polymer using a Banbury mixer or a two-roll mill. The rubber containing the pigment is then dissolved in the solvent. Alternatively, the pigment may be dispersed in the liquid solvent and then added to the solvated polymer blend. This is the preferred method for adding aluminum flakes.

Pigments can generally be defined as any substance that imparts color to another substance or mixture. When utilized within the application, the term pigment encompasses dyes, both natural and synthetic. Pigments can be inorganic and include metallic oxides, metal powder suspension, earth colors, lead chromates, and carbon blacks, or organic including those derived from animal sources, vegetable sources, or synthetic processes. The pigment should be in particle form and should have a mean particle size between about 0.1 and about 100 microns and preferably between about 0.2 and about 50 microns. The most preferred mean particle size for organic pigments is about 0.2 microns. The most preferred mean particle size for inorganic pigments is about 1 to 20 microns.

Examples of organic and inorganic pigments which can be used in this coating include but are not limited to iron blue zinc oxide, titanium dioxide, chrome yellow, carbon black, chrome orange, chrome green, zinc chromate, red lead, lethol red, azo type toners, phthalocyanines, aluminum hydrates, lakes, iron oxide, white lead, extenders, phosphotungstic acid toners, titanium-containing pigments, sulfur-containing pigments, aluminum oxide, lithopane, ultraphone, lead chromate, cadmium sulfide, cadmium selenide, barium sulfate, azo pigments, anthraquinone and vat pigments, phthalocyanine pigments, acrylamino yellow, magnesium oxide, chrome red, antimony oxide, zinc sulfide, magnesium fluoride and ground barytes. Benzoid pigments are useful and examples are toners and lakes. Examples of benzoid toners are yellow toners, e.g., benzoid yellows and Hansa yellows; organe toners, e.g., vat orange 3; red toners, e.g., napthol reds; violet toners; blue toners; green toners; brown toners; and black toners. Examples of benzoid lakes are yellow lakes, e.g., acid yellow 2; orange lakes; red lakes; violet lakes; blue lakes; e.g., acid blue 93; green lakes; brown lakes; and black lakes, e.g., natural black 3. Any desired color shade can be provided by mixtures in known proportions as is well known in the art. Metallic pigments can be used, of which many are known and available in powder or flake form, for example aluminum flakes and copper powder.

The functionalized HNBR coating is substantially clear and can be colored with substantially any kind or type of pigments. Any suitable amounts of pigments can be utilized to impart a desired color. In organic pigments such as the oxides or titanium dioxide and metal powders tend to make opaque coatings, while organic colors often leave the coating transparent but with a hue or color. In order to have a color show up on a black background such as with black rubber, opaque pigments are utilized along with organic pigments. Incorporation of the pigments into the composition of the first coating composition can be performed in a number of ways. Pigments can be mixed into solid polymer utilizing a banbury mixer or a two-roll mill. The rubber containing the pigment can then be dissolved in a solvent. Alternatively, the pigment may be dispersed in a carrier and then added to the solvated polymer blend. As is known, organic and inorganic pigments can be utilized in a wide range of effective amounts, and reference is made to the illustrated non-limiting examples below.

The first coating composition may contain other optional ingredients such as flatting agents, DNB, ZnO, and QDO, maleimides, antioxidants and particulate reinforcements. Specific examples of particulate reinforcements useful in the first coating include carbon black, precipitated silica, and fumed silica. Flatting agents, which are well known to the art, can be utilized in effective amounts to control the gloss of the cured coating and include, but are not limited to, silicates. The optional particulate reinforcement may be utilized in various amounts up to about 50 parts per 100 parts by weight of the functionalized HNBR.

The first coating composition may be prepared by simply mixing the ingredients by hand with a spatula or the like or by mechanical mixing or shaking. The first coating composition is typically applied to the elastomer 40 by dipping, spraying, wiping, brushing or the like, after which the coating is allowed to dry for a period of time typically ranging from about 30 minutes to 2 hours, preferably from about 45 minutes to 1 hour. The coating composition is typically applied to form a dry layer on the substrate having a thickness ranging from about 0.1 to 5 mils, preferably from about 0.5 to 1.5 mils.

The gloss of a cured coated substrate can be manipulated at least by utilizing different amounts of solvent, controlling the evaporation rate and/or incorporating various known pigments and/or flatting agents. It has been found that with respect to organic carrier-based coatings, a relatively quick or rapid evaporation produces a flatter or less glossy surface than a more prolonged cure rate. The cured coatings of the first coating can impart to a substrate a gloss generally from about 3% to about 70% at a 60 degree angle when measured using a Byk-Gardner Micro TRI Glossmeter per ASTM D-523 and D-2457. The desirability on the gloss will vary according to the use, with camouflage colors being desirable at low gloss levels and decorative coatings being desired at medium to high gloss levels. The resulting gloss of the cured first coating can be effectively controlled to produce a desired surface, finish, or appearance on a substrate.

The coating composition will cure within about 2 to 24 hours at room temperature. The cure can be accelerated by exposing the coating to elevated temperatures, but this is not required.

The first coating composition may be prepared by simply mixing the ingredients by hand with a spatula or the like or by mechanical mixing or shaking. The first coating composition can be applied to the intermediate elastomer 40 by dipping, spraying, wiping, brushing or the like, after which the coating is allowed to dry for a period of time typically ranging from about 5 minutes to 10 minutes, preferably 30 minutes to 2 hours, and more preferably from about 45 minutes to 1 hour. The coating composition is typically applied to form a dry layer on the intermediate elastomer 40 having a thickness ranging from about 0.1 to 5 mils, preferably from about 0.5 to 1.5 mils.

The coating composition will cure within about 2 to 24 hours at room temperature. The cure can be accelerated by exposing the coating to elevated temperatures, but this is not required. It should be appreciated by those having ordinary skill in the art that the entire elastomeric member 40 is preferably coated with the above-described first coating composition as it is desirable to coat the surface of the elastomeric member 40 to protect it from light, air, oil and solvent exposure. The coating preferably is a continuous coating in film form, which completely covers the intended surface of a substrate. The coating is sufficiently thick to completely cover the desired surface, but not overly thick to materially alter the mechanical properties of the substrate. Obviously, surfaces of the elastomeric member 40 that are not in contact with the same do not necessarily have to be coating.

The elastomeric surface or substrate to be coated may optionally be pretreated with a chlorinating agent such as sodium hypochlorite and hydrochloric acid. The use of various chlorinating agents to prepare elastomeric materials for application of a coating composition is well known in the art. One example of a chlorinating agent is commercially available from Lord Corporation under the tradename CHEMLOK 7701. The chlorinating agent may be applied to the surface of the elastomeric material by brushing, dipping, spraying, wiping, or the like, after which the chlorinating agent is allowed to dry. Chlorinating agents tend to be very volatile and typically dry within a matter of seconds or minutes.

Thus, the first coating composition is preferably resistant to fatigue over a broad operating temperature range, has the ability to form a tenacious bond to flexible elastomeric parts, resists degradation on long-term exposure to high temperatures, and provides for excellent adhesion to flexible elastomeric substrates. If necessary, the first coating composition also has the ability to form a tenacious bond to metal components affixed adjacent to the elastomeric part, such as the rigid nonextensible inner member 38 and the rigid nonextensible outer member 28.

The following examples are provided for purposes of illustrating the first coating composition and shall not be construed to limit the scope of the invention which is defined by the claims.

Example 1

The following example was prepared using Zetpol 2220, an X-HNBR polymer produced by Zeon Chemical having a 36% acrylonitrile content with 5 mol percent unsaturation. A suitable commercial substitute is Therban® KA 8889.

An elastomer coating solution was prepared as follows:

| Ingredient | Description | PHR |
| --- | --- | --- |
| X-HNBR | carboxylated hydrogenated nitrile-butadiene | 100.0 |

This formulation was dissolved in Methyl Isobutyl Ketone (MIBK, CAS No. 108-10-1) to a solids content of 12.0% by weight.

To 40 grams of solution, of bis-[isocyanatophenyl]methane (diisocyanate), 53% in xylene was added at 0.1 g, 0.5 g and 1.0 g levels. At 0.1 g. diisocyanate level, the solution cured at room temperature in less than 16 hours. At 0.5 g, the solution cured in 30 minutes.

To 40 grams of solution, 3-isocyanatopropyltriethoxysilane, CAS #24801-88-5, was added at 0.3, 0.7, 1.0, and 1.3 gram quantities. At all levels, the coating composition starts to cure within 45 minutes to one hour and is fully cured in less than 16 hours.

Fuel Resistance Testing

The coatings were tested on a 55 durometer natural rubber compound (A135Q) which had been treated with Chemlok® 7701. The coating was then compared against commercial fluorocarbon coating PLV-2100, and a commercial HNBR SPE XV coating taught according to U.S. Pat. No. 5,314,955 and an uncoated control.

When immersed in Jet A fuel for 24 hours at room temperature, the following volume % swell results obtained are:

| | |
| --- | --- |
| Control Uncoated | 192.9% |
| Control PLV 2100 | 0.1% |
| Control HNBR SPE XV | 33.6% |
| Example Coating with bis-[isocyanatopheny] methane | 2.2% |
| Example Coating with 3-isocyanatopropyltriethoxysilane | 2.3% |

Adhesion Testing

Rubber adhesion was tested by bonding two one-inch-wide strips together, and by pulling in a 180° peel. The rubber strips were made from a 55 durometer commercial natural rubber compound (A135Q) which had been treated with Chemlok® 7701. An approximate two-inch-long section was coated; each strip was placed in contact with each other and a 472 g weight applied to ensure intimate contact. The weight was left in place for ten minutes. After 8 days drying time, each strip was pulled apart in the Tinius Olsen® tensile tester. The following table records the results.

| Coating Type | Peel Results, Lbf |
| --- | --- |
| Control PLV 2100 | 2.03 |
| Control HNBR SPE XV | 8.52 |
| Example Coating with bis-[isocyanatopheny] methane | 15.5 |
| Example Coating with 3-isocyanatopropyltriethoxysilane | 21.1 |

Metal adhesion was tested in shear by bonding a one-inch wide rubber strip to a one-inch metal coupon with one square inch of overlap. The rubber strips were made from a 55 durometer natural rubber compound (A135Q) which had been treated with Chemlok® 7701. The metal coupons were 304 stainless steel. Stainless was chosen because it is known to be a difficult substrate to bond to. After coating, each was placed in contact with each other and a 472 g weight applied to ensure intimate contact. The weight was left in place for ten minutes. After 8 days drying time, each specimen was pulled apart in the Tinius Olsen tensile tester.

| Coating Type | Adhesion Results, psi |
| --- | --- |
| Control PLV 2100 | 16.78 |
| Control HNBR SPE XV | 19.23 |
| Example Coating with bis-[isocyanatopheny] methane | 18.2 |
| Example Coating with 3-isocyanatopropyltriethoxysilane | 18.5 |

Ozone Resistance

Ozone testing was done using a dynamic ozone test (ASTM-D3395) at 50 pphm ozone at 104° F.

Specimens were based on a 55 durometer commercial sulfur-cured natural rubber/polybutadiene blend protected with antiozonant wax and an alkyl-aryl phenylene-diamine antiozonant (M122N). Under dynamic conditions, it appears that the carboxylated hydrogenated coating is more effective as an ozone barrier than the HNBR coating SPE XV.

| Cracking initiated | |
| --- | --- |
| Control Uncoated | 6.5 hrs. |
| Control HNBR SPE XV | 6.5 hrs. |

Example 1 Coating with bis-[isocyanatophenyl]methane was uncracked at 28 hrs.

Example 1 Coating with 3-isocyanatopropyltriethoxysilane was uncracked at 28 hrs.

Besides having low adhesion values, the PLV 2100 coating cracks and delaminates from the rubber surface after flexing. Unpierced DeMattia flex specimens (made from a 55 durometer natural rubber compound) were coated with these same coatings and flexed in accordance with ASTM D-813. The PLV-2100 coating was severely cracked and delaminated, exposing the substrate in less than 4000 cycles. Both the baked HNBR SPE XV and Example 1 ran 80,000 cycles at which point the natural rubber substrate was cracked. There was no sign of delamination in either of the Example coatings.

Example 2

Demonstrating Solution Coating Gloss Control

A wide degree of gloss control of the functionalized HNBR coatings is obtainable with the present invention coatings. Parameters such as the amount of solvent and cure times can be varied to provide a desired gloss. The example below illustrates achievement in gloss control of the present invention.

Ten grams of X-HNBR polymer Therban KA-8889 from Bayer containing 10% by weight of N762 carbon black, from Cabot Corporation, was dissolved in various solvents. The solvent solution was sprayed onto a cured rubber sheet made from a blend of natural rubber and polybutadiene. After the coating was cured, the gloss was measured at 20°, 60°, and 85° angles using a Byk-Gardner Micro TRI Glossmeter per ASTM D-523 and D-2457.

| 10 grams polymer/black blend dissolved in the following solvents and cured with 1.2 grams bis[isocyanato phenyl] methane | 20° Angle | 60° Angle | 85° Angle |
| --- | --- | --- | --- |
| 200 g acetone | 0.5 | 5.9 | 12.5 |
| 185 g acetone, 8 g diisobutylketone (DIBK) | 1.6 | 14.2 | 20.6 |
| 180 g acetone, 20 g DIBK | 5.3 | 30.1 | 43.1 |
| 165 g acetone, 30 g DIBK | 24.9 | 69.6 | 71.6 |
| 10 grams polymer/black blend dissolved in the following solvents and cured with 1.2 grams bis[isocyanato phenyl] methane | 20° Angle | 60° Angle | 85° Angle |
| 180 g acetone, 20 g para-chlorobenzene trifluoride (PCBTF) | 9.7 | 51.1 | 59.7 |
| 150 g methylisobutylketone (MIBK) | 9.8 | 47.6 | 59.8 |
| 100 g acetone, 90 g methyl acetate | 3.8 | 27.3 | 37.7 |

Low gloss camouflage colors were produced by dissolving X-HNBR polymer containing carbon black, chrome green oxide or red iron oxide in acetone. The black version contains 10 parts by weight of N762 carbon black in 100 parts of Therban KA-8889 X-HNBR. The green version contains 30 parts by weight of chrome green oxide in 100 parts of Therban KA-8889 X-HNBR. The brown version contains 30 parts by weight of red iron oxide and 5 parts by weight of N990 carbon black in 100 parts of Therban KA-8889 X-HNBR.

| 10 grams polymer/color blend dissolved in 200 grams acetone and cured with 1.2 grams Casabond TX | 20° Angle | 60° Angle | 85° Angle |
| --- | --- | --- | --- |
| Camouflage black | 0.5 | 5.9 | 12.5 |
| Camouflage brown | 0.8 | 6.7 | 13.3 |
| Camouflage green | 0.4 | 3.3 | 9.3 |

As can be seen from the above examples, a large range of gloss can be produced by the coatings of the present invention. Many different desired glosses can be obtained in generally any desired color. It has been found that gloss of the coating can be increased by incorporating solvents which generally take longer to dry or evaporate. The most volatile solvent, acetone, produced the lowest gloss of the solvents tested. Importantly, as shown above substrates can be coated with the coatings of the present invention to have flat colors, such as camouflage.

Example 3

Functionalized HNBR Water Based Latex

Water based functionalized HNBR latexes were prepared according to the first coating composition. A 41% solids carboxylated-HNBR latex, 404EXPLTX005 also sold as Latex B from Zeon Chemical was utilized.

The following compositions were prepared.

| Components | Formula 1 | Formula 2 | Formula 3 | Formula 4 | Formula 5 | Formula 6 |
|---|---|---|---|---|---|---|
| 41% Solids X-HNBR latex | 100 grams | 100 grams | 100 grams | 100 grams | 100 grams | 100 grams |
| Diphenylmethane Diisocyanate prepolymer[1] (aromatic) | 1.25 grams | 2.5 grams | 5.0 grams | — | — | — |
| 1,6-Hexamethylene Diisocyanate based polyisocyanate[2] (aliphatic) | — | — | — | 2.5 grams | 5.0 grams | 7.5 grams |

[1] Desmodur ® XO 672
[2] Bayhydur ® 302 (I,6-HDI) available from Bayer Corporation DeMattia Flex specimens were sprayed with the latex/isocyanate combination as listed above. The DeMattia specimens were wiped with MIBK and treated with Chemlok® 7701, and the coating was applied to the specimens by spraying. All specimens ran 80,000 cycles with no signs of cracking or delamination. Adhesion is excellent.

Ozone testing was done using a dynamic ozone test (ASTM-D3395) at 50 pphm ozone at 104° F.

Specimens were based on a 55 durometer commercial sulfur-cured natural rubber/polybutadiene blend protected with antiozonant wax and an alkyl-aryl phenylene-diamine antiozonant (M122N). Observations were made at 2 hour intervals.

| | Time to observed edge cracking |
|---|---|
| A. uncoated control | 4.0 hrs. |
| B. coated with Chemisat ® LCH7302X, a non-functionalized HNBR | 2.0 hours |
| C. coated with Chemisat ® LCH7302X non-functionalized HNBR with 5.0 parts per hundred by weight of Bayhydur ® 302 (1,6-HDI)) | 4.0 hours |
| D. coated with Carboxylated HNBR 404EXPLTX005 | 10.0 hours |
| E. coated with carboxylated Latex 404EXPLTX005 with 5.0 parts per hundred by weight of I, 1,6-HDI | 22.0 hours |

Chemisat LCH7302X is an HNBR Latex currently produced by Zeon Chemical, formerly made by Goodyear Chemical Company.

Example 4

Coloration

The pigments may be in powder form as is the case for the green, blue and yellow powders or in a rubber dispersion as is the case for the red masterbatch. Suitable pigments are supplied by Akrochem Corporation. The Alglo® 400 and the aluminum paste 586 are supplied by Toyal America, Inc. and the Stapa® Metallux 214 is supplied by Eckart America L. P. Aluminum Paste 565 and Stapa® Metallux 2156 were also used. Both leafing and non-leafing aluminum pigments of varying particle sizes may can be used to obtain different visual effects. The compounded elastomers were each dissolved in solvent to 10% solids content. They were readily blended to many different color shades conventionally according to the known art of color matching. The pigments can also be blended in the initial rubber formulation. Various pastel shades of yellow and blue were made by adding titanium dioxide to the rubber mix.

| | 4I Pastel Yellow | 4J Pastel Blue1 | 4K Pastel Blue2 |
|---|---|---|---|
| Therban KA-8889 XHNBR | 100 | 100 | 100 |
| Titanium dioxide | 3.0 | 1.0 | 5.0 |
| Akrochem Yellow E-7415 | 5.0 | — | — |
| Akrochem 633 Blue | — | 5.0 | 5.0 |

A blend of copper conductive powder from Caswell with silver2 (Example 4F) gave a metallic gold color. Because the base coating is clear, other color effects such as pearlescent and fluorescent pigments can also be used.

| | 4A Green | 4B White | 4C Yellow | 4D Blue | 4E Silver1 | 4F Silver2 | 4G Silver3 | 4H Red |
|---|---|---|---|---|---|---|---|---|
| Therban ® KA-8889* | 100 | 100 | 100 | 100 | 100 | 100 | 100 | 100 |
| Akrochem ® E2557 green | 2.5 | — | — | — | — | — | — | — |
| Titanium dioxide | — | 5.0 | — | — | — | — | — | — |
| Akrochem ® Yellow E-7415 | — | — | 5.0 | — | — | — | — | — |
| Akrochem ® 633 Blue | — | — | — | 2.5 | — | — | — | — |
| Alglo ® 400 aluminum paste | — | — | — | — | 10.0 | — | — | — |
| Aluminum Paste 586 | — | — | — | — | — | 12.5 | — | — |
| Stapa ® Metallux 214 alum. paste | — | — | — | — | — | — | 10.0 | — |
| Akrosperse E-4686 Red EPMB | — | — | — | — | — | — | — | 16.0 |

*carboxylated HNBR from Bayer Ag.

Example 5

Control

A control example using a coating cured according to U.S. Pat. No. 5,314,741 of hydrogenated copolymer of acrylonitrile and butadiene in organic solvent using zinc-sulfur curing as taught therein was applied to a peroxide cured natural rubber substrate.

| Coating Composition | |
| --- | --- |
| Ingredient | Parts by Weight |
| HNBR | 100.00 |
| Zinc Oxide | 4.00 |
| Sulfur | 1.75 |
| ZMBT (2) | 2.00 |
| Zinc dibutyl dithiocarbamate | 0.75 |
| Total | 108.50 |

* Zinc 2-mercaptobenzothiazole accelerator

The ingredients except HNBR were mill mixed and then dissolved to a 10% solution in MIBK solvent. The coating composition was prepared by mixing the solid rubber on a two roll mill followed by dissolving HNBR in solvent. One inch wide specimens of sulfur-cured natural rubber sheet were washed with isopropyl alcohol prior to applying the coating composition. The coating composition was applied to the surfaces of the natural rubber substrate specimens. The coating thickness was approximately 1 mil dry. Two coated, uncured strips were placed together with the coated sides against each other. The coatings were dried for 24 hours at room temperature. Some of the specimens were baked in an oven for fifteen (15) minutes at 307° F. to cure the coatings. This gave as the product coated natural rubber tensile sheets having thereon coatings, approximately 2 mil thick and bonded together. The bonded specimens were pulled apart in peel and the force required to separate them was recorded.

| | |
| --- | --- |
| Uncured coating (dried but not baked) | 0.6 lbs peel strength |
| Cured coating (baked 15 minutes at 307 F.) | 1.9 lbs peel strength |

These adhesion levels are unacceptably low and not suitable for coating on elastomer substrates subjected to flexing.

Thus, in one embodiment the first coating is an ambient temperature curable coating and coated articles therefrom in a rubbery, high elongation, weatherable coating composition which can be applied to flexible elastomeric substrates for a variety of purposes. Preferred film forming polymers used in the composition provide resistance to ozone, oils and solvents, and other embodiments may be applied for the purposes of enhancing the cosmetic appearance of the substrate rubber. The first coating composition is resistant to long-term flex-fatigue and provides for excellent adhesion to flexible elastomeric substrates and exhibits in the cured state at least 100% elongation as an unsupported film.

Further the cured film forming polymer utilized has at least about 90% light transmissivity or transparency, contains no more than about 90% unsaturation in the cured state, and provides a matrix through which radiant heat reflective (emissive) and thermal transfer properties from the thermally conductive metal particulate filler can deflect and dissipate a significant amount of heat, while the coating adheres permanently and does not undergo stress or environmental cracking or embrittlement.

Another first coating composition comprises is described below.

Functionalized Film Former and Methods for Functionalizing

By hydrophobic is meant that at least 80% of the film forming polymer is derived from water insoluble monomers. Film formers exclude the polyoxyalkylene copolymers.

Functionalized elastomer film-formers used herein cure with the curing component by one or more reaction routes. Blends of two different functionalized film formers are suitable, each having the same or different type of functional groups on the polymer. For example, a blend of carboxylated hydrogenated nitrile butadiene and ethylene acrylic polymer will work. Salt forming reactions and condensation reactions can occur between the film forming polymer and curing component. The interaction between curing component and functional groups on the film forming polymer include electrophile-nucleophile interactions. Functional groups on the film former provide curing routes between the curing component and film forming polymer in addition to the curing of the polymer and curing component to itself and to the coated substrates. Functional groups on the film forming polymer can be provided, such as by copolymerization of a comonomer bearing a reactive group and in various methods to modify film forming polymers by incorporation of functional groups onto the polymer after polymerization.

The term "functionalized" means (1) that an electrophile, nucleophile, especially an active hydrogen-bearing moiety is part of an ethylenic unsaturated comonomer that is copolymerized, or (2) an electrophile, nucleophile and especially an active hydrogen bearing compound is part of a graftlinking compound or ethylenic unsaturated comonomer, which is graft-linked to a film former base polymer, after- or post-polymerization, (3) a group which is reactive to an active hydrogen group as part of a comonomer or graftlinking compound and graft-linked to the film forming base polymer, post-polymerization. The comonomer or grafted compound becomes ionically and/or covalently bonded to the film forming polymer structure, and provides a pendant group capable of reacting with the curing component which is coreactive therewith at ambient temperatures.

Conventional approaches for incorporation of an active hydrogen-bearing functional group or a co-reactive group therewith into a polymerized non-functional elastomer such as by converting a functional group-bearing compound into a suitable functional group precursor or the direct incorporation of a suitable precursor radical may be accomplished when the elastomer is in solution or in the molten state via the "Ene" reaction, whereby an allylic hydrogen transfer to an enophile followed by coupling between two unsaturated termini occurs, or via free-radical addition across a carbon-carbon double bond. When the polymer is in the molten state, however, means capable of imparting high mechanical shear, such as an extruder, will be used to effect the desired reaction to incorporate the functional group to be converted or to directly incorporate a suitable precursor radical. When the functional group to be converted to a suitable precursor or the precursor radical incorporated directly is incorporated via techniques such as metallation followed by reaction with a suitable electrophile, on the other hand, incorporation will, preferably, be accomplished with the polymer in solution.

Of the several methods available for incorporation of a functional group or functional group precursor, those methods tending to incorporate a single functional group or functional group precursor unit at each site of incorporation with minimal coupling of the elastomer polymer such as the ENE reaction and the method involving metallation followed by reaction with an electrophile are preferred. When a functional group to be converted to a suitable precursor is incorporated into the elastomer, conversion of the functional group to the precursor radical will also, generally, be accomplished with the polymer in solution. In general, any of the solvents known to be useful for preparing such elastomer polymers in solution may be used to effect these reactions or conversions.

A variety of post-polymerization functionalization techniques are known which provide modification of a non-functional addition polymer with nucleophilic, or electrophilic crosslinking cure sites for use in the present invention. Hydroxyl groups are useful functional groups for effecting the crosslinking reactions with curing components used herein. U.S. Pat. No. 4,118,427 discloses hydroxyl-containing curable liquid hydrocarbon prepolymers by ozonizing a high molecular weight saturated hydrocarbon polymer such as polyisobutylene or ethylene-propylene rubber, followed by reducing the ozonized material; e.g., by using reducing agents such as diisobutyl aluminum hydride, to form the hydroxyl-containing polymer.

A partial listing of nucleophilic and/or active hydrogen functional groups that can be incorporated on the film forming polymer that are coreactive with electrophilic group-substituted curing components or hydrolyzable groups are, hydroxy-, mercapto-, isocyanato-, amino-, phenolic-, and carboxyl-groups. Exemplary electrophilic groups incorporated on the film former and coreactive with nucleophilic group-substituted curing components are alkyl halide-, benzyl halide-, allyl halide-, ester-, ethers-, anhydride-groups, and the like. When the film forming polymer contains a pendant nucleophilic group, the corresponding group provided on a group bonded to or through at least one valency of the silicone atom of the silane curing component can also include an alkoxy-, hydroxy-, mercapto-, isocyanato-, amino-, phenolic-, glycido-, carboxyl-, oxirane-, benzyl halide-, allyl halide-, alkyl halide-, ester-, ethers-, and/or anhydride-group.

(A) Functionalized Comonomers

The curable film forming polymer employed herein can be formed by copolymerization of elastomer-forming monomers together with functionalized comonomers or by reaction of a polymer with a functional group containing monomer or reactive compound. The incorporated reactive group subsequently cures the polymer by reaction of the curing component as described herein. The curing method utilizes reactions of a crosslinking component with an active hydrogen-bearing functional group or active hydrogen reactive group which crosslinks with the corresponding reactive functional group on the copolymer or pendant on the copolymer. It is convenient to introduce a functional group bearing comonomer during polymerization of the film former polymer, as is conventionally practiced. The various approaches of free radical addition copolymerization, anionic addition polymerization, free-radical graftlinking, metathesis grafting, and hydrolytic grafting are known in the art. The functional group containing polymers, or copolymers include polymers characterized by their major constituents, such as α-olefin elastomers, diene elastomers, hydrogenated diene elastomers, fluoroelastomers, crosslinkable α-olefin copolymer elastomers, acrylic rubber, acrylate or methacrylate acrylate copolymers, and ethylene-carboxylates, etc.

Preferred examples of rubbery copolymer elastomers include but are not limited to anionic polymerized olefinic elastomers. Examples of anionic polymerized olefinic rubbers include ethylene-propylene rubber, ethylene-propylene-diene monomer rubber, polyisobutylene, or "butyl rubber", or any other polymer of isoolefin optionally copolymerized with conjugated diene (such as isoprene), optionally containing up to 30 wt. % or an α,β-ethylenic unsaturated nitrile and/or styrenic comonomer (such as styrene and/or alkyl substituted styrene), and the like. Particularly preferred elastomers include isobutylene-isoprene copolymer, isobutylene-paramethylstyrene copolymer and the like.

A suitable pendant active hydrogen functional group is provided by methods for forming amine-functionalized ethylene propylene diene monomer rubber (EPDM) by the process described in U.S. Pat. No. 4,987,200. Likewise higher molecular weight isobutylene copolymers functionalized with hydroxyl groups can be produced using the process described in EPA 325 997. Furthermore any commercially available halogenated isobutylene based polymer containing a low level of halogen typically 0.5 to 2.0 mole % can be combined with an alkylamine or an amino alcohol to produce the amine or the hydroxyl functional group respectively.

Functionalized elastomers having an weight average molecular weight of 1000 up to 200,000 and containing hydroxyl and/or amine functional groups are known. Hydroxy terminated polyisobutylenes are conventionally prepared by introducing hydroxy groups into the terminal positions of cationically polymerized isobutylene by dehydrochlorinating, hydroborating and oxidizing chloro-terminal polyisobutylene. Chloro terminated polyisobutylenes obtained by cationically polymerizing an isobutylene monomer are known. See Faust and Kennedy in, "Living Carbocationic Polymerization: III. Demonstration of the Living Polymerization of Isobutylene," Polym. Bull. 15:317-23 (1986), disclosing living carbocationic polymerization of isobutylene and quenching the living recipe with methanol and other reagents such as amines.

Living polymerization methods, some of which are described in U.S. Pat. Nos. 5,350,819; 5,169,914; and 4,910,321 are preferred techniques to form the film forming polymer. General conditions under which living polymerizations can be achieved, for example using isobutylene include: (1) an initiator such as a tertiary alkyl halide, tertiary alkyl ether, tertiary alkyl ester, or the like; (2) a Lewis acid co-initiator which typically comprises a halide of titanium, boron or aluminum; (3) a proton scavenger and/or electron donor; (4) a solvent whose dielectric constant is selected considering the choice of the Lewis acid and the monomer in accord with known cationic polymerization systems and monomer.

Terminal Functional Film Forming Polymers

Electrophilc groups, nucleophilic groups, groups characterized by bearing an active hydrogen group or groups reactive with active hydrogen groups can be incorporated at the terminus of film former polymers which are useful herein. Terminal groups coreactive with active hydrogen groups on a curing component are useful. These film forming polymers are prepared by known methods.

U.S. Pat. No. 5,448,100 discloses sulfonated telechelic polyisobtuylene prepared by the "inifer" (initiator-transfer agents) initiated carbocationic polymerization of isobutylene with Lewis acid to form polymer, followed by end-quenching with acetyl sulfate and precipitation by steam stripping or with methanol, ethanol, isopropyl alcohol, or acetone. The polymerization preferably occurs in a chlorinated solvent, most preferably in a mixture of solvents, such as methylene chloride, methyl chloride, or an aliphatic or alicyclic compound containing five to ten carbon atoms. The Lewis acid can be, for example, boron trichloride or titanium tetrachloride, or other metal halide (including tin tetrachloride, aluminum chloride, or an alkyl aluminum). End-quenching preferably occurs at a temperature between −90° to 0° C., and most preferably at the polymerization temperature or at the decomposition temperature of the complex. The molar ratio of polyisobutylene to acetyl sulfate is preferably 1:1 or greater.

Another example providing a film former polymer, such as polyisobutylene with terminal active hydrogen groups reactive with a curing component is a terminal silane group bearing a hydroxy or alkoxy group or other hydrolyzable group. These can be obtained by a known route of dehydrohalogenating a terminal tertiary carbon-chlorine group followed by an addition reaction with an ethylenic unsaturated silane. The reaction of a polymer having a terminal tertiary carbon-chlorine bond with allyltrimethylsilane provides a polyisobutylene having an unsaturated group terminally and subsequently reacted with a hydrosilane compound by using a platinum catalyst.

As the hydrosilane compound, there can be mentioned halogenated silanes such as trichlorosilane, methyldichlorosilane, dimethylchlorosilane, phenyldichlorosilane; alkoxysilanes such as trimethoxysilane, triethoxysilane, methyldiethoxysilane, methyldimethoxysilane, phenyldimethoxysilane, etc.; acyloxysilanes such as methyldiacetoxysilane, phenyldiacetoxysilane, etc.; and ketoximate silanes such as bis(dimethylketoximate)methylsilane, bis(cyclohexylketoximate)methylsilane, etc. Among these, halogenated silanes and alkoxysilanes are preferred.

Such production processes are described, for example, in Japanese Kokoku Publication Hei-4-69659, Japanese Kokoku Publication Hei-7-108928, Japanese Kokai Publication Sho-63-254149, Japanese Kokai Publication Sho-64-22904, and Japanese Patent Publication 2539445.

(i) Diene Elastomers

Functionalized hydrogenated diene copolymers suitable for use herein as the film forming polymer are solid phase, high polymers having a molecular weight of about 50,000 and higher, more typically 200,000 to 500,000, and contain no more than 10% conjugated diene segments by weight. These polymers are distinguished from liquid, functionalized oligomers, such as reactive terminal-group functional liquid polymers, e.g., ATBN and CTBN that are not suitable as the sole film former polymer herein but are blendable with a higher molecular weight film forming polymer (50,000 and higher). The unsaturated functionalized polymer for preparing the hydrogenated coating polymer comprises broadly, from 50 to 85 percent by weight of conjugated diene monomer units, 5 percent to 50 percent by weight one or more non-conjugated, ethylenically unsaturated monomer units, and 1 to 20 percent by weight of a functional comonomer or graft-linked compound bearing a reactive crosslinking site. The preferred conjugated diene monomer units are derived from 1,3-butadiene monomer, and the non-conjugated ethylenically unsaturated monomer units are derived from one or more ethylenically unsaturated monomers selected from unsaturated acrylic esters, methacrylic esters, nitriles such as acrylonitrile and methacrylonitrile, and monovinyl aromatic hydrocarbons such as styrene and alkylstyrenes, and vinylidene comonomers. Divinyl aromatic hydrocarbons such as divinyl benzene, dialkenyl aromatics such as diisopropenyl benzene are preferably absent. Other comonomers include alkyl(meth) acrylates such as methyl acrylate, methyl methacrylate, ethyl acrylate, butyl acrylate, 2-ethylhexyl acrylate or methacrylate, vinylpyridine, and vinyl esters such as vinyl acetate. The preferred functional comonomers are selected from unsaturated carboxylic acids and esters thereof such as acrylic acid, methacrylic acid, crotonic acid, itaconic acid, and maleic acid. The preferred glass transition temperature of functionalized diene elastomer film formers must not exceed 0° C., and preferably is less than −25° C. in order to provide flex-cracking/flex-fatigue resistance in the coating.

Carboxyl end groups can be formed on diene elastomer high polymers containing —C—CH═CH—C— type unsaturation by a chain scission methods in which a rubber ozonide is formed, and aldehyde end groups are oxidized to carboxyl groups using peroxide or peracid. Alternatively hydroxyl end groups on the rubber ozonide can be formed by reductive techniques by catalytic hydrogenation or by reducing agents like metal hydrides or borohydrides, and the like. See for example British Patent No. 884,448 Likewise, U.S. Pat. No. 4,118,427 discloses liquid hydroxyl-containing curable liquid hydrocarbon prepolymers by ozonizing a high molecular weight saturated hydrocarbon polymer such as polyisobutylene or ethylene-propylene rubber, followed by reducing the ozonized material; e.g., by using reducing agents, preferably diisobutyl aluminum hydride, to form the above-noted hydroxyl-containing liquid prepolymers having a substantially lower molecular weight than the parent polymer.

Incorporation of mercapto alcohol, or marcaptocarboxylates as functionalized grafting compounds is readily adaptable for use in the present invention. Suitable hydroxymercaptans and/or mercaptocarboxylic acid esters containing hydroxyl HS—R—OH compounds include those where R is a linear, branched or cyclic $C_1$-$C_{36}$ alkyl group which can optionally be substituted by up to 6 further hydroxyl groups or can be interrupted by nitrogen, oxygen or sulfur atoms. Mercaptocarboxylates include HS—$(CHR_2)_n$—$(C(O)OR_3 OH)_m$ wherein $R_2$ is hydrogen or a $C_1$-$C_6$ alkyl group, $R_3$ is a linear, branched or cyclic $C_2$-$C_{36}$ alkyl group which can optionally be substituted by up to 6 further hydroxyl groups or can be interrupted by nitrogen, oxygen or sulfur atoms, n is an integer from 1 to 5 and m is an integer from 1 to 2. The hydroxyl groups are preferably primary.

Preferred hydroxymercaptans are mercaptoethanol, 1-mercapto-3-propanol, 1-mercapto-4-butanol, α-mercapto-ω-hydroxyoligoethylene oxides, e.g., α-mercapto-ω-hydroxyoctaethylene glycol, or the corresponding ethylene oxide/propylene oxide copolyethers. Mercapto-ethanol and α-mercapto-ω-hydroxyoligoethylene oxides are preferred. Preferred mercaptocarboxylic acid esters containing hydroxyl groups are esters of mercaptoacetic acid, mercaptopropionic acid and mercaptobutyric acid with ethylene glycol, propylene glycol, butylene glycol, diethylene glycol, triethylene glycol, tetraethylene glycol, octaethylene glycol, dipropylene glycol, tripropylene glycol, tetrapropylene glycol and N-methyldiethanolamine. The corresponding esters of mercaptoacetic acid and 3-mercaptopropionic acid are particularly preferred. Suitable types of elastomer film former base polymers reacted with the mercapto compound include polymers of isobutylene, chloroprene, polybutadiene, isobutylene/isoprene, butadiene/acrylonitrile, butadiene-acrylate copolymers, S—B copolymers, butadiene-vinylidene chloride-acrylate type copolymers. Methods for incorporation of mercapto compounds are described in U.S. Pat. No. 6,252,008 incorporated herein by reference and suitable for use as the functional film former polymer herein. The rubber contains in the region of 0.1 to 5 wt. % of bonded hydroxyl groups. The molecular weight of the solution polymerized diene rubber containing hydroxyl groups incorporated according to the method of U.S. Pat. No. 6,252,008 should lie in a range that dilute solutions of 5 to 15% solids can be obtained and be sprayable, brushable or dippable, such as from 10,000 to 200,000 Mn (gel permeation chromatography).

There are other known approaches for incorporating OH groups into the suitable film forming polymers used herein, such as by addition reactions with formaldehyde, reaction with carbon monoxide followed by hydrogenation, and hydroboration followed by hydrolysis and copolymerization using silanes containing an ethylenic unsaturated group. Representative silane comonomers include vinylsilane or allylsilane having a reactive silicon group, of which there may be mentioned vinyltrichlorosilane, vinylmethyldichlorosilane, vinyldimethylchlorosilane, vinyldimethylmethoxysilane, divinyldichlorosilane, divinyldimethoxysilane, allyltrichlorosilane, allyl methyldichlorosilane, allyldimethylchlorosilane, allyidimethylmethoxysilane, diallyldichlorosilane, diallyldimethoxysilane, γ-methacryloyloxypropyltrimethoxysilane, and γ-methacryloyloxypropyl methyldimethoxysilane.

The functionalized diene elastomer will be described as follows with respect to the most preferred embodiment for organic solvent-based coating embodiments of the present invention as a functionalized butadiene acrylonitrile copolymer but applies equally to preparation of the myriad other suitable functionalized diene copolymers in light of the teachings herein. Nitrile elastomers offer beneficial characteristics such as low temperature flexibility, oil, fuel and solvent resistance as well as good abrasion and water-resistant qualities, making them suitable for use in a wide variety of coating applications in accordance with the invention.

The present invention is most preferredly carried out with a functionalized hydrogenated nitrile rubber. The functionalization of HNBR with reactive functionality provides critical enabling methods for crosslinking the coating composition and obtaining the essential level of adhesion to the elastomer substrates. Without adequate adhesion to the elastomer substrate, coatings exhibit premature flex-cracking and/or delamination. The functional groups for HNBR can be generally classified as containing active hydrogen groups, ethylenic unsaturated groups or hydrolyzable groups. Crosslinking can be effected through the addition of crosslinking components mentioned herein, by exposure to moisture, heat (infra-red, thermal), by UV radiation, or by e-beam radiation, depending on the reactive functionality incorporated into the diene copolymer. Some functionalized HNBR embodiments mentioned herein below are self-curing without added crosslinker, and all can be cured with suitable crosslinking components added to the functionalized HNBR such as but not limited to dinitrosobenzene, ZnO, gamma-POM, resoles, multifunctional amine, isocyanates, acrylates, dicyandiamide, dicarboximides, and formaldehyde (or UF, MF) resins.

As another example, a functionalized HNBR can be prepared by a variety of ways known in the art. Functional groups can be incorporated by the use of functional-group-containing comonomers, or by the use of graft-linkable, functional-group-bearing compounds, and by functionalization of NBR using metathesis, followed by hydrogenation of the modified NBR to give functionalized HBNR or reaction of NBR with methylolated phenols followed by hydrogenation of the modified NBR to give functionalized HBNR.

Functionalized HNBR containing active-hydrogen bearing functional groups are preferred crosslinkable film formers in the curable emissive coating composition. The presence of unsaturated groups (i.e., vinyl and disubstituted olefins, nitriles) in the NBR provides reactive sites in which reactive functionality may be attached and used for further crosslinking, post-polymer functionalization, and grafting reactions. These reactive sites can be modified through either catalytic or non-catalytic chemistries. Such modification can introduce any number of active-hydrogen functional groups such as epoxides by epoxidation of olefinic sites. Epoxides are readily converted to other functional groups through ring-opening reactions. For example, glycols are produced by ring-opening with base, glycol ethers with alkoxides or phenoxides, alcohols with carbanions or hydrides. In addition, epoxides serve as crosslinkable sites using chemistry available to one skilled in the art. Many other functional groups may be introduced by reaction of the backbone olefins: hydroformylation (aldehydes, alcohols, carboxylic acids), hydrocarboxylation (carboxylic acids), hydroesterification (esters), hydrosilylation (silanes), hydroamination (amines), halogenation (halogens), chlorosulfonylation (chlorine, sulfonic acids), hydroboration (boranes, alcohols, amines). Examples of such transformations have been reviewed by Tremont (McGrath, M. P.; Sall, E. D.; Tremont, S. J. "Functionalization of Polymers by Metal-Mediated Processes," Chem. Rev. 1995, 95, 381). The nitrile group of NBR elastomers also can be converted to an amide by reaction with alcohols in an acid catalyzed process and to carboxylic acids through hydrolysis.

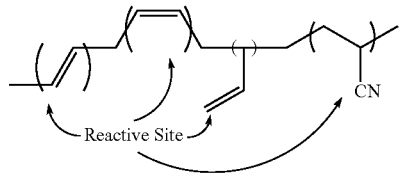

Crosslinking can be effected through the addition of a crosslinking component, moisture, thermal, UV radiation, or e-beam radiation. Depending on the reactive functionality attached to HNBR and its intended use, suitable crosslinking components can be added to the functionalized HNBR such as dinitrosobenzene, ZnO, gamma-POM, resoles, multifunctional amine, isocyanates, acrylates, and dicyandiamide. Particularly preferred crosslinking components are those components known in the art for obtaining good bonds to elastomeric articles. These components include DNB, ZnO, and QDO and can be added to enhance the adhesion of the functionalized HNBR to a wide variety of elastomeric materials.

The reactive functionality incorporated onto the diene elastomer, includes, as non-limiting examples, phenolic OH, aliphatic OH, amine, isocyanate, epoxy, acrylate, silyl ethers, silyl chlorides, anhydrides, maleimides, and Diels-Alder dieneophiles among the aforementioned functional groups.

The appropriate curing components and aids for the curing reactions are well-known in the prior literature and patents in the adhesive and coating area for curing. For example, when the functional group on the polymer is phenol, then isocyanate, dicarboximide, formaldehyde source, and resoles are suitable curing components that are useful for crosslinking the phenol-functionalized HNBR. Likewise, amine functionalized HNBR can be crosslinked using isocyanate or dicarboximide, formaldehyde source, and resoles, as examples. Epoxy functionalized HNBR can be crosslinked and cured with appropriate amines and dicyandiamide components, as is known in the art of Epoxy adhesive and coatings. Isocyanate functionalized HNBR is of particular interest because it can be crosslinked or cured by moisture or by the addition of other curative agents such as amine or polyols. Incorporation of the isocyanate as part of the HNBR is particularly desirable because it reduces that amount of free monomeric and therefore volatile isocyanate and its reported health and safety issues. A latent isocyanate functionalized HNBR can be prepared by reaction of an amine functionalized HNBR (or NBR) with a diaryl carbonate to give a urethane functionalized HNBR (or NBR). Thermal cracking of the urethane forms the isocyanate functionalized HNBR (or NBR) (For example, see: Kothandaraman, K.; Nasar, A. S. "The Thermal Dissociation of Phenol—Blocked Toluene Diisocyanate Crosslinkers", J. M. S.—Pure Applied Chem. 1995, A32, 1009; Wicks, D. A.; Wicks, Z. W. "Blocked Isocyanates III: Part A. Mechanisms and Chemistry", Progress in Organic Coatings 1999, 36, 148; Mohanty, S.; Krishnamurti, N. "Synthesis and Thermal Deblocking of Blocked Diisocyanate Adducts," Eur. Polym. J. 1998, 34, 77). Anhydride functionality on the film forming polymer can link to amine functional curing components. Silyl ether and chlorosilanes can be utilized in other embodiments to crosslink the film forming polymer.

Exemplary details of the aforementioned graft methods for incorporating functional groups on a film forming elastomer is the melt processing of molten film forming elastomer with a polyfunctional graftlinkable material such as polyfunctional acrylate, maleated polybutadiene, and metal salts of difunctional acrylates. For example an olefin elastomer such as EPDM can be masticated on a two roll mill, with 5 parts of an acid scavenger such as zinc oxide, 1 part stearic acid, an antioxidant and a peroxide followed by addition of 5 to 10 parts of a multi-ethylenic unsaturated compound such as trimethylolpropanetriacrylate, maleated liquid polybutadiene, or zinc diacrylate to the flux roll.

Functionalized HNBR can be prepared by the aforementioned metathesis, followed by hydrogenation of the modified NBR to give functionalized HNBR and (2) the reaction of NBR with methylolated phenols followed by hydrogenation of the modified NBR to give functionalized HNBR.

A novel method for incorporating a reactive pendant functional group, such as a carboxy, anhydride, hydroxy functionality is provided on a NBR elastomer as follows:

Direct functionalization of any suitable unsaturated film former polymer usable herein, and especially NBR, and is accomplished through the use of olefin metathesis chemistry. Here, the olefin C=C double bonds are reacted with a catalyst and a monomer. The olefin metathesis catalyst must be capable of catalyzing metathesis reactions in the presence of nitrile functional groups. The monomer can be any cycloolefin, olefin, or α,ω-diene that is capable of undergoing an olefin metathesis reaction (e.g., ring-opening metathesis polymerization [ROMP], cross-metathesis, ring-opening-cross-metathesis, and acyclic diene metathesis polymerization [ADMET]). These monomers are derivatized with groups bearing functionality (e.g., carboxylic acids, amides, esters, anhydrides, epoxy, isocyanate, silyl, halogens, Diels-Alder diene and dienophiles, etc.) to provide cure sites for secondary crosslinking reactions of the cured film or to give new properties to the polymer. Kinetically, the metathesis catalyst will likely attack the vinyl C=C bonds first, however, their low levels in the HNBR copolymer may make attack at the backbone C=C double bond competitive. Such attack on the backbone unsaturation will likely cause a drop in molecular weight of the NBR, but the extent of such a process can be minimized by using high NBR-to-catalyst levels. After reduction of the modified NBR using for example the aforementioned catalytic hydrogenation methods, a reactive modified HNBR polymer is obtained. The polymer can be crosslinked using moisture, a selected curing agent, or an external energy source (UV or e-beam). One particular preferred advantage of metathesis catalysis is that it provides a unique means of introducing reactive functionality into NBR under mild conditions in water or in solvent. So even NBR latex can be modified with reactive functionality without de-stabilizing the latex through metathesis catalyst. This feature allows the functionalization of a variety of commercially well known NBR polymers, in solution or as aqueous dispersions, and latexes (water-based polymerizate), followed by hydrogenation to yield functionalized HNBR.

Hydrogenated Protic Group Terminated Diene Polymers

Hydrogenated hydroxy or carboxy terminated diene polymers, alone, or in blends with high molecular weight (10,000 Mn and above) film forming polymers are also suitable as a curable film former used in the emissive coating of the present invention. Substantially saturated polyhydroxylated polydiene polymers are known and commercially available. These represent anionic polymerized conjugated diene hydrocarbons, such as butadiene or isoprene, with lithium initiators, and terminated with OH groups. The process steps are known as described in U.S. Pat. Nos. 4,039,593; Re. 27,145; and 5,376,745, all of which are hereby incorporated by reference for their disclosure of preparing polyhydroxylated polydiene polymers. Such polymers have been made with di-lithium initiator, such as the compound formed by reaction of two moles of sec-butyllithium with one mole of diisopropylbenzene. Such a polymerization of butadiene has been performed in a solvent composed of 90% by weight cyclohexane and 10% by weight diethylether. The molar ratio of di-initiator to monomer determines the molecular weight of the polymer. The polymer is capped with two moles of ethylene oxide and terminated with two moles of methanol to produce the dihydroxy polybutadiene. The hydroxylated polydiene polymer is hydrogenated where substantially all of the carbon to carbon double bonds become saturated. Hydrogenation has been performed by those skilled in the art by established processes including hydrogenation in the presence of such catalysts as Raney Nickel, noble metals such as platinum and the like, soluble transition metal catalysts and titanium catalysts as in U.S. Pat. No. 5,039,755. Suitable polyhydroxylated polydienes are those available from Shell Chemical Company in the U.S.A. under the trade designation of KRATON LIQUID® POLYMERS, HPVM 2200 series products, and from ATOCHEMIE under the PolyBD® mark. The high molecular weight polymers suitable in blends with the hydrogenated hydroxyl butadiene polymers are not limited, and include for example the aforementioned carboxy modified chlorinated polyethylene, chlorinated polyethylene, polymers of epichlorohydrin, ethylene-acrylic copolymers, SBR, SBS, nitrile rubber (NBR), SIBS, EPDM, EPM, polyacrylates, halogenated polyisobutylene, and polypropylene oxide, among others mentioned herein, and known. The weight proportion of liquid hydrogenated polybutadiene polyol to high molecular weight film former is limited such that the percent of unsaturation in the combination is less than 20%, preferably less than 10% overall. Therefore, where mixtures of the hydrogenated polydiene polyol are made with unsaturated high polymers ($M_n$>50,000) such as SBR, NBR, and the like, the proportion of unsaturated polymer will be limited to maintain the overall degree of saturation of at least 80%, preferably at least 90%. Modified chlorinated polyolefins can include those modified with an acid or anhydride group. Some examples of modified chlorinated polyolefins are described in U.S. Pat.

Nos. 4,997,882 (column 1, line 26 to column 4, line 63); 5,319,032 (column 1, line 53 to column 2, line 68); and 5,397,602 (column 1, line 53 to column 2, line 68), hereby incorporated by reference. The chlorinated polyolefins preferably have a chlorine content of from about 10 to 40 weight percent, more preferably from about 10 to 30 weight percent based on the weight of starting polyolefin. One suitable example of a modified chlorinated polyolefin is the modified chlorinated polyolefin that has a chlorine content of from about 10 to about 30 weight percent based on the weight of polyolefin, which is not neutralized with an amine, and has an acid value in the range of about 50 to about 100.

Hydrogenated Block Copolymers

Suitable film formers adaptable according the invention are hydrogenated styrene-butadiene-styrene block copolymers, hydrogenated styrene-isoprene-styrene block copolymers, which are modified according to methods disclosed herein above, adapted for chlorinated polyethylene, and elsewhere provide cure functionality on the block copolymer for interaction with the curing agent. Some elastomeric block copolymers containing carboxyl groups are available commercially. Those block copolymers which contain more than 20% unsaturation can be hydrogenated according to known hydrogenated methods, including methods referenced herein.

Phenol Functional Elastomer

Functionalization of HNBR with phenol functionality can be carried out by the combination of a methylolated phenol and the NBR, followed by hydrogenation of the phenol-modified NBR intermediate. Methylolated phenols can form covalent bonds with NBR and NBR copolymers by a variety of chemical reactions as reported in the literature [A. Knop and L. Pilato, "Phenolic Resins Chemistry and Applications and Performance" Springer-Verlag, New York 1985, Chapter 19 pg 288-297].

Various known isocyanate-reactive functional groups can be incorporated in a functionalized elastomer film forming polymer. The aforementioned carboxy-functional, hydroxy-functional and amine functional elastomers are most readily adaptable. Functional comonomers, like carboxy-functional comonomers are readily adaptable to form a copolymer of carboxylated hydrogenated nitrile rubber. For the purposes of the present invention, the functionalized hydrogenated nitrile rubber can be defined as a polymer comprising at least one diene monomer, nitrile monomer, and a functional group-bearing compound such as a comonomer or a graftlinking compound containing a functional group or a combination thereof. When the abbreviation HNBR is utilized herein, it is to be understood that the term refers to rubbers which can include diene monomer other than 1,3 butadiene, and comonomers other than acrylonitrile, unless specifically stated. It is also important to note that additional monomers can be polymerized along with or grafted to the diene monomer to form the functionalized HNBR. The additional monomers can, for example, provide at least one functional group to facilitate crosslinking.

Functionalization of HNBR with phenolic functionality can be carried out with the unsaturated un-hydrogenated polymer, or a partially hydrogenated XHNBR polymer (80-97% hydrogenation level) by addition of methylol phenol or ether derivative under heat and optionally catalyzed by suitable Lewis acid. Preferably an ether blocking group is provided on the methylol phenol compound, facilitating ease of post reaction hydrogenation. Addition can be through the nitrile or carboxyl groups by ester formation, or by way of the aforementioned addition at allylic sites. Preferably a metathesis reaction of an ethylenic unsaturated compound bearing a phenol group can be done in solvent or water. Alternatively, an olefinic bearing methylolated phenyl ether or phenol can be metathesized with NBR, followed by hydrogenation. The phenol functionalized NBR is subsequently hydrogenated. A methylolation reaction can be undertaken using a phenol functional NBR or HNBR with formaldehyde to generate a methylolated phenol functionality in the NBR, or with HNBR. The following structural diagrams illustrate functionalizing with a representative phenolic bearing compound.

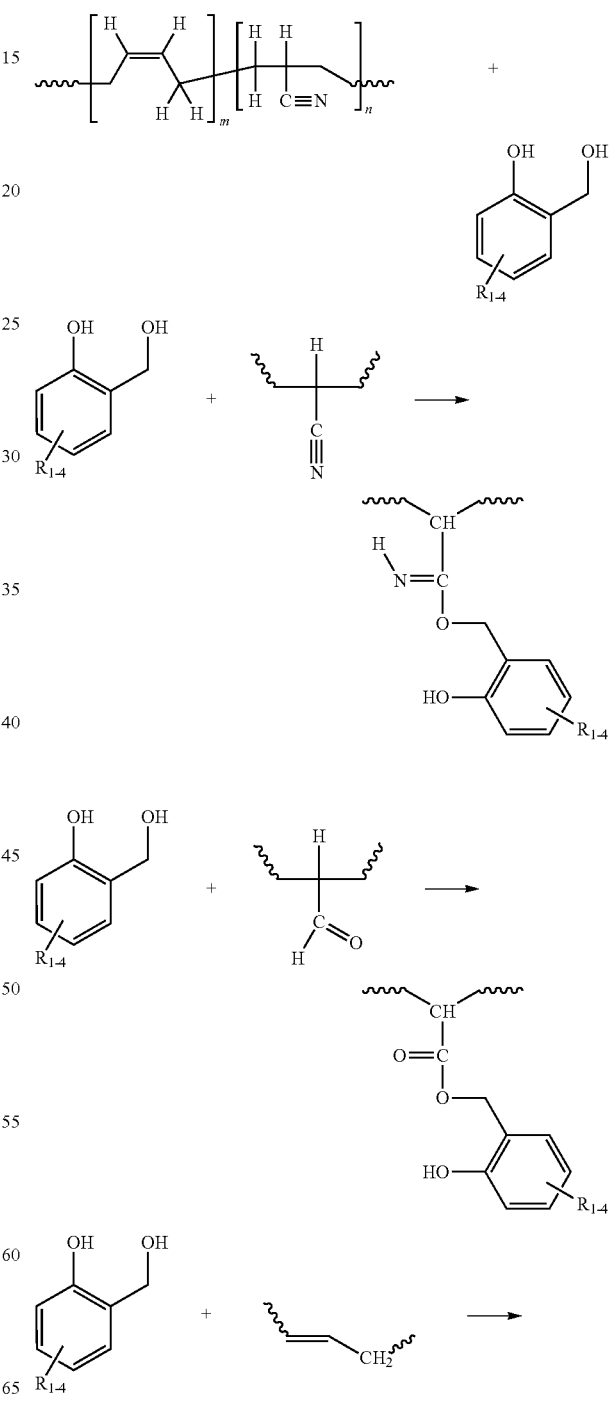

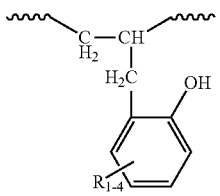

While it is possible to combine any methylolated phenol with NBR, mono-methylolated phenols are especially preferred. The combination of Mono-methylolated phenols with NBR polymers yields phenol functionalized-NBR products which are stable. After hydrogenation of the phenol-modified NBR according to known procedures in the art (e.g. cat. hydrogenation), a stable phenol-modified HNBR copolymer is obtained. The phenol-functionalized HNBR copolymer can be crosslinked with a variety of well-known crosslinkers for phenolic resins including those selected from the class of chemical compounds dicarboximides, isocyanate, and formaldehyde source (paraformaldehyde, gamma-POM, hexamethylene amine, phenolic resoles or etherified phenols).

A phenol functional HNBR can be prepared via a phenol monomer with methylolated phenol functionalized NBR/HBNR by known procedures in the art. The phenol functionalized NBR/HNBR can be prepared by either the mono-methylolated phenol or by metathesis involving unsaturated monomer with the unsaturated NBR. The methylolated phenol functionalized NBR/HBNR prepared by metathesis utilizes a methylolated phenolic monomer with NBR. These materials are useful not only as coatings in accordance with the present invention, but also as components of elastomer-to-metal adhesives, autodepositing materials, RFL dips, and reactive tougheners (e.g. epoxy adhesives) taking advantage of their unique curing, film-forming, metal adhesion and compatibility properties. Methylolated phenol functionalized NBR/HNBR are capable of self-curing (i.e. without an external curing agent). Methylolated phenol functionalized NBR/HNBR derivatives are capable of curing with other coating components, such as phenolic novolaks, active hydrogen reactive or active hydrogen containing crosslinkers and rubber/elastomer toughening agents. Methylolated phenol functional HNBR can be used with known vulcanizing agents for rubber. The vulcanization reaction is based on the formation of either a quinone methide or a benzylic carbenium that is generated by the thermal or catalytic activation of the methylolated phenols. The quinone methide intermediate reacts by abstraction of allylic hydrogen. Alternatively, methylolated phenols under acidic catalyzed conditions can generate reactive benzyl carbenium ions which will react with unsaturated polymers in the substrate.

Isocyanate functionalized HNBR can be crosslinked or cured by moisture and on contact with carboxy, amine or polyol functional silanes. Incorporation of the isocyanate as part of the HNBR is particularly desirable because it reduces that amount of free monomeric isocyanate groups and therefore volatile isocyanate and its reported health and safety issues. Maleimide functionalized HNBR can be crosslinked either by the Michael addition reactions or with suitable curing nucleophilic groups on the silane curing agent. Ethylenic unsaturated acrylate-functionalized HNBR is capable of both free radical, UV and e-beam curing. Anhydride functional HNBR can be cured using amines and components described in the art such as epoxy functional silanes. Silyl ethers and chlorides are moisture curing.

To provide the ethylenically unsaturated nitrile-conjugated diene rubber with high saturation, the nitrile rubber is hydrogenated by conventional means. Generally any of the numerous known processes for hydrogenation can be utilized, including but not limited to, solution hydrogenation and oxidation/reduction hydrogenation. The hydrogenation serves to saturate at least 80% of the unsaturated bonds of the rubber. When the degree of saturation is less than 80%, the rubber's heat resistance is low, The more preferred degree of saturation of the rubber is 95-99.99%.

The preferred conjugated diene monomers useful for preparing the carboxylated acrylonitrile-butadiene copolymers which are further hydrogenated can be any of the well-known conjugated dienes including dienes having from about 4 to about 10 carbon atoms, such as, but not limited to, 1,3-butadiene; 2-methyl-1,3-butadiene, 2,3-dimethyl-1,3-butadiene; 1,3-pentadiene; 1,3-hexadiene; 2,4-hexadiene; 1,3-heptadiene; piperylene; and isoprene, with 1,3-butadiene presently being preferred.

The unsaturated nitrile monomers copolymerized to form a carboxylated acrylonitrile-diene copolymer typically correspond to the following formula:

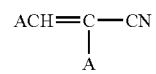

wherein each A is hydrogen or a hydrocarbyl group having from 1 to about 10 carbon atoms. Examples of A groups include alkyl and cycloalkyl, such as methyl, ethyl, isopropyl, t-butyl, octyl, decyl, cyclopentyl, cyclohexyl, etc., and aryls such as phenyl, tolyl, xylyl, ethylphenyl, t-butylphenyl, etc. Acrylonitrile and methacrylonitrile are the presently preferred unsaturated nitriles.

The HNBR of the present invention also includes functional group containing monomers which are polymerized into the backbone of the HNBR, or functional group containing compounds which have been grafted to the HNBR, or a combination thereof.

Carboxyl group containing monomers are optionally utilized in the rubbers of the present invention. Carboxyl groups are derived from α,β-unsaturated monocarboxylic acid monomers with 3 to about 5 C-atoms such as acrylic acid, methacrylic acid and crotonic acid and/or other known carboxyl group-containing monomers such as, but not limited to α,β-unsaturated dicarboxylic acids with 4 to about 5 or about 6 C-atoms, e.g., maleic acid, fumaric acid, citraconic acid and itaconic acid. The bound unsaturated carboxylic acid may be present in an amount of from about 1 to about 10 weight percent of the copolymer, with this amount displacing a corresponding amount of the conjugated diolefin. Preferably, the monomer is an unsaturated mono- or di-carboxylic acid derivative (e.g., esters, amides and the like). Functions of the carboxyl group containing monomers include serving as a crosslinking site and enhancing adhesion.

Additional, functionalized comonomers can be polymerized into the backbone of the HNBR copolymer. Examples of the functional ethylenically unsaturated monomers which are copolymerizable with the nitrile monomers and the conjugated diene monomers are: hydrazidyl-group containing ethylenic unsaturated monomers, amino-group-bearing ethylenic unsaturated monomers, thiol-group bearing unsaturated ethylenic unsaturated monomers, unsaturated carboxylic acids such as acrylic acid, methacrylic acid, itaconic acid and maleic acid and salts thereof, alkyl esters of unsaturated carboxylic acids such as various acrylates, for example methyl acrylate and butyl acrylate; alkoxyalkyl esters of unsaturated carboxylic acids such as methoxy acrylate, ethoxyethyl acrylate, methoxyethyl acrylate, acrylamide, and methacrylamide, chlorodimethylvinylsilane, trimethylsilylacetylene, 5-trimethylsilyl-1,3-cyclopentadiene, 3-trimethylsilylallyl alcohol, trimethylsilyl methacrylate, 1-trimethylsilyloxy-1, 3-butadiene, 1-trimethylsilyloxycyclopentene, 2-trimethylsilyloxyethyl methacrylate, 2-trimethylsilyloxyfuran, 2-trimethylsilyloxypropene, allyloxy-t-butyldimethylsilane and allyloxytrimethylsilane.

Also suitable as functional comonomers are various classes of monomers such as N,N-disubstituted-aminoalkyl acrylates; N,N-disubstituted-aminoalkyl methacrylates; N,N-disubstituted-aminoalkyl acrylamides; N,N-disubstituted-aminoalkyl methacrylamides; hydroxyl-substituted-alkyl acrylates and hydroxyl-substituted-alkyl methacrylates, N-alkylol substituted acrylamides such as N-methylolacrylamide, N,N'-dimethylolacrylamide and N-ethoxymethylolacrylamide; N-substituted methacrylamides such as N-methylolmethacrylamide, N,N'-dimethylolmethacrylamide and N-ethoxymethylmethacrylamide especially where free radical initiated copolymerization occurs in the presence of an alkylthiol compound having 12 to 16 carbon atoms three tertiary carbon atoms.

Of these polar group-containing vinyl monomers, N,N-disubstituted-aminoalkyl acrylates, N,N-disubstituted-aminoalkyl methacrylates, N,N-disubstituted-aminoalkyl acrylamides and N,N-disubstituted-aminoalkyl methacrylamides are preferable.

As specific examples of N,N-disubstituted-aminoalkyl acrylates, there can be mentioned acrylic acid esters such as N,N-dimethylaminomethyl acrylate, N,N-dimethylaminoethyl acrylate, N,N-dimethylaminopropyl acrylate, N,N-dimethylaminobutyl acrylate, N,N-diethylaminoethyl acrylate, N,N-diethylaminopropyl acrylate, N,N-diethylaminobutyl acrylate, N-methyl-N-ethylaminoethyl acrylate, N,N-dipropylaminoethyl acrylate, N,N-dibutylaminoethyl acrylate, N,N-dibutylaminopropyl acrylate, N,N-dibutylaminobutyl acrylate, N,N-dihexylaminoethyl acrylate, N,N-dioctylaminoethyl acrylate and acryloyl morpholine. Of these, N,N-dimethylaminoethyl acrylate, N,N-diethylaminoethyl acrylate, N,N-dipropylaminoethyl acrylate, N,N-dioctylaminoethyl acrylate and N-methyl-N-ethylaminoethyl acrylate are preferable.

As specific examples of N,N-disubstituted-aminoalkyl methacrylates, there can be mentioned methacrylic acid esters such as N,N-dimethylaminomethyl methacrylate N,N-dimethylaminoethyl methacrylate, N,N-dimethylaminopropyl methacrylate, N,N-dimethylaminobutyl methacrylate, N,N-diethylaminoethyl methacrylate, N,N-diethylaminopropyl methacrylate, N,N-diethylaminobutyl methacrylate, N-methyl-N-ethylaminoethyl methacrylate, N,N-dipropylaminoethyl methacrylate, N,N-dibutylaminoethyl methacrylate, N,N-dibutylaminopropyl methacrylate, N,N-dibutylaminobutyl methacrylate, N,N-dihexylaminoethyl methacrylate and N,N-dioctylaminoethyl methacrylate. Of these, N,N-dimethylaminoethyl methacrylate, N,N-diethylaminoethyl methacrylate, N,N-dipropylaminoethyl methacrylate, N,N-dioctylaminoethyl methacrylate and N-methyl-N-ethylaminoethyl methacrylate are preferable.

As specific examples of N,N-disubstituted-aminoalkyl acrylamides, there can be mentioned acrylamide compounds such as N,N-dimethylaminomethyl acrylamide, N,N-dimethylaminoethyl acrylamide, N,N-dimethylaminopropyl acrylamide, N,N-dimethylaminobutyl acrylamide, N,N-diethylaminoethyl acrylamide, N,N-diethylaminopropyl acrylamide, N,N-diethylaminobutyl acrylamide, N-methyl-N-ethylaminoethyl acrylamide, N,N-dipropylaminoethyl acrylamide, N,N-dibutylaminoethyl acrylamide, N,N-dibutylaminopropyl acrylamide, N,N-dibutylaminobutyl acrylamide, N,N-dihexylaminoethyl acrylamide N,N-dihexylaminopropyl acrylamide and N,N-dioctylaminopropyl acrylamide. Of these, N,N-dimethylaminopropyl acrylamide, N,N-diethylaminopropyl acrylamide and N,N-dioctylaminopropyl acrylamide are preferable.

As specific examples of N,N-disubstituted-aminoalkyl methacrylamides, there can be mentioned methacrylamide compounds such as N,N-dimethylaminomethyl methacrylamide, N,N-dimethylaminoethyl methacrylamide, N,N-dimethylaminopropyl methacrylamide, N,N-dimethylaminobutyl methacrylamide, N,N-diethylaminoethyl methacrylamide, N,N-diethylaminopropyl methacrylamide, N,N-diethylaminobutyl methacrylamide, N-methyl-N-ethylaminoethyl methacrylamide, N,N-dipropylaminoethyl methacrylamide, N,N-dibutylaminoethyl methacrylamide, N,N-dibutylaminopropyl methacrylamide, N,N-dibutylaminobutyl methacrylamide, N,N-dihexylaminoethyl methacrylamide, N,N-dihexylaminopropyl methacrylamide and N,N-dioctylaminopropyl methaorylamide. Of these, N,N-dimethylaminopropyl methacrylamide, N,N-diethylaminopropyl methaorylamide and N,N-dioctylaminopropyl methacrylamide are preferable.

As specific examples of the hydroxy-substituted-alkyl acrylates and hydroxy-substituted-alkyl methacrylates, there can be mentioned hydroxymethyl acrylate, 2-hydroxyethyl acrylate, 2-hydroxypropyl acrylate, 3-hydroxypropyl acrylate, 3-chloro-2-hydroxypropyl acrylate, 3-phenoxy-2-hydroxypropyl acrylate, hydroxymethyl methacrylate, 2-hydroxyethyl methacrylate, 2-hydroxypropyl methacrylate, 3-hydroxypropyl methacrylate, 3-chloro-2-hydroxypropyl methacrylate and 3-phenoxy-2-hydroxypropyl methacrylate. Of these, hydroxymethyl acrylate, 2-hydroxyethyl acrylate, hydroxymethyl methacrylate and 2-hydroxyethyl methacrylate are preferable.

The NBR copolymers are polymerized by reaction of any of the aforementioned exemplary conjugated dienes, unsaturated nitrile, and unsaturated functional-group containing comonomers in the presence of a free radical initiator by methods well known to those skilled in the art. Suitable free radical initiators are beyond the scope of this disclosure, and are typically organic oxides, peroxides, hydroperoxides, and azo compounds, etc., such as hydrogen peroxide, benzoyl peroxide, cumene hydroperoxide, di-tert-butyl peroxide, ascaridole, acetyl peroxide, tert-butyl hydroperoxide, trimethylamine oxide, dimethylaniline oxide, isopropylperoxydicarbonate, diisobutylene ozonide, peracetic acid, nitrates, chlorates, perchlorates, azobisisobutyronitrile, etc.

Hydrogenation of nitrile rubber is known to the art and to the literature. For example, a preferred commercially available X-HNBR (carboxylated-HNBR) is made from a carboxylated nitrile-diene copolymer that is hydrogenated in two steps. It is known that the C—C double bonds of the 1,2-vinyl-configured butadiene units in NBR are hydrogenated very rapidly, followed by the 1,4-cis configured units. The 1,4-trans configured butadiene units are hydrogenated comparatively slowly. The NBR products used for hydrogenation are distinguished by a predominant proportion of the 1,4-trans configured double bonds.

In the 2-stage hydrogenation carbon-to-carbon double bonds are first reduced, followed by reduction of the carbon-to-nitrogen bond. As is known in the art, this procedure avoids the gelation of the hydrogenated polymers which may occur if the reduction is carried out in one step. In the first step, a different catalyst may be used, for example, a palladium or ruthenium catalyst. If desired, however, the nitrile groups alone may be reduced by proper choice of the catalyst, leaving unsaturated carbon-to-carbon bonds in the linear polymeric chain. It is possible also to use a combination of noble metal and nickel or cobalt, operating first at a relatively low temperature, then at a higher temperature. Other techniques for hydrogenating acrylonitrile-butadiene copolymers are disclosed in, for example, U.S. Pat. Nos. 4,581,417; 4,631,315; and 4,795,788; the disclosures of which are incorporated herein by reference.

A partly or completely hydrogenated nitrile rubber (HNBR) is also described in several specifications (for example DE-OS No. (German Published Specification) 2,539,132; DE-OS No. (German Published Specification) 3,329,974; DE-OS No. (German Published Specification) 3,046,008 and 3,046,251; and European Patent No. A-111, 412). All of these specifications describe a process for the preparation of a partly or completely hydrogenated NBR which can be vulcanized (for example with the aid of sulphur vulcanization systems or peroxide vulcanization systems).

Hydrogenation of X-HNBR latex can be carried out by known conventional techniques. A carboxylated NBR polymer latex made conventionally using anionic surfactants is combined with (1) an oxidant selected from the group consisting of oxygen, air and hydroperoxides; (2) a reducing agent selected from hydrazine and hydrates thereof; and (3) a metal ion activator; (b) and heating the mixture to a temperature from 0° C. to the reflux temperature of the reaction mixture. This technique is taught in U.S. Pat. No. 4,452,950, assigned to Goodyear Tire and Rubber Co., herein incorporated by reference.

Furthermore, a hydrogenation process carried out in organic solution is known from U.S. Pat. No. 4,207,409, also incorporated by reference, in which process an NBR polymer manufactured by anionic polymerization, is taken up in solution in the presence of a catalyst mixture comprising a soluble compound of iron, cobalt or nickel, an aluminum-organic compound and water.

The most preferred acrylonitrile-butadiene copolymers are typically hydrogenated to an extent such that the final product has an unsaturation level of from about 1 to 20 mole percent, desirably from about 1 to about 10 or 15 mole percent, and preferably from about 1 to about 5 mole percent.

A suitable carboxylated hydrogenated nitrile rubber X-HNBR is manufactured by Bayer under a trade name of "Therban®", for example Therban KA 8889. X-HNBR may have an iodine value of preferably about 50% or less, more preferably about 1 to 40%, most preferably from about 1 to 20%. Resistance against heat and demanding solvents can be increased when X-HNBR having a iodine value of 50% or less (high hydrogenation ratio) is used, and rubber elasticity at a low temperature can be maintained by the use of the X-HNBR rubber having a low hydrogenation ratio. The central value of the nitrile content of HNBR is preferably from about 15 to 60%, more preferably from about 25 to 50%, most preferably from about 30 to 40%. Resistance against solvents can be increased by the use of HNBR having a nitrile content of about 15% or more, particularly about 30% or more, and low-temperature flexibility can be retained by the use of the rubber having a nitrile content of about 60% or less, particularly about 50% or less. In addition, its Mooney viscosity as the central value of $ML_{1+4}$ (100° C.) (hereinafter referred to as "Mooney viscosity") is preferably from about 40 to 100, and for a coating, lower Mooney viscosity of 40-60 is preferred. When X-HNBR having a Mooney viscosity falling within this range is used, the coating composition exhibits high resistance against organic liquids and good flexibility and low-temperature resistance.

The HNBR of the present invention can also have crosslinker reactive functional groups graft-linked thereto by aforementioned methods; either before or after hydrogenation. As examples of the unsaturated compound having a functional group, may be mentioned vinyl compounds having a functional group, and cycloolefins having a functional group. The introduction of the functional group by the graft-modifying method can be carried out by reacting the HNBR with a functional group-containing unsaturated compound in the presence of an organic peroxide. No particular limitation is imposed on the functional group-containing unsaturated compound. However, epoxy group-containing unsaturated compounds, carboxyl group-containing unsaturated compounds, hydroxyl group-containing unsaturated compounds, silyl group-containing unsaturated compounds, unsaturated organosilicon compounds, etc. are mentioned for reasons of improvements of crosslinking density and adhesion to substrates at a low modification rate.

Examples of the epoxy group-containing unsaturated compounds or epoxy group-containing cycloolefins include glycidyl esters of unsaturated carboxylic acids such as glycidyl acrylate, glycidyl methacrylate and glycidyl p-styryl-carboxylate; mono- or polyglycidyl esters of unsaturated polycarboxylic acids such as endo-cis-bicyclo[2,2,1]hept-5-ene-2,3-dicarboxylic acid and endo-cis-bicyclo[2,2,1]hept-5-ene-2-methyl-2,3-dicarboxylic acid; unsaturated glycidyl ethers such as allyl glycidyl ether, 2-methyl-allyl glycidyl ether, glycidyl ether of o-allylphenol, glycidyl ether of m-allylphenol and glycidyl ether of p-allylphenol; and 2-(o-vinylphenyl)ethylene oxide, 2-(p-vinylphenyl)ethylene oxide, 2-(o-allylphenyl)-ethylene oxide, 2-(p-allylphenyl)ethylene oxide, 2-(o-vinylphenyl)propylene oxide, 2-(p-vinylphenyl) propylene oxide, 2-(o-allylphenyl)propylene oxide, 2-(p-allylphenyl)propylene oxide, p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinylcyclohexene monoxide and allyl-2,3-epoxycyclopentyl ether. These epoxy group-containing unsaturated compounds may be used either singly or in any combination thereof.

Carboxyl group-containing unsaturated compounds include, for example, unsaturated carboxylic acids such as acrylic acid, methacrylic acid and α-ethylacrylic acid; and unsaturated dicarboxylic acid such as maleic acid, fumaric acid, itaconic acid, endo-cis-bicyclo-[2.2.1]hept-5-ene-2,3-dicarboxylic acid and methyl-endo-cis-bicyclo[2.2.1]hept-5-ene-2,3-dicarboxylic acid. Further, as examples of the unsaturated carboxylic acid derivatives, may be mentioned anhydrides, esters, halides, amides and imides of unsaturated carboxylic acids, and specific examples thereof include acid anhydrides such as maleic anhydride, chloromaleic anhydride, butenylsuccinic anhydride, tetrahydrophthalic anhydride and citraconic anhydride; esters such as monomethyl maleate, dimethyl maleate and glycidyl maleate; and malenyl chloride and maleimide. Of these, unsaturated dicarboxylic acids and anhydrides thereof are preferred for reasons of easy introduction of the functional group by a graft reaction, and the like, with acid anhydrides such as maleic anhydride and itaconic anhydride being particularly preferred.

Examples of the hydroxyl group-containing unsaturated compounds include allyl alcohol, 2-allyl-6-methoxyphenol, 4-allyloxy-2-hydroxybenzophenone, 3-allyloxy-1,2-propanediol, 2-allyldiphenol, 3-buten-1-ol, 4-penten-1-ol and 5-hexen-1-ol.

Examples of the unsaturated organosilicon compounds include trisalkoxyvinylsilanes such as trimethoxyvinylsilane, triethoxyvinylsilane, tris(methoxyethoxy)vinylsilane. The alkoxy groups in such an unsaturated organosilicon compounds can be hydrolyzed into silanol groups.

The graft-modified HNBR according to the present invention can be obtained by graft-reacting one of the aforementioned ethylenic unsaturated compounds having a functional group with the HNBR under generation of a radical. As methods for generating the radical, may be mentioned (i) a method making use of an organic peroxide, (ii) a method making use of a photo-induced radical generator, (iii) a method by irradiation of energy rays, and (iv) a method by heating.

Method making use of an organic peroxide: As the organic peroxide, for example, organic peroxides, organic peresters, etc. may be preferably used. As specific examples of such an organic peroxide, may be mentioned benzoyl peroxide, dichlorobenzoyl peroxide, dicumyl peroxide, di-tert-butyl peroxide, 2,5-dimethyl-2,5-di(peroxide benzoate)hexyne-3, 1,4-bis(tert-butyl peroxyisopropyl)benzene, lauroyl peroxide, tert-butyl peracetate, 2,5-dimethyl-2,5-di(tert-butyl peroxy)hexyne-3,2,5-dimethyl-2,5-di(tert-butyl peroxy)hexane, tert-butyl perbenzoate, tert-butyl perphenylacetate, tert-butyl perisobutyrate, tert-butyl per-sec-octoate, tert-butyl perpivalate, cumyl perpivalate and tert-butyl perdiethylacetate. In the present invention, azo compounds may also be used as the organic peroxides. As specific examples of the azo compounds, may be mentioned azobisisobutyronitrile and dimethyl azoisobutyrate. Of these, benzoyl peroxide, and dialkyl peroxides such as dicumyl peroxide, di-tert-butyl peroxide, 2,5-dimethyl-2,5-di(tert-butyl peroxide)hexyne-3,2,5-dimethyl-2,5-di(tert-butyl peroxy)hexane and 1,4-bis(tert-butyl peroxyisopropyl)benzene are preferably used.

These organic peroxides may be used either singly or in any combination thereof. A proportion of the organic peroxide used is generally within a range of 0.001 to about 10 parts by weight, preferably about 0.01 to about 5 parts by weight, more preferably about 0.1 to about 2.5 parts by weight per 100 parts by weight of the unmodified HNBR. When the proportion of the organic peroxide used falls within this range, the rate of reaction of the functional group-containing unsaturated compound, and various properties of the resulting functional group-containing polymer, are balanced with one another at a high level. It is hence preferable to use the organic peroxide within such a range.

No particular limitation is imposed on the graft-modifying reaction, and the reaction may be carried out in accordance with any of the methods known per se in the art. The graft reaction can be conducted at a temperature of generally 0 to 400° C., preferably 600 to 350° C. The reaction time is generally within a range of 1 minute to 24 hours, preferably 30 minutes to 10 hours. After completion of the reaction, a solvent such as methanol is added in a great amount to the reaction system to deposit a polymer formed, and the polymer can be collected by filtration, washed and then dried under reduced pressure.

A proportion of the photo-induced radical generator can be used for grafting typically within a range of 0.001 to about 10 parts by weight, preferably about 0.01 to about 5 parts by weight, more preferably about 0.1 to about 2.5 parts by weight, in terms of a charged proportion upon the reaction, per 100 parts by weight of the unmodified HNBR. When the proportion of the photo-induced radical generator used falls within this range, the rate of reaction of the functional group-containing unsaturated compound, and various properties of the resulting functional group-containing polymer, are balanced with one another at a high level. It is hence preferable to use the photo-induced radical generator within such a range.

Method by irradiation of energy rays: The method by irradiation of energy rays is a publicly known method in which active energy rays such as alpha-rays, beta-rays and gamma-rays are irradiated to generate a radical. In particular, it is desired that ultraviolet light be used from the viewpoints of efficiency, practicability and profitability.

Method by heating: The radical generating method by heating is carried out by heating in a temperature range of 100 to 390° C. Both publicly known solution method, and melting and kneading method may be used. Of these, the melting and kneading method using an extruder or the like by which shear stress is applied upon heating is preferred from the viewpoint of reaction efficiency.

Direct modification of carbon-carbon unsaturated bonds in the NBR or HNBR can also be utilized to add functional groups thereto. The carbon-carbon unsaturated bonds are present in the precursor NBR and as residual unsaturation in the HNBR, therefore the modified HNBR according to the present invention can be obtained by modifying the carbon-carbon unsaturated bonds to add a functional group to the addition polymer.

No particular limitation is imposed on the method for introducing the functional group on the film forming polymer, and examples thereof also include (a) a method by oxidation of unsaturated bonds, (b) the aforementioned method by an addition reaction of a compound containing at least one functional group in its molecule to unsaturated bonds, (c) the methods mentioned herein of introducing an epoxy group, carboxyl group, hydroxyl group, or aforementioned reaction of an olefinic bond of the NBR or HNBR polymer with an unsaturated, preferably a monounsaturated, carboxylic reactant, and the end group addition to living cationic initiated polymer. Alternatively, the polymer can be halogenated using chlorine or bromine-containing compounds. The halogenated polymer can then be reacted with the monounsaturated carboxylic acid. The polymer and the monounsaturated carboxylic reactant can also be contacted at elevated temperatures to cause the aforementioned thermal "ene" reaction to take place. Alternatively, the monounsaturated carboxylic acid can be reacted with the polymer by free radical induced grafting. The functionalized film former used in the present invention can be functionalized by contact with a hydroxy aromatic compound in the presence of a catalytically effective amount of at least one acidic alkylation catalyst. The alkylated hydroxy aromatic compound can then be further reacted to form a derivative by Mannich Base condensation with an aldehyde and an amine reagent to yield a Mannich Base condensate. In yet another means to functionalize the polymer, the polymer may be contacted with carbon monoxide in the presence of an acid catalyst under Koch reaction conditions to yield the polymer substituted with carboxylic acid groups. In addition to the above methods of functionalization, the polymer of the present invention can be functionalized by methods of air oxidation, ozonolysis, hydroformylation, epoxidation and chloroamination, or the like by any other method (for example, Japanese Patent Application Laid-Open No. 172423/1994).

(ii) Fluoroelastomers

Fluorocarbon elastomers (fluoroelastomers) are derived from hydrocarbons, including vinylidene fluoride, hexafluoropropylene and are commercially available from a number of suppliers. A detailed discussion of the various types of fluoroelastomers is contained in an article by R. G. Arnold, A. L. Barney and D. C. Thompson that appeared in the July, 1973 issue of a journal entitled "Rubber Chemistry and Technology" (Volume 46, pp. 619-652). A fluoroelastomer is distinguished from a thermoplastic fluoropolymer principally by whether plastic deformation occurs upon stressing the fluoroelastomer to 100% elongation. Fluoroplastics undergo deformation on stretching and are unsuitable coating materials for elastomeric substrates according to the present invention.

The representative fluoroelastomers used herein include polymers derived from one or more fluorinated monomers. Example polymers derived from a fluorinated monomer or combinations of two or more fluorinated monomers include 1,1-dihydroperfluorobutyl acrylate; copolymers of vinylidene fluoride and chlorotrifluoroethylene; vinylidene fluoride and hexafluoropropylene; vinylidene fluoride and hydropentafluoropropylene; tetrafluoroethylene and propylene; and terpolymers of vinylidene fluoride, hexafluoropropylene, and tetrafluoroethylene; vinylidene fluoride, tetrafluoroethylene and perfluorovinyl ether; vinylidene fluoride, tetrafluoroethylene, and propylene; vinylidene fluoride and hydropentafluoropropylene and tetrafluoroethylene. Provisions of incorporating functional groups as disclosed above are applicable to fluoroelastomers. The most preferred fluoroelastomer modified according to the invention is commercially available from DuPont under the Viton® designation, such as a copolymer of vinylidenefluoride and hexafluoropropylene, or a terpolymer of vinylidenefluoride, tetrafluoroethylene, and hexafluoropropylene. Other suitable fluoroelastomers are available from Dyneon under the FLUOREL® mark, and from Ausimont under the TECHNIFLON® mark.

The graft-functionalized fluoroelastomer embodiment film former utilized herein is the reaction product of a fluoroelastomer polymer and a grafting agent which contains a graft linking group which covalently bonds to the fluoroelastomer, and at least one active hydrogen-containing group, including but not limited to hydroxyl, thiol, or carboxyl groups that undergo bond formation to one of the reactive groups of the curing component. The graft-modified fluoroelastomer is combined with the curing component in admixture, within the time of the pot life (prior to gellation) of the admixture prior to the time of coating the flexible substrate.

Preferred grafting components for fluoroelastomers contain one graft-linking group and one active hydrogen-bearing group. The preferred grafting agent contains a primary amine group and one active hydrogen-containing group. Examples include hydroxyamines, aminoisocyanate, such as $(R_2)_2NCH_2CH_2NCO$, wherein $R_2$ is, for example, hydrogen or a hydrocarbyl group, hydroxyalkylamines, aminocarboxylates, aminosilane, amino silanol, aminothiols, and the like. Other suitable grafting agents that do not contain a primary amine as the graft-linking group are mercapto hydroxy, like mercaptoalcohols and mercaptosilanols, and mercaptothiols. The preferred grafting agents will graft to the fluoroelastomer at relatively mild temperatures (<60° C.) and can be monomeric, oligomeric or polymeric, and contains at least one active hydrogen-containing group and no more than one primary amine group, but can contain optionally secondary or tertiary amine groups, or other groups not capable of graft-linking and crosslinking the fluoroelastomer. An optional secondary amine is believed to increase the rate of the graft reaction of the primary amine graft-linking groups to the fluoroelastomer. Specific examples of grafting agents include the various hydroxyalkyl amines, e.g. 3-amino-1-propanol, aminoalkyl silanols, e.g., aminoalkyl silane triol or precursor aminoalkyl-alkoxysilanes which include within each molecule at least one basic nitrogen capable of catalyzing the hydrolysis of the alkoxysilane groups to produce the reactive silane triol; amine-N-oxides, amino(hydroxy)carboxylic acids, amido(hydroxy)amines, polyoxyalkylene polyether mono(primary)amines, and amine-terminated polyols. Such amine-terminal polyols can be made by the known aminating methods for the polyaddition of alkylene oxides, such as for example ethylene oxide, propylene oxide, butylene oxide, dodecyl oxide or styrene oxide onto amino-starter compounds. Generally, the polyol, such as a polyether polyol is aminated with ammonia in the presence of a catalyst such as a nickel containing catalyst, e.g., a Ni/Cu/Cr catalyst. The known methods are taught in U.S. Pat. No. 4,960,942; U.S. Pat. No. 4,973,761; U.S. Pat. No. 5,003,107; U.S. Pat. No. 5,352,835; U.S. Pat. No. 5,422,042; and U.S. Pat. No. 5,457,147, all incorporated herein by reference. The starter compounds used are ammonia or compounds containing amine groups and will provide in the reaction product no more than one primary amino group, such as for example aliphatic polyamines such as ethylenediamine, ethylenediamine oligomers (for example diethylenetriamine, triethylenetetramine or pentaethylenehexamine), ethanolamine, 1,3-propylenediamine, N-(2-Hydroxyethyl)ethylenediamine, 1,3- or 1,4-butylenediamine, 1,2-, 1,3-, 1,4-, 1,5-, 1,6-hexamethylenediamine, and the like. Suitable polyether blocks for the polyether-monoamines include polyethylene glycol, polypropylene glycol, copolymers of polyethylene glycol and polypropylene glycol, poly(1,2-butylene glycol), and poly(tetramethylene glycol).

The preferred amino-hydroxy grafting agent compounds are compounds having a molecular weight of less than about 1000, preferably 500, more preferably less than 250. More preferable amino-hydroxy grafting agents contain from 2 to 16 carbon atoms. With grafting agents having a molecular weight above about 1000, the degree of flexibility and solvent resistance of the coating is reduced. Examples of more preferred grafting agents include 3-amino-1-propanol, 2-(2-aminoethylamino)ethanol and aminoalkyl silanol, e.g., aminopropyl silane triol. The effective amount of grafting agent used in relation to the weight of fluoroelastomer is from 1-20%, preferably from 2-10% by weight, more preferably 3 to 7% by wt.

Other exemplary grafting agents which provide hydroxyl-functionalized fluoroelastomers, although less preferred, include grafting hydroxyl-functional ethylenic unsaturated compounds via a graft-addition reaction. Aforementioned mercaptohydroxy and mercapto carboxy compounds are suitable. Hydroxy or carboxy group-containing ethylenic unsaturated monomers are suitable and include, but are not limited to 2-hydroxyethyl(meth)acrylate, 1-hydroxypropyl(meth)acrylate, 2-hydroxypropyl(meth)acrylate, 2-hydroxyethyl vinyl ether, N-methylol(meth)acrylamide, methacrylic acid, and maleic anhydride, and can be grafted to the fluoroelastomer in the presence of a free radical initiator by techniques known in the art of reactive processing of polymers, widely practiced in thermoplastics such as polyolefins.

In another embodiment, a fluorocarbon elastomer is graft-functionalized by an addition reaction with a hydroxy(alkyl) mercaptan, aminothiol, or mercaptocarboxylic acid optionally containing hydroxy group(s). Suitable mercaptans which yield bound hydroxyl groups for addition to fluoroelastomers include hydroxymercaptans like mercaptoethanol, hydroxyalkylmercaptans, such as 1-mercapto-3-propanol, mercaptoethanolamine, 1-mercapto-4-butanol, α-mercapto-ω-hydroxyoligoethylene oxides, e.g., α-mercapto, ω-hydroxyoctaethylene glycol, or the corresponding ethylene oxide/propylene oxide copolyethers. Mercaptoalkoxy compounds which yield hydroxy groups upon hydrolysis include γ-mercaptopropyltrimethoxysilane, γ-mercaptopropyltriethoxysilane, γ-mercaptopropylmethyldimethoxysilane, and γ-mercaptopropylmethyldiethoxysilane, to name a few. Suitable mercaptocarboxylic acids and corresponding esters are the aforementioned mercaptoacetic acid, and esters of mercaptoacetic acid, mercaptopropionic acid and esters, mercaptobutyric acid and esters. Esterifying compounds containing hydroxy groups include ethylene glycol, propylene glycol, butylene glycol, diethylene glycol, triethylene glycol, tetraethylene glycol, octaethylene glycol, dipropylene glycol, tripropylene glycol, tetrapropylene glycol and N-methyldiethanolamine.

Mercapto-compounds, especially mercapto-acids and mercapto-alcohols can be graft-linked in effective amounts for subsequent reaction with the curing agent to any hydrocarbon elastomer suitable herein. Especially useful in the preparation of functionalized fluoroelastomers, diene elastomers, α-olefin copolymers, mercapto compounds can be incorporated under mild temperatures or at ambient temperatures. The addition of the mercapto-compounds to graft to the fluoroelastomer can be carried out optionally with a free radical initiator in solution at a temperature above the decomposition temperature of the initiator, using for instance, an azo initiator such as azobisisobutyronitrile and azobiscyclohexanenitrile, a peroxide such as dilauroyl peroxide, benzpinacol silyl ether, or photoinitiators in the presence of UV or visible light. Diacyl peroxides, especially dilauroyl peroxide, didecanoyl peroxide, di(3,3,5-trimethylhexanoyl)peroxide, disuccinoyl peroxide and dibenzoyl peroxide, are suitable. An effective amount of free radical initiator is 0.5 to 10 wt. %, based on wt. of mercapto-compound. A preferred mercapto compound is mercapto alcohol, such as mercaptoethanol. An effective amount of starting mercapto-compound is from 3% to 10% on wt. of fluoroelastomer, and is sufficient to bond at a level of 1% to 5% by wt. of bound hydroxyl groups to the fluoroelastomer.

The more preferred fluoroelastomer grafting agents are those that will graft to the fluoroelastomer at room temperature, obtainable by the use of such compounds as 2-(2-aminoethylamino)ethanol ($NH_2$—$CH_2$—$CH_2$—$NH$—$CH_2$—$CH_2$—$OH$) (CAS #111-41-1) and aminopropylsilanetriol, such as supplied in a 22-25% solution in water by Gelest, Inc. as SIA0608.0 (CAS #29159-37-3).

Crosslinkable α-Olefin Copolymer Elastomers

Poly(olefin/acrylic ester/carboxylate) copolymer film forming elastomers are copolymers produced by polymerizing at least one α-olefin with at least one $C_1$-$C_{18}$ alkyl(meth)acrylate and, a minor amount of an unsaturated functional group-bearing comonomer that is accessible to form crosslinks with such materials as polyisocyanates, carbodiimides, and other agents. Functional group bearing comonomers can comprise an ethylenic unsaturated group and a group bearing an acid, hydroxy, epoxy, isocyanate, amine, oxazoline, diene or other reactive groups. In the absence of such functionalized monomer, crosslinking sites can be generated in an α-olefin-ester copolymer, e.g. by partial hydrolysis of pendant ester groups. Suitable α-olefins for polymerization of such olefin copolymer film-forming elastomers include ethylene, propylene, butene-1, isobutylene, pentenes, heptenes, octenes, and the like including combinations. $C_1$-$C_4$ α-olefins are preferred and ethylene is most preferred.

The functionalized comonomer provides copolymerized α-olefin polymers bearing a nucleophilic group, or an electrophilic group, e.g., active hydrogen group, halogen group, or a group which can be converted, such as by transamidation or hydrolysis, or conversely, the functionalized comonomer contains a group that is reactive with crosslinking agents bearing a corresponding coreactive group, such as an active hydrogen group. The alkyl or alkoxy(meth)acrylate acids and esters are exemplary functionalized comonomers. Concrete examples of alkyl groups are a methyl group, ethyl group, n-propyl group, isopropyl group, n-butyl group, isobutyl group, sec-butyl group, t-butyl group, pentyl group, hexyl group, octyl group, 2-ethylhexyl group and decyl group; cycloalkyl group such as cyclopentyl group and cyclohexyl group; aryl group such as phenyl group and tolyl group; and aralkyl group such as benzyl group and neophyl group.

Examples of alkoxy groups include methoxy group, ethoxy group, n-propoxy group, isopropoxy group, n-butoxy group, isobutoxy group, sec-butoxy group, t-butoxy group, pentoxy group, hexoxy group and octoxy group.

Suitable alkyl or alkoxy(meth)acrylates optionally incorporated with α-olefin include methyl acrylate, ethyl acrylate, t-butyl acrylate, n-butyl acrylate, 2-ethylhexyl acrylate, methyl methacrylate, ethyl methacrylate, n-butyl methacrylate, 2-ethyle-hexy acrylate, methoxy acrylate, ethoxyethyl acrylate, methoxyethyl acrylate, acrylamide, and methacrylamide, and the like or a mixture thereof. Specific examples of functional ethylenically unsaturated monomers which are copolymerizable with the α-olefin monomers are: unsaturated carboxylic acids such as acrylic acid, methacrylic acid, itaconic acid and maleic acid and salts thereof, alkyl esters of unsaturated carboxylic acids such as methyl acrylate and butyl acrylate.

A preferred α-olefin-acrylic ester copolymer rubber comprises unsaturated carboxylic acid monomer unit, such as acid units, e.g. derived from (meth)acrylic acid or maleic acid, or anhydride units, e.g. derived from maleic anhydride or partial ester units, e.g. derived from mono ethyl maleate. In a preferred embodiment the polymer is a terpolymer of ethylene, $C_1$-$C_4$ alkyl acrylate and an carboxylic monomer unit; more preferably such terpolymer comprises at least about 30 mole percent of ethylene, about 10 to about 69.5 mole percent mono ethyl maleate. In all cases it is preferred that the α-olefin acrylate rubber be essentially non-crystalline and have a glass transition temperature (Tg) below room temperature, i.e. below about 20° C.

Other comonomers which contain a functional acid, hydroxy, epoxy, isocyanate, amine, oxazoline, diene or other reactive functional group include the diene monomers, such as non-conjugated dienes such as alkylidenenorbornene, alkenylnorbornene, dicyclopentadiene, methylcyclopentadiene and a dimer thereof and conjugated dienes such as butadiene and isoprene. Examples of the dihydrodicyclopentadienyl group-containing (meth)acrylate include dihydrodicyclopentadienyl(meth)acrylate and dihydrodicyclopentadienyloxyethyl(meth)acrylate.

Further examples of functional comonomers include the N-alkylol and N-alkoxy amides of α,β-olefinically unsaturated carboxylic acids having from 4 to 10 carbon atoms such as N-methylol acrylamide, N-ethanol acrylamide, N-propanol acrylamide, N-methylol methacrylamide, N-ethanol methacrylamide, n-butoxy acrylamide and isobutoxy acrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide, and the like and others. The preferred monomers of the N-alkylol amide type are N-methylolacrylamide, N,N'-dimethylolacrylamide and N-ethoxymethylolacrylamide; and N-substituted methacrylamides such as N-methylolmethacrylamide, N,N'-dimethylolmethacrylamide and N-ethoxymethylmethacrylamide. Because of their ready availability and relative low cost, the preferred N-alkylol amides of α,β-monoolefinically unsaturated monocarboxylic acids are N-methylol acrylamide and N-methylol- and n-butoxy-methacrylamide.

Other examples of functional comonomers bearing groups which are either reactive with active hydrogens or themselves contain active hydrogen groups are epoxy group-containing ethylenically unsaturated compounds including allyl glycidyl ether, glycidyl methacrylate, and glycidyl acrylate. Specific examples of the active halogen-containing ethylenically unsaturated compounds include vinylbenzyl chloride, vinylbenzyl bromide, 2-chloroethyl vinyl ether, vinyl chloroacetate, vinyl chloropropionate, allyl chloroacetate, allyl chloropropionate, 2-chloroethyl acrylate, 2-chloroethyl methacrylate, chloromethyl vinyl ketone and 2-chloroacetoxymethyl-5-norbornene. Specific examples of common carboxyl group-containing ethylenically unsaturated compounds include acrylic acid, methacrylic acid, crotonic acid, 2-pentenpic acid, maleic acid, fumaric acid and itaconic acid.

Examples of the other ethylenically unsaturated (meth) acrylic esters comonomers include octyl methacrylate; cyano-substituted alkyl(meth)acrylates such as 2-cyanoethyl acrylate, 3-cyanopropyl acrylate, and 4-cyanobutyl acrylate; amino-substituted alkyl(meth)acrylates such as diethylaminoethyl acrylate; fluorine-containing acrylates such as 1,1,1-trifluoroethyl acrylate; hydroxyl group-substituted alkyl (meth)acrylates such as hydroxyethyl acrylate; alkyl vinyl ketones such as methyl vinyl ketone; vinyl or allyl ethers such as vinyl ethyl ether and ally methyl ether; vinyl aromatic compounds such as styrene, α-methylstyrene, chlorostyrene ad vinyltoluene; vinylamides such as acrylamide, methacrylamide and N-methylolacrylamide; and ethylene, propylene, vinyl chloride, vinylidene chloride, vinyl fluoride, vinylidene fluoride, vinyl acetate, alkyl fumarate, etc.

When the acrylic acids and acrylates are part of the elastomer film forming copolymer backbone, transamidation reactions may be made in melt processing techniques which are known to produce pendant hydroxyl functionality such as by employing an aminoalcohol, e.g., 2-amino-1-ethanol. A further reaction by the pendant hydroxyls may occur, i.e., transesterification with another acrylate linkage, resulting in crosslinking and an increase in product viscosity is preferably avoided.

Acrylic Elastomers

Functionalized acrylate elastomers are suitable if the glass transition temperature is below −10° C., and are defined as addition polymers derived from a major amount (greater than 50 wt. % on total polymer weight) of one or more copolymerizable α,β-ethylenic unsaturated ester monomers having the general structure

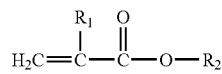

where $R_1$ is hydrogen or methyl; $R_2$ represents $C_1$-$C_{20}$ alkyl, $C_2$-$C_7$ alkyl, $C_2$-$C_7$ alkoxyalkyl, $C_2$-$C_7$ alkylthioalkyl, $C_2$-$C_7$ cyanoalkyl, and a minor amount of active hydrogen-group bearing comonomer or active bearing group graft-linked functional site. The acrylates are available in solid bale, and as emulsions or latexes from a variety of commercial sources. Minor amounts of up to about 35% on total acrylate rubber weight, of hardening or $T_g$ increasing comonomers, e.g. methyl methacrylate, acrylonitrile, vinyl acetate, vinylidene chloride and/or styrene, to name a few, can be included. Desirably, the functional group bearing comonomer having active hydrogen or a group reactive with active hydrogen containing curing agent is an unsaturated monocarboxylic acid (e.g. acrylic or methacrylic acid) or polycarboxylic acid (e.g. itaconic, citraconic acid, etc.) or anhydrides of polycarboxylic acids.

Specific examples of suitable acrylic or methacrylic monomers alone and in combinations include methyl acrylate, ethyl acrylate, butyl acrylate, butyl methacrylate, ethylhexyl acrylate, and the like. A preferred copolymer comprises one or two different copolymerizable monomers each having structure (I) in which $R_1$ is hydrogen; and, $R_2$ is $C_4$-$C_8$ alkyl, or $C_2$-$C_8$ alkoxyalkyl, either of which may contain a primary, secondary or tertiary C atom. Examples of more preferred $C_4$-$C_8$ alkyl acrylates are n-butyl acrylate, isobutyl acrylate, n-pentyl acrylate, isoamyl acrylate, hexyl acrylate, 2-methylpentyl acrylate, n-octyl acrylate, and 2-ethylhexyl acrylate; of preferred $C_4$-$C_8$ alkoxyalkyl acrylates are methoxy acrylate, and ethoxyethyl acrylate; of a preferred alkylthioalkyl acrylate is methylthioethyl acrylate; of preferred $C_2$-$C_7$ cyanoalkyl acrylates are cyanoethyl acrylate and cyanoproyl acrylate; and mixtures of two or more of the foregoing may be used.

Preferred active hydrogen bearing comonomers for acrylic elastomers include many of the above mentioned functional comonomers bearing active hydrogens, some of which are repeated here include comonomers containing carboxylic anhydride, carbonamide, N-substituted carbonamide, aldehyde, alkyl and aryl keto, hydroxyl radicals, allylic chlorine radicals, methylol, maleimide, bis-maleimide, alkyl N-methylol, phenolic methylol, thiol radicals, amino radicals, isocyanate radicals, alkoxyalkyl radicals, oxirane radicals, and the like. The α,β-unsaturated hydroxy carboxylic acids or anhydrides of dicarboxylic acids are preferred. If the polymers are only copolymers of acrylate ester and carboxylic acid or anhydride comonomers, they desirably have from about 90 to about 98 mole percent repeat units from acrylate ester, more desirably from about 92 to about 97 or 98 mole percent of the ester and from 2 to 10% of carboxylic acid or anhydride, more preferably 3 to 8% of carboxylic acid or anhydride.

Exemplary functional comonomers incorporated randomly during addition polymerization of the copolymer include glycidyl methacrylate, acrylic and methacrylic acids, maleic anhydride, N-alkyl maleimide, acrylamide, N-alkoxyalkyl acrylamides such as N-isobutoxymethyl acrylamide, N-hydroxymethyl acrylamide and the like, methyl vinyl ketone, acrolein, vinyl isocyanate, hydroxyalkyl acrylates such as 2-hydroxyethyl acrylate, 2-hydroxyethyl methacrylate and the like. Also included are mixtures of two or more such functional monomers.

Included in acrylic elastomers are the so-called core-shell polymers. The rubbery copolymers useful in soft-shell copolymers include copolymeric compositions of at least one acrylic monomer whose homopolymer $T_g$ is below −10° C., and a second copolymerizable functional monomer. These monomers can be polymerized in the presence of minor proportions of monovinyl or vinylidene monomers set forth above such as for example styrene, acrylonitrile, methyl methacrylate and the like, in a proportion with the low $T_g$ acrylic comonomer(s) selected so as to not raise the $T_g$ of the resulting acrylic copolymer above about −10° C.

A core-shell acrylic addition copolymer can further include a second copolymerizable functional monomer, defined as a monoethylenically unsaturated monomer containing at least one reactive functional radical. The second functional monomer may be any of those defined hereinabove as useful for the preparation of the core copolymer including mixtures containing two or more such functional monomers, with the proviso that the reactive functional radical of said second functional monomer must be capable of reacting with the reactive functional radical of the first functional monomer contained in the core copolymer. In that sense, the reactive functional monomer contained within the core copolymer and the reactive functional monomer contained within the shell copolymer are complementary or interactive. The shell copolymer can contain no more than about 2 wt. % of copolymerizable di- or trivinyl monomers such as a glycol diacrylate, divinylbenzene, trialkylcyanurate or the like to provide further grafting sites, as is widely practiced in the art.

The shell copolymer is an addition polymer and may be varied over a wide composition range, however, for most purposes the copolymer will comprise from about 99.9 to about 95 wt % of at least one rubbery monomer and from about 0.1 to about 5 wt. % of second copolymerizable functional monomer. The preferred shell copolymers are copolymers of an alkyl acrylate and 2-hydroxyethyl methacrylate.

The elastomeric coatings of this invention based on sequential polymerized functionalized addition polymers may exhibit two glass transition temperatures, one of which is below 0° C., and one above 0° C. The amount of rubbery shell copolymer component as well as the proportion of hard component and rubbery component may be varied however, for most purposes the ratio of rigid copolymer component to rubbery shell copolymer component is less than 1, meaning the amount of rubbery component is in a major proportion of greater than 50%.

Dual (halo, carboxy) functionalized acrylic addition polymers are also useful as the film-former for organic solvent-borne embodiments of the invention and comprise repeating units from acrylic ester monomers or monomer mixtures and which exhibit a glass transition temperature in the elastomer less than −20° C. The functional group is provided from a combination of from about 0.1% to about 30%, preferably from 0.2% to about 15% by weight of an active halogen-containing comonomer and from about 0.1% to about 20% by weight of a carboxyl-group containing comonomer. In the preferred level of halogen-containing comonomer, the halogen content is from about 0.1% to about 5% by weight of the functionalized acrylic rubber. The halogen groups of the halogen-containing comonomer can be chlorine, bromine, or iodine. Chlorine containing comonomers are preferred from an economic, availability and safety basis. Examples of halogen containing comonomers are vinyl chloroacetate, vinyl bromoacetate, allyl chloroacetate, vinyl chloropropionate, vinyl chlorobutyrate, vinyl bromobutyrate, 2-chloroethyl acrylate, 3-chloropropyl acrylate, 4-chlorobutyl acrylate, 2-chloroethyl methacrylate, 2-bromoethyl acrylate, 2-iodoethyl acrylate, 2-chloroethyl vinyl ether, chloromethyl vinyl ketone, 4-chloro-2-butenyl acrylate, vinyl benzyl chloride, 5-chloromethyl-2-norbornene, 5-α-chloroacetoxymethyl)-2-norbornene, 5-(α,β-dichloropropionylmethyl)-2-norbornene, and the like. The preferred monomers are vinyl chloroacetate, allyl chloroacetate, 2-chloroethyl acrylate, 2-chloroethyl vinyl ether, vinyl benzyl chloride, 5-chloromethyl-2-norbornene, and 5-chloroacetoxymethyl-2-norbornene.

A preferred active hydrogen bearing comonomer for acrylic rubber is present from about 0.1% to about 20% by wt., preferably from 0.2% to about 10%, more preferably from 2% to about 6% by weight of at least one carboxyl group-containing comonomer. The carboxyl comonomer is preferably monocarboxylic, but can be polycarboxylic. Preferred carboxyl comonomers contain from 3 to about 8 carbon atoms. Examples of such preferred comonomers are acrylic acid, methacrylic acid, ethacrylic acid, β,β-dimethylacrylic acid, crotonic acid, 2-pentenoic acid, 2-hexenoic acid, maleic acid, fumaric acid, citraconic acid, mesaconic acid, itaconic acid, 3-butene-1,2,3-tricarboxylic acid, and the like. The most preferred carboxyl comonomers are the monocarboxylic acid monomers such as acrylic acid, methacrylic acid, itaconic acid, and the like.

The functional group-containing comonomers are incorporated as introduced above most conveniently during the addition polymerization of acrylate elastomers. Polymerization by way of conventional suspension, emulsion, solution, and bulk methods are suitable. These polymerizations are initiated using free radical initiators. The emulsion polymerization method is preferred. Various conventional soaps, emulsifiers, and surfactants, known to the art and to the literature can be utilized in emulsion polymerized functional acrylate rubber synthesis. The weight average molecular weight of the dual-functionalized acrylate elastomer is generally in excess of 100,000. Commercial grades are available from Zeon Chemicals under the HYTEMP® mark.

A variety of $C_2$-$C_8$ alkyl ester copolymer latexes containing active hydrogen functional groups are known and available from a variety of commercial sources. A preferred acrylic rubber in latex form is available from Noveon® under the HYSTRETCH trademark. An emulsion polymerized copolymer of n-butylacrylate, acrylonitrile, N-methylol acrylamide and itaconic acid, exhibiting a $T_g$ of less than 20° C. is a preferred film former for use in aqueous coating embodiments.

Urethane modified acrylic materials conforming to the requirements of the film former as set forth herein are also contemplated. The urethane-modified acrylate polymers are cured with the curing agent by moisture. The glass transition temperature of such urethane-modified acrylates must be 0° C. or less and are comprised of a major amount (more than 50% by wt. or mole %) of $C_2$-$C_8$ acrylic or methacrylic esters. An example of preferred urethane-modified acrylic resins usable in the present invention is an acrylic copolymer produced by copolymerizing 60 to 70 moles of methyl-, ethyl-, or butyl-acrylate, or mixture thereof with 5 to 50 moles of methacrylic acid and 30 to 80 moles of 2-hydroxymethyl methacrylate. Some or all of the hydroxyl and carboxyl groups are capped in a reaction with α,β-ethylenic unsaturated isocyanate, for example, methacryloyloxyethyl isocyanate (2-isocyanate ethyl methacrylate). This material is moisture curable, and curable by UV by incorporation of a conventional photoinitiator. In mosture curable acrylourethane embodiments, it is preferred that at least 10 mole %, preferably at least 50 mole % of the hydroxyl groups from the 2-hydroxyethyl methacrylate units have been reacted with the methacryloyloxyethyl isocyanate. The α,β-ethylenic unsaturated isocyanate is preferably based upon the reaction product of an isocyanate and hydroxyl-containing monomers, such as N-methylolacrylamide, N-methylolmethacrylamide, 2-hydroxyethyl acrylate, 2-hydroxyethyl methacrylate, 2-hydroxypropyl acrylate, 2-hydroxypropyl methacrylate, 4-hydroxybutyl acrylate, and 4-hydroxybutyl methacrylate, may be used optionally with 3-aminopropyl triethoxy silane, 3-aminopropyl trimethoxy silane, 3-aminopropyl methyl dimethoxysilane or 3-aminopropyl methyl diethoxy silane, primary secondary amines such as N-(2-aminoethyl)-3-aminopropyl trimethoxy silane, secondary amines such as N-methyl- or N-phenyl-3-aminopropyl trimethoxy silane, condensed aminoalkyl silanes such as bis(3-aminopropyl) tetramethoxy or tetraethoxy disiloxane $NH_2(CH_2)_3$—Si$(OCH_3)_2$—O—$(CH_3O)_2Si$—$(CH_2)_3NH_2$, polyglycolether-modified aminosilanes such as that sold under the Trademark "Dynasylan 121" and triamino functional propyl trimethoxy silanes such as "Dynasylan TRIAMO" available from Huls A G. Similar silanes having two or three silicon atoms can also be used.

Maleated Elastomeric Materials

Various polymer blends, alloys and dynamically vulcanized composites of maleated addition polymers based on polyethylenes, such as maleated polypropylenes, maleated styrene-ethylene-butene-styrene-block copolymers, maleated styrene-butadiene-styrene block copolymers, maleated ethylene-propylene rubbers, and blends thereof can be utilized as the functionalized film-forming elastomer in accordance with the invention. The maleated elastomers are dissolved in an appropriate organic solvent system.

Ethylene Vinyl Ester Copolymers

Film forming, solvent soluble, OH-functional ethylene copolymers are available in various grades which contain carboxyl or hydroxyl functional groups and are also suitable as the film former used herein. Conventionally, some of these polymers are used as cross-linkable hot melt adhesives, however these polymers are readily adaptable for ambient temperature cured emissive coating films herein even though the elevated temperature cohesiveness is relatively low. The ethylene vinyl ester polymers containing hydroxyl functionality can be adapted for use in the emissive coating composition and cured with unblocked isocyanates and provide sufficient properties for certain environmental temperatures not exceeding the temperature at which the cured coating will flow. An ethylene vinyl acetate copolymer containing OH groups is based on a polymer having monomeric units ethylene and of vinyl alcohol, and optionally vinyl acetate, the melt viscosity being preferably from 4 to 40 Pa·s at 180° C. Ethylene vinyl alcohol copolymers have preferably at least 5 wt % of vinyl alcohol units. One example is a terpolymer (viscosity 20 Pa·s at 180° C., MFR at 125° C. under 325 gm load of 6.4 gm/10 min) with 10% vinyl alcohol, 88.75% ethylene and 1.2 wt % vinyl acetate. The m.p. is 101.5° C. (by DSC). Another terpolymer contains 13.7 wt % vinyl alcohol, 82.3% ethylene and 4.0 wt % vinyl acetate (viscosity 5.8 Pa·s at 180° C., MFR at 125° C. under 325 gm (cf. 30.4 gm/10 min, DSC m.p. 91° C.). In a preferred interpenetrating type network, an olefinic rubber polymer as random or block copolymers, e.g., SBS, EBS, EPM and EPDM, hydrogenated polydiene copolymer, acrylic rubber, and others of the aforementioned film formers, either with or without functional groups is blended with a partially hydrolyzed ethylene vinyl acetate polymer in a proportion of from 10-90 wt. % to 90-10 wt. %, respectively, and cured with any of the suitable curing agents disclosed herein, and equivalents thereof.

Functionalized EPM and EPDM Elastomers

Functionalized EPM and EPDM elastomers are suitable film forming elastomers used as the film former in the emissive coating. These comprise two or more α-monoolefins, copolymerized with a polyene, usually a non-conjugated diene comonomer. Useful polyenes include 5-ethylidene-2-norbornene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; 5-vinyl-2-norbornene, etc.; or a combination thereof. Preferred polyenes for the EPM and EPDM functionalized elastomers are 5-vinyl-2-norbornene, 5-ethylidene-2-norbornene and 1,4-hexadiene. Functional groups can be incorporated by the aforementioned conventional routes, and by the metathesis route disclosed herein.

In one aspect of the methods disclosed in this invention a particularly useful scheme for the production of polymers containing organic acid functionality such as carboxyl functionality, aliphatic or aromatic hydroxyl functionality, and the like and inorganic acid functionality such as sulfonic acid functionality, phosphoric acid functionality and the like is provided.

One such scheme is illustrated below for EPM and EPDM rubber, for incorporating pendant carboxyl, hydroxyl or non-sterically hindered pendant olefinic functionality.

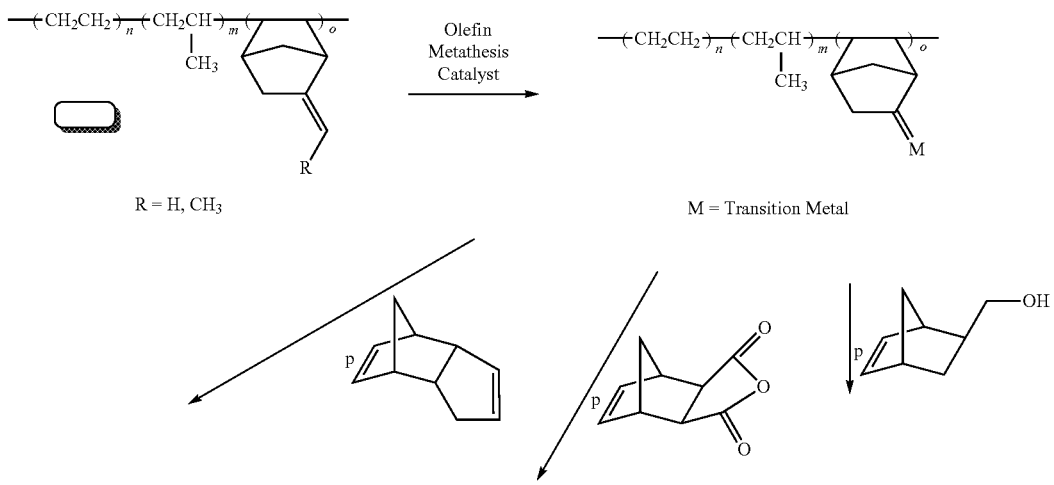

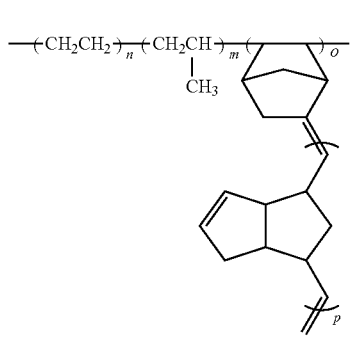 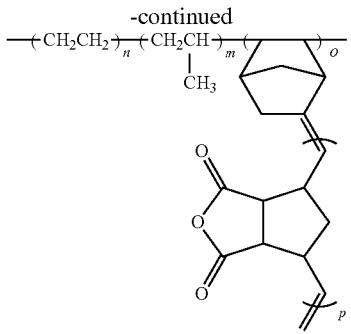 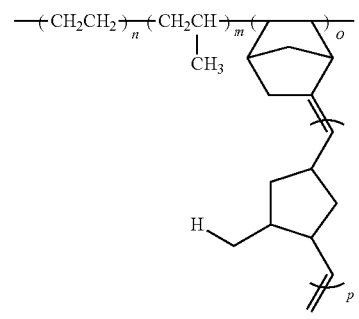

hydrolysis

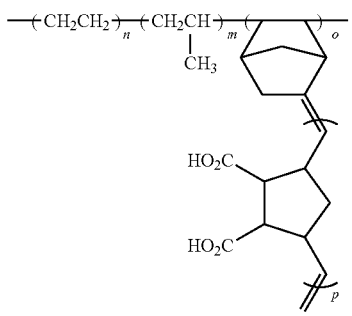

wherein n represents a conventional number of repeating ethylene units, m represents a conventional number of propylene repeating units, o represents a number of conventional diene monomer repeating units, and p represents the number of repeating units of maleated dicyclopentadiene ranging from 1 to 100. The same approach as illustrated above for modifying EPDM can be utilized for incorporating a functional group in a conjugated diene polymer, such as a butadiene-acrylonitrile copolymer containing vinyl unsaturation.

Examples of preferred functionalized film forming polymers having a $T_g$ of less than 0° C. include carboxylated hydrogenated nitrile rubber and ethylene-carboxyl copolymers (sold under the tradename of Vamac® by DuPont).

Curing Component

The curing component is a tetravalent silane compound containing at least one silicone bonded group which is coreactive with functional groups on the film forming polymer. One such group is a hydrolyzable group, or group that interacts with the functional group on the film former polymer via condensation. The silicone bonded group is an active hydrogen bearing group coreactive with the coreactive group on the film former polymer, or the silicone bonded group is coreactive with active hydrogen bearing groups on the film former polymer. Reactive groups provided in the silane bonded group include, alkoxy, hydroxy, mercapto, isocyanato, halo, amino, phenolic, glycido, and the like. These silane compounds are all known and available from a number of commercial sources. Representative hydroxyalkyl group-containing silanes have the general structure:

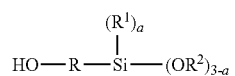

wherein R in all instances herein is a divalent aliphatic, cycloaliphatic or aromatic saturated or unsaturated radical having from 1 to 20 carbon atoms, and is preferably an alkylene radical having from 1 to 9, most preferably 2 to 4, carbon atoms; $R^1$ is a monovalent aliphatic, cycloaliphatic or aromatic radical having from 1 to 20 carbon atoms, and is preferably selected from the group consisting

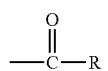

of alkyl radicals having from 1 to 4 carbon atoms, cycloalkyl radicals having from 4 to 7 ring carbon atoms, and aryl radicals having 6, 10, or 14 nuclear carbon atoms, and including such aryl radicals containing one or more substituent alkyl groups having from 1 to 4 carbon atoms; $R^2$ is a monovalent aliphatic, cycloaliphatic or aromatic organic radical containing from 1 to 8 carbon atoms, and is preferably selected from the group consisting of alkyl radicals having from 1 to 4 carbon atoms, R³—O—R⁴, and where R³ is an alkylene group having from 1 to 4 carbon atoms (methyl, ethyl, propyl, butyl) and R⁴ is an alkyl group having from 1 to 4 carbon atoms; and a is zero or 1, preferably zero;

Aminofunctional Silanes Include Those Having the Structure (B)

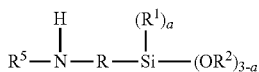

(B)

wherein R, R¹, R² and a are as previously defined for (A); and R⁵ is selected from the group consisting of hydrogen, monovalent aliphatic radicals having from 1 to 8 carbon atoms, monovalent cycloaliphatic radicals having from 4 to 7 ring carbon atoms, phenyl, alkaryl radicals having 6 nuclear carbon atoms and containing one or more substituent alkyl groups having from 1 to 4 carbon atoms, and —R⁶—NH—R⁷, wherein R⁶ is selected from the group consisting of divalent aliphatic, cycloaliphatic and aromatic radicals having from 1 to 20 carbons, there being preferably at least two carbon atoms separating any pair of nitrogen atoms, with R⁶ being preferably an alkylene group of 2 to 9 carbon atoms; and R⁷ being the same as R⁵ and preferably is hydrogen.

Mercaptofunctional Silanes Include Those Having the Structure (C)

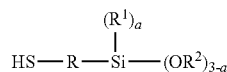

wherein R, R¹, R² and a are as previously defined for (A);

Other organosilane compounds have a single organic chain having from 1 to 20 carbon atoms, at least one extractable hydrogen atom which is preferably attached to a functional group separated from the silicon atom by a chain of at least 3 interconnected carbon atoms.

Representative organosilanes containing active hydrogen groups are hydroxypropyltrimethoxysilane, hydroxypropyltriethoxysilane, hydroxybutyltrimethoxysilane, γ-aminopropyltrimethoxysilane γ-aminopropyltriethoxysilane, methylaminopropyltrimethoxysilane, γ-aminopropyltripropoxysilane, γ-aminoisobutyltriethoxysilane, γ-aminopropylmethyldiethoxysilane, γ-aminopropylethyldiethoxysilane, γ-aminopropylphenyldiethoxysilane, δ-aminobutyltriethoxysilane, γ-aminobutylmethyldiethoxysilane, δ-aminobutylethyldiethoxysilane, γ-aminoisobutylmethyldiethoxysilane, N-methyl-g-aminopropyltriethoxysilane, N-phenyl-γ-aminoisobutylmethyldiethoxysilane, N-ethyl-δ-aminobutyltriethoxysilane, N-γ-aminopropyl-γ-aminopropyltriethoxysilane, N-β-aminoethyl-γ-aminoisobutyltriethoxysilane, N-γ-aminopropyl-δ-aminobutyltriethoxysilane, N-aminohexyl-γ-aminoisobutylmethyldiethoxysilane, methylaminopropyltriethoxysilane, γ-aminopropylmethoxydiethoxysilane, and the like.

Also suitable as the curing agent, or in combination with other functional group-containing curing agents are hydroxy silanes having an (Si—OH bond), such as silanediols or silanetriols, independent of any degree of neutralization. The silanols preferably contain at least one nucleophile connected to silicon through a first connecting group. As used herein, the term "neutralized" means that at least some of the silanol groups are in the form of mono-, di-, or tribasic alkali metal salts. The extent of neutralization is that amount sufficient to inhibit no more than 50% of the condensation of condensable groups of the silanol. The curing agent can be a partially neutralized silanol represented as follows:

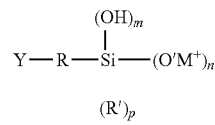

where n is 1, 2, or 3; m is 0, 1, or 2; p is 0 or 1, preferably 0, with the proviso that m+n+p=3; R is the first connecting group; M⁺ is an alkali salt forming metal; Y contains a nucleophilic group; and R' is a linear, branched, or cyclic $C_1$-$C_8$-alkyl group, preferably methyl or ethyl, more preferably methyl.

Connecting group R is preferably a linear, branched, or cyclic alkylene group, or arylene group, or a combination thereof, and may contain one or more heteroatoms, which may themselves be nucleophilic. More preferably, X is a $C_2$-$C_6$-alkylene group or —R'—NH—R'—, where each R' is independently a $C_2$-$C_4$-alkylene group.

Examples of suitable nucleophile groups include amines, phenols, mercaptans, and carboxylates, with primary and secondary amines and mercaptans being preferred, primary and secondary amines being more preferred, and primary amine being most preferred. A specific example of partially neutralized aminosilanetriols are typically potassium or sodium salts of 3-aminopropyl-silane triol and N-(2-aminoethyl)-3-aminopropyl-silanetriol.

The preferred curing component will have at least one silicone bonded group that contains a substituted or unsubstituted alkylamino group and hydrolyzable groups bonded to silicone capable of condensation with silane. The amine group may be in the free unblocked form or as a blocked amino group. Blocking of the amine group can be provided by reaction with methyl isobutyl ketone or methyl amyl ketone. The preferred groups reactive with the silane compound are preferably a $C_1$-$C_4$ alkoxy groups. Examples of curing components include but are not limited within the class of aminosilanes are aminopropyltriethoxy or -methoxy silane and aminoethylaminopropyltriethoxy or -methoxy silane, 3-aminopropyl triethoxy silane, 3-aminopropyl trimethoxy silane, 3-aminopropyl methyl dimethoxysilane or 3-aminopropyl methyl diethoxy silane, a silane containing primary secondary amines such as N-(2-aminoethyl)-3-aminopropyl trimethoxy silane, secondary amines such as N-methyl- or N-phenyl-3-aminopropyl trimethoxy silane, condensed aminoalkyl silanes such as bis(3-aminopropyl)tetramethoxy or tetraethoxy disiloxane, $NH_2(CH_2)_3$—$Si(OCH_3)_2$—O—$(CH_3O)_2Si$—$(CH_2)_3NH_2$, polyglycolether-modified aminosilanes such as that sold under the Trademark "Dynasylan 121" and triamino functional propyl trimethoxy silanes such as "Dynasylan TRIAMO" available from Huls AG. Similar silanes having two or three silicon atoms can be used.

The term "hydrolyzable group" means any group attached to the silicon which is hydrolyzed by water at room temperature. The hydrolyzable group X includes hydrogen, halogen atoms such as F, Cl, Br or I; groups of the formula —OY when Y is any hydrocarbon or halogenated hydrocarbon group such as methyl, ethyl, isopropyl, octadecyl, allyl, hexenyl, cyclohexyl, phenyl, benzyl, beta-phenylethyl, any hydrocarbon ether radical such as 2-methoxyethyl, 2-ethoxyisopropyl, 2-butoxyisobutyl, p-methoxyphenyl or —$(CH_2CH_2O)_2CH_3$;

or any N,N-amino radical such as dimethylamino, diethylamino, ethylmethylamino, diphenylamino, or dicyclohexylamino. X can also be any amino radical such as $NH_2$, dimethylamino, diethylamino, methylphenylamino or dicyclohexylamino; any ketoxime radical of the formula —ON=$CM_2$ or —ON=CM' in which M is any monovalent hydrocarbon or halogenated hydrocarbon radical and M' is any divalent hydrocarbon radical both valences of which are attached to the carbon, such as hexylene, pentylene or octylene; ureido groups of the formula —N(M)CONM"$_2$ in which M is a hydrocarbon or halohydrocarbon radical and M" is H or any of the M radicals; carboxyl groups of the formula —OOCMM" in which M and M" are defined above or halogenated hydrocarbon radical, or carboxylic amide radicals of the formula —NMC=O(M") in which M and M" are defined above. X can also be the sulfate group or sulfate ester groups of the formula —$OSO_2$(OM) where M is defined above hydrocarbon or halogenated hydrocarbon radical; the cyano group; the isocyanate group; and the phosphate group or phosphate ester groups of the formula —OPO(OM)$_2$ in which M is defined as above.

The amount of curing component employed must be in excess of the stoichiometric amount of functional film forming polymer. The excess curing agent is an amount which provides at least 50% of free silane not curing to the functional polymer after the mixture of parts A and B is made. The equivalent weight of the curing component is below 200, while the equivalent weight of co-reactive groups on the film forming polymer is on the order of 1000 or higher. On a weight basis, 25 to 150 parts of curing component is present per 100 wt. parts of film former wherein the film former contains no more than 10 wt. % of functional groups which cure with the curing component. This is essential to provide a brush, spray or dip enabling viscosity and sufficient pot life. Optionally a lower aliphatic alcohol can be added. The preferred solvent is MIBK and/or acetone.

In those embodiments providing emissive properties, an effective amount of a metal conductive pigment is included to provide complete surface coverage in the coating for effective radiant heat emissive properties. The term "particles" is inclusive of irregular shapes, granular shapes, leafy shapes or complex assorted shapes. Heat reflective pigments are available in many forms, as fine-grain solids, or leafs, in dry powder form or dispersion or as pastes in solvent or plasticizer, e.g., mineral spirit. Flakes derived from finely divided vapor deposited films are suitable. Thermally conductive metal particles include finely divided irregular particles, or leafy particles of brass, titanium, silver, or aluminum. Included are metal-coated particles/metal coated films which are preferably introduced as leafing or non-leafing aluminum flakes. Leafing flakes such as leafing aluminum particles or flakes are available commercially with a coating, e.g., stearic acid, and when applied to a surface, the particles orient in an interleaved structure parallel to the surface of the finished emissive coating. Metallic particles of a particle size average of 5 to 25 .mu.m employed at a level of at 10 to 100 parts by weight per 100 parts by weight of film forming elastomer when cast in a thin film of 5 mils (0.01 cm.) provide effective radiant energy emmissivity and yet provide sufficient flex-fatigue resistance in the coating so as to not undergo stress-cracking. Stress cracking causes loss in emissive performance. Metal particles having an average particle size of 25 to 100 microns must be employed at a level of at least 20 parts and up to 150 weight parts per 100 parts by weight of film former to provide sufficient radiant heat emissivity without stress cracking. Aluminum flakes are typically available in an average particle size of less than about 300 microns in diameter. The maximum diameter of the metallic particles with high aspect ratio is rather indeterminate with two major dimensions (width and length) and one minor dimension (thickness) which may be multiples or orders of magnitude smaller than the two major dimensions. Reliance is on supplier specifications to characterize the average particle size. Preferably, aluminum flakes have a number average particle size of about 1 to about 100 microns, more preferably between 5 and 60 microns, and still more preferably between 10 and 45 microns. Preferred aluminum particles are flakes of a size such that 99.9% pass through 325 mesh screen, i.e., a diameter of less than about 45 microns, most preferably from 8 and 35 and especially from 10 and 20 microns in average particle size.

The leafing metal flakes can be introduced as a dry flake rather than the paste of aluminum and solvents having at least about 40 wt-% aluminum flake and more preferably about 60 to 70 wt-% aluminum flake as described in U.S. Pat. No. 5,045,114. The metal particles are employed in the aforementioned quantity in relation to the film forming polymer in order to exhibit emissive performance. The preferred amount of metal particles is in a range of from 15 to 30 parts by weight per 100 parts by weight of film former. This proportion of includes consideration of surface additives, e.g., surfactants, or adhesion promotoer, e.g., silanes. In a preferred embodiment anti-fungal metal particles are incorporated in the elastomeric coating composition. In a preferred embodiment metal particles are incorporated such that fungus growth on said elastomeric coating is inhibited, preferably with the anti-fungus metal particles in at least the outer (second) coating proximate the exterior outer surface of the aircraft motion control device. In preferred embodiments the anti-fungal metal particles are chosen from the anti-fungal metal particle group including titanium, chromium, silver, zinc, copper, cadmium, nickel, aluminum, and cobalt, and mixtures thereof. In preferred embodiments at least one fungicide is incorporated into the elastomeric coating composition. In an embodiment at least one fungicide are metal particles. In an embodiment the fungicide is a carbamate, preferable an iodine containing carbamate. In an embodiment the fungicide is an iodine containing compound. In an embodiment the fungicide is an iodo-propynyl butyl carbamate, such as 3-Iodo-2-Propynyl Butyl Carbamate available as POLYPHASE® 641 from Troy Chemical of Newark, N.J.

The adhesion of the first coating composition is essential as well as the cured physical properties of the coating. The coatings as cured are preferably capable of 100% elongation, and exhibit no distortion. That is the coatings recover completely when extended up to 100% elongation without cracking or delaminating from the flexible polymer substrate.

Coating Film Strength

Cured with no reinforcing fillers, amorphous ethylene-acrylic polymers such as Vamac® have tensile strength of typically about 400 psi. A solvent solution of unreinforced X-HNBR cured with a di-isocyanate has tensile strength of around 600 to 1000 psi. Either of these polymers cured using the specified level of monomeric silane curing component have surprising tensile strengths. At levels of silane below the specified level, the coatings cure, but lack the strength obtained at the higher levels. The following examples illustrate the effect of the proportion of curing component.

Example 1

Parts by weight Ingredient 1A 1B 1C 1D 1E MIBK 190.0 190.0 190.0 190.0 190.0 Therban® KA-8889 (X-HNBR)

10.0 10.0 10.0 10.0 10.0 Aminopropyltriethoxysilane 7.5 10.0 12.5 - - - Aminoethylaminopropyl - - - 2.5 7.5 trimethoxysilane Tensile strength (psi) 3150 3765 3205 605 1975 Elongation (%) 365 390 355 280 400

As is seen from the results above, a minimum of 25 effective parts of curing component per 100 parts of film forming polymer is required to provide coatings having adequate strength, while the elongation remains sufficient to provide the elongation properties for adequate flexing ability.

Ingredient parts by weight MIBK 145.0 145.0 145.0 145.0 145.0 Vamac® G (ethylene acrylic) 15.0 15.0 15.0 15.0 15.0 Aminopropyltriethoxysilane 5.0 7.5 10.0 12.5 15.0 Tensile strength (psi) 1800 1915 3770 2745 2865 Elongation (%) 565 560 660 580 545

Coated Substrate Examples

Elastomeric Coatings were made by dissolving Therban® KA-8889 carboxylated hydrogenated nitrile-butadiene rubber or Vamac® G ethylene acrylic elastomer in Methyl Isobutyl Ketone (MIBK, CAS No. 108-10-1) to a solids content of 10.0 to 25% by weight.

To this solution, aminopropyltriethoxysilane or aminoethylaminopropyltrimethoxysilane was added at levels between 25% and 125% by weight based on the solids weight of the elastomer in the solution. These coatings were used to coat rubber substrates based on natural rubber, Vamac®), and fluorocarbon elastomer (Viton®). Adhesion was evaluated using the cross-hatch cut tape adhesion test (per General Motors spec GM9770P, method B). Adhesion to the Viton® and Vamac® rubber substrates was excellent with no surface treatment on the substrates. Adhesion to the natural rubber was excellent after treatment with Chemlok® 7701 (chlorination substitute). These coatings also passe the coating cure test per General Motors spec GM9770P, method A Q-tip rub test with naptha) and the Crocking Test with naptha per Ford spec BN 107-01. The coating produces a semi-gloss finish that is visually appealing.

The Second Coating

The second elastomeric coating composition comprises (A) a fluoroelastomer and (B) a cure agent. In yet another embodiment, the elastomeric coating composition comprises (A) a first primer coating comprising a functionalized film-forming primer (B) a silane compound, oligomer, or polymer containing silicone bonded groups co-reactive with the functional group on the primer polymer in the presence of moisture.

The fluoroelastomers used herein for the second coating are hydrophobic. By hydrophobic is meant that at least 80% of the fluoroelastomer is derived from water insoluble monomers.

The class of solvent-soluble fluoroelastomers disclosed herein have been found to cure to elastomer substrates at ambient temperatures and provide at least 200% elongation after curing. Such elongation overcomes the limitations in flex-cracking exhibited by conventional fluoroelastomer coatings. The curing of the fluoroelastomer of the second coating composition provides flexible crosslinks, having at least 8 intervening atoms linked in a chain between different cure sites on the fluoroelastomer. Such a flexible crosslink provides long-term flexing capability, tensile and elongation properties.

Representative of fluoroelastomers containing acidic cure sites include carboxylated fluoroelastomers. These materials are believed to cure with the curing component by formation of bonds between carboxyl groups and mono-primary amino group on the aminosilane in anhydrous conditions. Salt forming reactions are believed to be supplemented by condensation reactions between two salt-bridged curing components and/or to the acidic polymer cure sites. The enhanced tensile strength and elongation properties are believed to occur by the formation of flexible crosslinkages containing at least 8 interchain atoms.

The interaction between curing component and functional groups on the carboxylated fluoroelastomer polymer include electrophile-nucleophile interactions. Acidic cure sites, e.g., carboxyl cure sites on the fluoroelastomer can be provided by copolymerization of a comonomer bearing a carboxylic acid group or by various known methods for modifying fluoroelastomers by incorporation of acidic functional groups onto the polymer after polymerization.

The term "functionalized" generally applied to film forming polymers, particularly fluoroelastomers, means (1) that an electrophile, nucleophile, especially an active hydrogen-bearing moiety is part of an ethylenic unsaturated comonomer that is copolymerized, or (2) an electrophile, nucleophile and especially an acidic hydrogen bearing compound is part of a graftlinking compound graft-linked to a base fluoroelastomer, or film former after- or post-polymerization. The discussion below particularly applies to fluoroelastomers, but is equally applicable to primer polymers useful in the invention as primers under the fluoroelastomer coatings.

The fluoroelastomer cure site can be a comonomer or grafted compound that becomes ionically and/or covalently bonded to the polymer structure, and provides a pendant group capable of reacting with a curing component at ambient temperatures. Terminal functional groups can be present, although it is critical that sufficient pendant cure sites are formed or present, such that the fluoroelastomer exhibits an acid number of from 2 to 6 mg base per gram of fluoroelastomer.

Incorporation of an acidic hydrogen-bearing functional group or a co-reactive group therewith into a non-functional fluoroelastomer is provided by converting a functional group-bearing compound into a suitable functional group precursor or by the direct incorporation of a suitable precursor radical when the fluoroelastomer is forming, is formed and in solution or is formed and in the molten state. A representative known post-polymer method includes the "Ene" reaction, whereby an allylic hydrogen transfers to an enophile followed by coupling between two unsaturated termini, or via free-radical addition across a dehydrohalogenated repeating unit in solution or in the heated molten state.

When the fluoroelastomer is in the molten state, however, means capable of imparting high mechanical shear are known, such as an extruder, or mill will be used to effect the desired reaction to incorporate the functional group or directly incorporate a suitable precursor radical. When the functional group to be converted to a suitable precursor or the precursor radical is incorporated via techniques such as metallation followed by reaction with a suitable electrophile, on the other hand, incorporation of cure site compounds will, preferably, be accomplished with the polymer in solution.

A variety of post-polymerization functionalization techniques are known which provide heretofore non-functional addition polymers with nucleophilic, or electrophilic crosslinking cure sites for use in the second coating composition. Hydroxyl groups are useful functional groups for effecting the crosslinking reactions with curing components used herein. U.S. Pat. No. 4,118,427 discloses hydroxyl-containing curable liquid hydrocarbon prepolymers by ozonizing a high molecular weight saturated hydrocarbon polymer such as polyisobutylene or ethylene-propylene rubber, followed by reducing the ozonized material; e.g., by using reducing agents such as diisobutyl aluminum hydride, to form the hydroxyl-containing polymer.

A partial listing of nucleophilic and/or acidic hydrogen functional groups that can be incorporated on the fluoroelastomer and coreactive with electrophilic group-substituted curing components or hydrolyzable curing agents are, hydroxy-, mercapto-, isocyanato-, amino-, phenolic-, and carboxyl-groups. Exemplary electrophilic groups incorporated on the fluoroelastomer and coreactive with nucleophilic group-substituted curing components are alkyl halide-, benzyl halide-, allyl halide-, ester-, ethers-, anhydride-groups, and the like. When the fluoroelastomer contains a pendant nucleophilic group, the corresponding group provided on at least one valency of the silicone atom of the silane curing component can also include an alkoxy-, hydroxy-, mercapto-, isocyanato-, amino-, phenolic-, glycido-, carboxyl-, oxirane-, benzyl halide-, allyl halide-, alkyl halide-, ester-, ethers-, and/or anhydride-group.

A graft-functionalized fluoroelastomer embodiment film former utilized herein is the reaction product of a fluoroelastomer polymer and a grafting agent which contains a graft linking group which covalently bonds to the fluoroelastomer, and at least one active hydrogen-containing group, including but not limited to hydroxyl, thiol, or carboxyl groups that undergo bond formation to one of the reactive groups of the curing component. The graft-modified fluoroelastomer part A is combined with the curing component part B by simple admixture, and used within the expected pot life, or working life, prior to gellation to coat the substrate.

The representative fluoroelastomers used herein include polymers derived from one or more fluorinated monomers. The preferred fluoroelastomers used herein are derived from such monomers as vinylidene fluoride, and hexafluoropropylene and are commercially available from a number of suppliers. Example fluoroelastomers result from combinations of two or more fluorinated monomers including 1,1-dihydroperfluorobutyl acrylate; copolymers of vinylidene fluoride and chlorotrifluoroethylene; vinylidene fluoride and hexafluoropropylene; vinylidene fluoride and hydropentafluoropropylene; tetrafluoroethylene and propylene; and terpolymers of vinylidene fluoride, hexafluoropropylene, and tetrafluoroethylene; vinylidene fluoride, tetrafluoroethylene and perfluorovinyl ether; vinylidene fluoride, tetrafluoroethylene, and propylene; vinylidene fluoride and hydropentafluoropropylene and tetrafluoroethylene. The most preferred fluoroelastomer modified according to the invention are commercially available, provided the acid number is from 2 to 6 mg base per gram of fluoroelastomer. Certain Viton® copolymers of vinylidenefluoride and hexafluoropropylene, or a terpolymer of vinylidenefluoride, tetrafluoroethylene, and hexafluoropropylene are believed to contain sufficient acid numbers so as to be suitable herein. Other suitable fluoroelastomers are available from Dyneon under the FLUOREL® mark, and from Ausimont under the TECHNIFLON® mark.

If the fluoroelastomer exhibits an acid number below about 2 mg KPH per gram of polymer, the coatings do not completely cure and do not develop sufficient tensile strength. If the ratio of equivalents of primary amine to equivalents of acid cure sites is less than about 3:1, the same incomplete curing and insufficient film toughness arises. If the acid number exceeds 6 mg base per gram of polymer, the film exhibits insufficient elongation, and flex-cracking is detrimentally affected. The mono primary aminosilane curing agent is critical. Secondary aminosilanes do not exhibit ambient temperature curing.

A copolymerizable comonomer is preferably a monocarboxylic, but can be polycarboxylic acid. Preferred carboxyl comonomers contain from 3 to about 8 carbon atoms. Examples of such preferred comonomers are acrylic acid, methacrylic acid, ethacrylic acid, $\beta,\beta$-dimethylacrylic acid, crotonic acid, 2-pentenoic acid, 2-hexenoic acid, maleic acid, fumaric acid, citraconic acid, mesaconic acid, itaconic acid, 3-butene-1,2,3-tricarboxylic acid, and the like. The most preferred carboxyl comonomers are the monocarboxylic acid monomers such as acrylic acid, methacrylic acid, itaconic acid, and the like.

Poly(olefin/acrylic ester/carboxylate) copolymers useful as primer polymers herein are thermoplastic in the uncured state and are suitably flexible for use as part of the primer coating. These are principally copolymers produced by polymerizing at least one $\alpha$-olefin with at least one $C_1$-$C_{18}$ alkyl (meth)acrylate and a minor amount of an unsaturated protic functional group-bearing comonomer that is accessible to form crosslinks with such materials as polyisocyanates, carbodiimides, and other curing agents. Functional group bearing comonomers can comprise an ethylenic unsaturated group and a group bearing an acid, hydroxy, epoxy, isocyanate, amine, oxazoline, diene or other reactive groups. In the absence of such functionalized monomer, crosslinking sites can be generated in an a-olefin-ester copolymer, e.g. by partial hydrolysis of pendant ester groups. Suitable a-olefins for polymerization of such olefin copolymer film-forming elastomers include ethylene, propylene, butene-1, isobutylene, pentenes, heptenes, octenes, and the like including combinations. $C_2$-$C_4$ $\alpha$-olefins are preferred, and ethylene is most preferred.

The alkyl or alkoxy(meth)acrylate acids and esters are exemplary functionalized comonomers for incorporation into $\alpha$-olefin primer polymers. Concrete examples of alkyl groups are a methyl group, ethyl group, n-propyl group, isopropyl group, n-butyl group, isobutyl group, sec-butyl group, t-butyl group, pentyl group, hexyl group, octyl group, 2-ethylhexyl group and decyl group; cycloalkyl group such as cyclopentyl group and cyclohexyl group; aryl group such as phenyl group and tolyl group; and aralkyl group such as benzyl group and neophyl group. Examples of alkoxy groups include methoxy group, ethoxy group, n-propoxy group, isopropoxy group, n-butoxy group, isobutoxy group, sec-butoxy group, t-butoxy group, pentoxy group, hexoxy group and octoxy group.

Suitable alkyl or alkoxy(meth)acrylates for copolymerizing with the $\alpha$-olefin include methyl acrylate, ethyl acrylate, t-butyl acrylate, n-butyl acrylate, 2-ethylhexyl acrylate, methyl methacrylate, ethyl methacrylate, n-butyl methacrylate, 2-ethyle-hexy acrylate, methoxy acrylate, ethoxyethyl acrylate, methoxyethyl acrylate, acrylamide, and methacrylamide, and the like or a mixture thereof. Specific examples of functional ethylenically unsaturated monomers which are copolymerizable with the olefin monomers are: unsaturated carboxylic acids such as acrylic acid, methacrylic acid, itaconic acid and maleic acid and salts thereof, optionally in combination with alkyl esters of unsaturated carboxylic acids such as methyl acrylate and butyl acrylate.

Other comonomers which contain a functional acid, hydroxy, epoxy, isocyanate, amine, oxazoline, diene or other reactive functional group include the diene monomers, such as non-conjugated dienes such as alkylidenenorbornene, alkenylnorbornene, dicyclopentadiene, methylcyclopentadiene and a dimer thereof and conjugated dienes such as butadiene and isoprene. Examples of the dihydrodicyclopentadienyl group-containing (meth)acrylate include dihydrodicyclopentadienyl(meth)acrylate and dihydrodicyclopentadienyloxyethyl(meth)acrylate.

A preferred olefin/acrylic ester copolymer useful as a primer polymer incorporates unsaturated carboxylic acid monomer units, such from (meth)acrylic acid or maleic acid, anhydride units, e.g. derived from maleic anhydride or partial ester units, e.g. mono ethyl maleate. In a preferred embodiment the polymer is a terpolymer of ethylene, $C_1$-$C_4$ alkyl acrylate and an carboxylic monomer unit; more preferably such terpolymer comprises at least about 30 mole percent of ethylene, about 10 to about 69.5 mole percent mono ethyl maleate. In all cases it is preferred that the α-olefin acrylate rubber be essentially non-crystalline and have a glass transition temperature (Tg) below about 20° C. Ethylene-carboxylate copolymers are available commercially under the VAMAC® mark.

The primer polymers suitable for making a primer coating can be selected from various polymer blends, alloys, dynamically vulcanized polyolefins, composites of maleated addition polymers based on polyethylenes, such as maleated polypropylenes, maleated styrene-ethylene-butene-styrene block copolymers, maleated styrene-butadiene-styrene block copolymers, maleated ethylene-propylene rubbers, and blends thereof can be utilized as the functionalized film-forming elastomer in accordance with the invention.

The most preferred functionalized film forming primer polymers, applied before the fluoroelastomer coating have a $T_g$ of less than 0° C. and are selected from carboxylated hydrogenated nitrile rubber and carboxy modified ethylene copolymers (sold under the tradename of Vamac® by DuPont).

The mono-primary aminofunctional silane curing agents used herein include those having the structure (B)

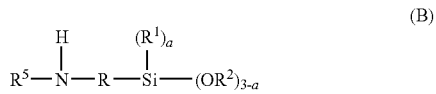

(B)

wherein R, $R^1$, $R^2$ and a are as previously defined for (A); and $R^5$ is selected from the group consisting of hydrogen, monovalent aliphatic radicals having from 1 to 8 carbon atoms, monovalent cycloaliphatic radicals having from 4 to 7 ring carbon atoms, phenyl, alkaryl radicals having 6 nuclear carbon atoms and containing one or more substituent alkyl groups having from 1 to 4 carbon atoms, and —$R^6$—NH—$R^7$, wherein $R^6$ is selected from the group consisting of divalent aliphatic, cycloaliphatic and aromatic radicals having from 1 to 20 carbons, there being preferably at least two carbon atoms separating any pair of nitrogen atoms, with $R^6$ being preferably an alkylene group of 2 to 9 carbon atoms; and $R^7$ being the same as $R^5$ and preferably is hydrogen.

Representative curing agents which are mono-primary amines include those selected from γ-aminopropyltrimethoxysilane γ-aminopropyltriethoxysilane, methylaminopropyltrimethoxysilane, γ-aminopropyltripropoxysilane, γ-aminoisobutyltriethoxysilane, γ-aminopropylmethyldiethoxysilane, γ-aminopropylethyldiethoxysilane, γ-aminopropylphenyldiethoxysilane, δ-aminobutyltriethoxysilane, δ-aminobutylmethyldiethoxysilane, δ-aminobutylethyldiethoxysilane, γ-aminoisobutylmethyldiethoxysilane, N-methyl-g-aminopropyltriethoxysilane, N-phenyl-γ-aminoisobutylmethyldiethoxysilane, N-ethyl-δ-aminobutyltriethoxysilane, N-γ-aminopropyl-γ-aminopropyltriethoxysilane, N-β-aminoethyl-γ-aminoisobutyltriethoxysilane, N-γ-aminopropyl-δ-aminobutyltriethoxysilane, N-aminohexyl-γ-aminoisobutylmethyldiethoxysilane, methylaminopropyltriethoxysilane, γ-aminopropylmethoxydiethoxysilane, or as depicted as 3-aminopropyl triethoxy silane, 3-aminopropyl trimethoxy silane, 3-aminopropyl methyl dimethoxysilane or 3-aminopropyl methyl diethoxy silane, N-(2-aminoethyl)-3-aminopropyl trimethoxy silane, condensed aminoalkyl silanes such as bis(3-aminopropyl) tetramethoxy or tetraethoxy disiloxane $NH_2(CH_2)_3$—Si$(OCH_3)_2$—O—$(CH_3O)_2$Si—$(CH_2)_3NH_2$, polyglycol ether-modified aminosilanes such as that sold under the Trademark "Dynasylan 121" and triamino functional propyl trimethoxy silanes such as "Dynasylan TRIAMO" available from Huls AG.

The curing component must contain only one primary amine and at least one hydrolyzable group, preferably up to 4 hydrolyzable groups. In forming crosslinks between the fluoroelastomer cure sites, the silane couples to the fluoroelastomer in the absence of water by what is believed to be an initial ionic bond to the acidic cure-site, and extends from the fluoroelastomer via FK—$O^-$—$NH^+$—R—Si—OR, where FK is the fluoroelastomer at the acidic cure site, and R is any divalent hydrocarbyl moiety containing any of C, O, N and S moieties. Linking of adjacent Si—OR groups is believed to proceed by moisture-induced condensation. There are myriad hydrocarbyl groups provided by the many known organosilanes representing the crosslink chain, and readily apparent from the several examples provided herein. The two co-reactive crosslinkable groups provide a total of at least 8 atoms bridging the fluoroelastomer, and preferably from 10-16 linking atoms between the crosslinked polymer cure sites. The preferred hydrocarbyl groups are $C_2$-$C_6$ substituted or unsubstituted alkylene groups. The preferred hydrolyzable groups bonded to each silicone atom couple to each other and are $C_1$-$C_4$ alkoxy groups.

The term "hydrolyzable group" means any group attached to the silicon which is hydrolyzed in the presence of moisture. The hydrolyzable silicone bonded groups include, halogen atoms such as F, Cl, Br or I; alkoxy groups of the formula —OY when Y is any hydrocarbon or halogenated hydrocarbon group such as methyl, ethyl, isopropyl, octadecyl, allyl, hexenyl, cyclohexyl, phenyl, benzyl, beta-phenylethyl, and hydrocarbyl ethers such as 2-methoxyethyl, 2-ethoxyisopropyl, 2-butoxyisobutyl, p-methoxyphenyl or —$(CH_2CH_2O)_2$$CH_3$; or any N,N-amino radical such as dimethylamino, diethylamino, ethylmethylamino, diphenylamino, or dicyclohexylamino. Not preferred are amino radicals X such as $NH_2$, dimethylamino, diethylamino, methylphenylamino or dicyclohexylamino; any ketoxime radical of the formula —ON=$CM_2$ or —ON=CM' in which M is any monovalent hydrocarbon or halogenated hydrocarbon radical and M' is any divalent hydrocarbon radical both valences of which are attached to the carbon, such as hexylene, pentylene or octylene; ureido groups of the formula —N(M)CONM''$_2$ in which M is a hydrocarbon or halohydrocarbon radical and M" is H or any of the M radicals; carboxyl groups of the formula —OOCMM" in which M and M" are defined above or halogenated hydrocarbon radical, or carboxylic amide radicals of the formula —NMC=O(M") in which M and M" are defined above. X can also be the sulfate group or sulfate ester groups of the formula —OSO$_2$(OM) where M is defined above hydrocarbon or halogenated hydrocarbon radical; the cyano group; the isocyanate group; and the phosphate group or phosphate ester groups of the formula —OPO(OM)$_2$ in which M is defined as above.

The natural color of the preferred fluoroelastomer coatings of the second coating composition are clear in the absence of added pigments such as carbon black. Color and/or opacity can be obtained with known pigment grinds according to conventional coating formulation techniques. Particulate metal powder particles are useful for reflective properties and in preferred embodiments provided as anti-fungal metal particles incorporated in the elastomeric coating composition. In a preferred embodiment anti-fungal metal particles are incorporated such that fungus growth on said elastomeric coating is inhibited, preferably with the metal particles proximate the exterior outer surface of the aircraft motion control device. In preferred embodiments the anti-fungal metal particles are chosen from the anti-fungal metal particle group including titanium, chromium, silver, zinc, copper, cadmium, nickel, and cobalt, and mixtures thereof. The term "particles" is inclusive of irregular shapes, granular shapes, leafy shapes or complex assorted shapes. Forms may include fine-grain solids or leafy-shaped flakes. These are available as dispersions or pastes in solvent, e.g., mineral spirit. Flakes derived from finely divided vapor deposited films are suitable. Metallic particles of a particle size average of 5 to 25 μm employed at a level of at 10 to 100 parts by weight per 100 parts by weight of fluoroelastomer when cast in a thin film of 5 mils (0.01 cm.) provide effective radiant energy emmissivity and yet provide sufficient flex-fatigue resistance in the coating so as to not undergo stress-cracking. Metal particles having an average particle size of 25 to 100 microns must be employed at a level of at least 20 parts and up to 150 weight parts per 100 parts by weight of fluoroelastomer to provide sufficient radiant heat emissivity without stress cracking. Preferred aluminum particles are flakes of a size such that 99.9% pass through 325 mesh screen, i.e., a diameter of less than about 45 microns, most preferably from 8 and 35 and especially from 10 and 20 microns in average particle size.

For the purposes of the present invention, the term solvent can broadly be defined as a free-flowing liquid carrier capable of dissolving or maintaining the organic components in a substantially dispersed state, and preferably in solution. Preferred solvents include water based latexes and/or non-HAP (Hazardous Air Pollutant) or non-VOC, or non-HAP, non-VOC organic solvents.

Non-HAP solvents include methyl acetate, n-butyl acetate, t-butyl acetate, acetone, ethyl acetate, isopropyl acetate, isobutyl acetate, tetrahydrofuran, n-methylpyrrolidone, aliphatic hydrocarbons such as heptane, dimethylformamide, diisobutyl ketone (DIBK), methyl isoamyl ketone, monochlorotoluene, para-chlorobenzotrifluoride (PCBTF), and vm&p naphtha. A combination of acetone and DIBK is the preferred non-HAP solvent mixture. Acetone, methyl acetate, and para-chlorobenzotrifluoride (PCBTF) alone or in any combination are the preferred solvents for HAP, and VOC compliant coatings. Among the HAP solvents which are photochemically reactive in the atmosphere are hexane, xylene, toluene, MEK, and MIBK. Toluene, xylene, MEK and MIBK are the preferred solvents when HAP and VOC compliance is not critical.

On a weight percentage basis, the nonvolatiles are generally present at from about 3 to about 30% wt. percent with the remainder being solvent, and preferably from about 5 wt % to about 15 wt. % nonvolatiles.

On a weight percentage basis, the nonvolatiles are generally present at from about 3 to about 30% wt. percent with the remainder being solvent, and preferably from about 5 wt % to about 15 wt. % nonvolatiles.

Thus, coating the elastomer 40 with the second coating composition imparts protection from degradation of the elastomer 40 when exposed to fuels, oils and the like during the service life and flex resistance. Adhesion of the coating the elastomer 40 is essential as well as obtaining cured physical properties, e.g. toughness and elongation. Preferably the coating recovers completely when extended up to 200% elongation without cracking or delaminating from the flexible elastomer 40. The fluoroelastomer coating, according to the invention, exhibit improved elongation of 200%, and preferably 300%+/−50%, and tensile strength of 600 psi or more, as tested according to ASTM-D412 on cured, unsupported coating films.

The following nonlimiting examples illustrate the comparative effects of certain technical requirements of the second coating.

Examples

To measure acid number an elastomer is dissolved in acetone or a 1:1 acetone/MIBK solution and then titrated with 0.01 N sodium hydroxide to a phenolphthalein endpoint. The examples below demonstrate that a fluorocarbon polymer with an acid number of about 1 (+/−0.02) mg base per gram of polymer does not cure using a mono-primary aminosilane or it cures poorly to give unacceptably low tensile strength and low elongation. Unacceptable tensile strength is below 600 p.s.i., and unacceptable elongation is below 200%. The Examples below illustrate that the minimum ratio of equivalents of primary mono amino silane to cure site acid equivalents is 3:1. As the equivalent ratio is increased up to 12:1, tensile strength improves without unacceptable loss of elongation. Above 12:1 equivalent ratio, strength drops and the clarity decreases.

|  | Example | | | | | | | | |
| --- | --- | --- | --- | --- | --- | --- | --- | --- | --- |
|  | 1 | 2 | 3 | 4 | 5 | 6 | 7 | 8 | 9 |
| Viton ® A-100 | 100 | 100 | 100 | — | — | — | — | — | — |
| Dai-el ® G902 | — | — | — | 100 | — | — | — | — | — |
| Dai-el ® G704BP | — | — | — | — | 100 | 100 | 100 | 100 | — |
| Technoflon ® N535 | — | — | — | — | — | — | — | — | 100 |
| APTES* | 4.0 | 8.0 | 10.0 | 10.0 | 3.0 | 6.0 | 10.0 | 15.0 | 10.0 |
| Tensile strength (psi) (DNC = did not cure) | DNC | DNC | DNC | DNC | DNC | 915 | 1495 | 1170 | 1480 |
| Elongation (%) | nm | nm | nm | nm | nm | 905 | 795 | 400 | 590 |
| Acid Value | 0.99 | 0.99 | 0.99 | 0.24 | 3.88 | 3.88 | 3.88 | 3.88 | 4.02 |
| Clarity | nm | nm | nm | nm | nm | clear | clear | cloudy | clear |

*3-aminopropyletriethoxysilane
(nm = not measurable)

Primer Coating Examples

In experiments to test coating adhesion to natural rubber, a primer consisting of a solvent, and carboxylated elastomers, e.g., carboxylated isoprene resin, carboxylated NBR and carboxylated polyethylene were formulated according to the teachings in copending application Ser. No. 10/205,178, incorporated herein by reference as if entirely contained herein. The formulations in solvent contained from 25-150 phr of a primary monoaminoalkoxysilane or blend of primary monoaminoalkoxysilanes. Coatings applied and allowed to stand overnight exhibited good adhesion to natural rubber. It was observed that neither the aminosilane nor the carboxylated resins were individually effective in bonding to natural rubber. Non-amino silanes were evaluated and found to be ineffective as was a maleic anhydride adducted polybutadiene.

The priming of rubber substrates successfully replaced the conventional pretreatments using Chemlok® 7701 or 7707.

When the above primers were applied to elastomer 40, the fluoroelastomer coatings according to the second coating composition exhibited outstanding adhesion and flex resistance. The fluoroelastomer coating improved the fuel and solvent resistance of the molded natural rubber parts.

It should be appreciated that the first and second coating compositions preferably meet the anti-fungal test method standards, MIL-STD-810, as set forth by the Department of Defense Test Method Standard for Environmental Engineering Considerations and Laboratory Tests. Further, the first coating composition and the second coating composition are preferably applied to the intermediate elastomer member 40 before the rod end 34 is assembled to prevent degrading substances from seeping between the intermediate elastomer member 40 and the rigid nonextensible outer and inner members 36, 28 which corrupts the integrity of the intermediate elastomer member 40. More specifically, the first coating composition is applied to the intermediate elastomer member 40, which is allowed to dry for at least 5 minutes, and then a second coating composition is applied and allowed to dry for at least 5 minutes. The rod end 34 is then assembled as described below.

Preferably, as shown in FIGS. 3-7, the rigid nonextensible inner member outer bonding surface 48 is comprised of a cylindrical shell surface. Preferably the rigid nonextensible inner member 38 is a cylindrical tubular inner member. Preferably the rigid nonextensible inner member 38 is a cylindrical tubular inner member having a cylindrical tubular center bore 58 with a center bore axis 68. Preferably the rigid nonextensible inner member 38 is a cylindrical tubular inner member having a cylindrical tubular center bore 58 with a center bore axis 68, and the rigid nonextensible outer member 36 has a cylindrical tubular center bore 56 with an inner surface 46, the rigid outer member center bore 56 having a center axis 66, wherein the intermediate elastomer 40 and the rigid nonextensible inner member 38 are received in the rigid outer member center bore 56 with the rigid nonextensible inner member center bore axis 68 aligned with the rigid outer member center bore center axis 66.

Figure 11:
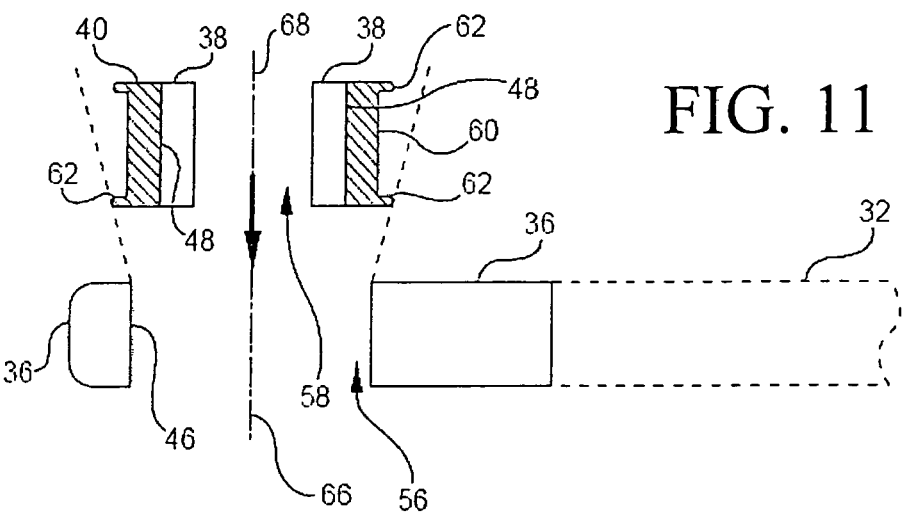
FIG. 11 shows an APU suspension system rod end.
Figure 12:
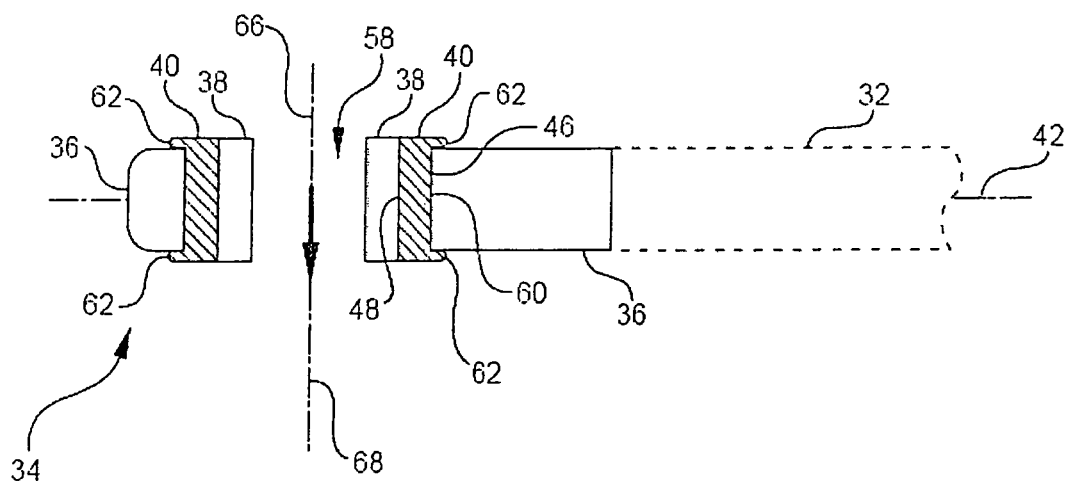
FIG. 12 shows an APU suspension system rod end.

As shown in FIGS. 11 and 12, the rigid nonextensible outer member 36 preferably has a cylindrical center bore 56 with an inner cylindrical bore surface 46, wherein the intermediate elastomer 40 has an unbonded outer surface 60 distal from the rigid inner member outer bonding surface 48, the intermediate elastomer unbonded outer surface 60 engaging the rigid outer member inner cylindrical bore surface 46. Preferably unbonded elastomer surface 60 frictionally engages the rigid outer member inner cylindrical bore surface 46, preferably with the rigid inner member 38 and bonded elastomer 40 pressfit into the bore 56, preferably with the unbonded elastomer outer surface 60 having a diameter greater than the inner cylindrical bore surface 46 of the rigid nonextensible outer member 36, preferably the unbonded elastomer surface 60 is unlubricated. Preferably lubrication of the unbonded elastomer surface interface with the inner cylindrical bore surface of the rigid outer member is inhibited to ensure frictional engagement there between. Preferably the intermediate elastomer 40 and the inner member 38 are mold bonded in an elastomer mold. Preferably the intermediate elastomer 40 is mold bonded to the rigid inner member outer bonding surface 48 in an elastomer mold, preferably with an elastomer to metal bonding adhesive ensuring the bonding of the elastomer to the metal outer bonding surfaces 48. Preferably the elastomer is bonded to the rigid nonextensible member metal outer bonding surfaces 48 with an elastomer to metal bonding agent, preferably an elastomer to metal bonding adhesive such as the Lord Chemlok elastomer to metal bonding system. Preferably the intermediate elastomer 40 is molded with outboard flanges 62, preferably elastomeric lips that have unbonded OD that is greater than the unbonded elastomer OD outer surface 60 that is engaging the rigid outer member inner cylindrical bore surface 46, with the elastomeric flanges 620D greater than the rigid outer member inner cylindrical bore surface ID.

Preferably the rod ends 34 are comprised of concentric tubes, with the outer member, the elastomer, and the inner member center bore axis aligned and coincident, preferably with the aligned center bore axis nonparallel normal to the linkage longitudinal length and line of action 42. Preferably the bore axis 66,68 are not parallel or collinear with the linkage 32. Preferably such alignment orientation is maintained by attachment of the rod end to linkage rod, with a robust attachment mechanism such as by welding, crimping, or threaded attachments. Preferably the linkage rod 32 is a tube.

Figure 13A:
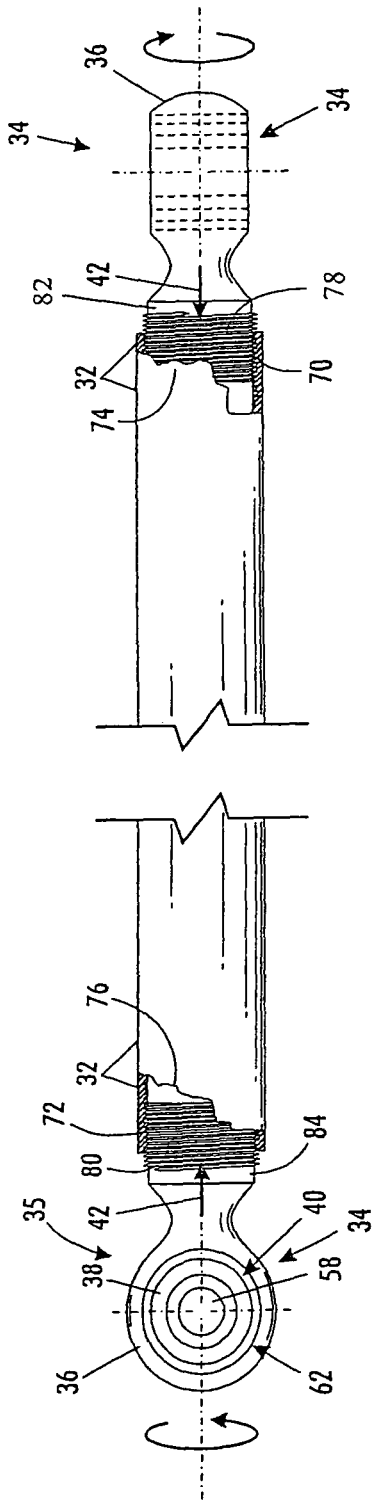
FIGS. 13A-C show an APU suspension system linkage.
Figure 13B:
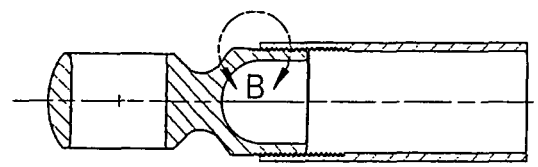
Figure 13C:
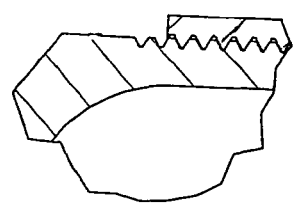

As shown in FIGS. 13A-C, a preferred embodiment of the present invention also includes a safety mechanism for reducing unwanted relative motion of the linkage rod 32 with respect to the linkage ends 34, 35. The suspension linkage rod 32 includes helical threaded portions 70, 72 at each of the terminal ends 74, 76. The first outboard low stiffness resilient rod end 34 and the distal first inboard linkage end 35 each include helical threaded portions 78, 80, respectively, for cooperation with the threaded portions 70, 72 of the linkage rod 32. In a preferred embodiment, the helical threaded portions 78, 80 of the outboard and inboard linkage ends 34, 35 respectively, have the same hand. That is, both the outboard and inboard linkage ends 34, 35 have either right-hand threads or left-hand threads. The outboard and inboard linkage ends 34, 35 also preferably have the same pitch.

The linkage ends 34, 35 also, respectively, include non-threaded stopper portions 82, 84. Preferably, the non-threaded stopper portions 82, 84 are disposed on the linkage ends 34, 35 adjacent to a neck of the rigid nonextensible outer member 36. The stopper portions 82, 84 may be formed by virtue of the diameter of the body of the linkage ends 34, 35 having a major diameter of the threads or larger.

When assembled, the linkage end 34 is threaded onto the threaded portion 70 of the linkage rod 32 such that all but a few (about two to four) thread-turns of the threaded portion 78 of the linkage end 34 are engaged with the threads on the linkage rod 32. Similarly, the linkage end 35 is threaded onto the threaded portion 72 of the linkage rod 32 such that all but a few (about two to four) thread-turns of the threaded portion 80 of the linkage end 35 are engaged with the threads on the linkage rod 32. Preferably, the threads of the linkage ends 34, 35 are fine or extra fine threads. The non-threaded stopper portion 82 acts as a stop to prevent the suspension linkage rod 32 from moving further in a direction towards the first inboard linkage end 34. More specifically, movement of the linkage rod 32 is stopped when the threaded portion 70 of the suspension linkage rod 32 contacts the non-threaded portion 82. Similarly, the non-threaded portion 84 impedes movement of the suspension linkage rod 32 in a direction towards the first inboard linkage end 35, when the threaded portion 72 of the suspension linkage rod 32 contacts the non-threaded portion 84.

Preferably, a toughened epoxy chemical thread lock compound is applied to the threads during assembly to ensure proper alignment and positioning of the linkage ends 34, 35 during installation and servicing of the auxiliary power unit. That is, the epoxy prevents the linkage ends 34, 35 from rotating on the linkage rod 32. Nonetheless, if the epoxy fails due to fire, corrosion or other reasons, or is not applied to the threads during assembly, the described threaded arrangement prevents the distance from one linkage rod end to the other linkage rod end from changing, prevents the linkage ends 34, 35 from unthreading entirely, causing a loss of load carrying capability, or even unthreading more than two to four threads. Thus, strength reduction as a result of having fewer threads engaged is very limited.

In addition to, or as an alternative means to restricting unwanted movement of the linkage rod 32 relative to the linkage ends 34, 35, the helical threaded portions 78, 80 of the outboard and inboard linkage ends 34, 35 also preferably include transitional imperfect threads. That is, the helical threaded portions 78, 80 near the stopper portions 82, 84 become shallow to impede translational movement and lock the linkage ends 34, 35 to the stopper portions 82, 84. Preferably, approximately two to four of the last threads on linkage ends 34, 35 are transitional imperfect threads which gradually become shallower than the full depth helical threaded portions 78, 80. More preferably, approximately two of the last threads on linkage ends 34, 35 are transitional imperfect threads.

Alternatives to the above described preferred embodiments also are contemplated. For example, the transitional imperfect threads can alternatively comprise a different pitch to impede the translational movement. It should also be apparent that the threaded stopper portions 82, 84 can comprise an abutting flange that prevents the suspension linkage rod 32 from moving further in a direction towards either of the linkage ends 34, 35 when the linkage ends 34, 35 contact the stopper portions 82, 84. It should be appreciated by those having ordinary skill in the art that the suspension linkage rod 32, having helical threaded portions 70, 72 with corresponding outboard and inboard linkage ends 34, 35 having the same hand, can be used in any type of aircraft suspension system device. These modifications and additional applications are intended to be within the spirit and scope of the invention as claimed.

The invention includes the method of making the aircraft auxiliary power unit suspension system 20 for isolating the aircraft auxiliary power unit 22 having the center of gravity 24 and the at least one aircraft auxiliary power unit operation frequency. Preferably the aircraft auxiliary power unit suspension system 20 is made as a focalized aircraft auxiliary power unit suspension system 20, preferably at least partially focalized with an at least partially focalized APU center of gravity. The method includes providing a first rigid longitudinal rod suspension linkage 32 terminating with a first suspension linkage first low stiffness elastomeric resilient rod end 34, the first suspension linkage first low stiffness rod end having a low spring rate. The method includes providing a second rigid longitudinal rod suspension linkage 32, the second suspension linkage terminating with a second suspension linkage first low stiffness resilient rod end 34, the second suspension linkage first low stiffness rod end 34 having a low spring rate. The first suspension linkage first low stiffness rod end low spring rate and the second suspension linkage first low stiffness rod end low spring rate provide isolation of the aircraft auxiliary power unit 22 with the aircraft auxiliary power unit having a suspended auxiliary power unit natural frequency below the aircraft auxiliary power unit operation frequency. Preferably the suspended auxiliary power unit natural frequency is above a lower frequency limit, with the lower frequency being the main engine windmilling excitation frequency. Preferably the aircraft auxiliary power unit suspension system provides a suspended auxiliary power unit natural frequency with a natural frequency band upper limit below the aircraft auxiliary power unit operation frequency and a natural frequency band lower limit above main engine windmilling excitation frequency. Preferably the natural frequency band lower limit is above about 5-20 Hz, more preferably above 9 to 20 Hz, and more preferably above 20 Hz. Preferably the first rigid longitudinal rod suspension linkage terminates with a distal first suspension linkage second low stiffness resilient rod end 34, and the second rigid longitudinal rod suspension linkage 32 terminates with a distal second suspension linkage second low stiffness resilient rod end 34. Preferably the first rigid longitudinal rod suspension linkage has a elastomeric resilient spring line of action running along the longitudinal length of the first rigid longitudinal rod suspension linkage and through the first rigid longitudinal rod suspension linkage first low stiffness rod end, the second rigid longitudinal rod suspension linkage has a elastomeric resilient spring line of action running along the longitudinal length of the second rigid longitudinal rod suspension linkage and through the second rigid longitudinal rod suspension linkage first low stiffness rod end, wherein the first rigid longitudinal rod suspension linkage resilient spring line of action intersects the second rigid longitudinal rod suspension linkage resilient spring line of action proximate the aircraft auxiliary power unit center of gravity. Preferably the system 20 is at least partially focalized, with the suspension linkages having an elastomeric spring line of action running along the longitudinal length of the linkage and through the rod end, wherein the elastomeric spring lines of action intersect at a focal elastic center axis, with the focal elastic center axis proximate the APU center of gravity (3 planes intersect proximate center of gravity for fully focalized, two thirds partially focalized with 2 planes, one third partially focalized with only one plane). Preferably the APU hangs from the structural surfaces of the aircraft on the suspension linkages, preferably the majority of the center of gravity weight is supported from above and sides by the linkages, as contrasted with being supported from the bottom below the center of gravity such as with mounts between the APU bottom and aircraft floor. Preferably the APU hung from the firewall and ceiling of the aircraft with the long longitudinal linkage struts mainly under tension, not under compression. Preferably at least two of the linkages are above the center of gravity, preferably the majority are above the center of gravity, not below the center of gravity. Preferably the rod end includes a rigid nonextensible outer member, a rigid nonextensible inner member, and an intermediate elastomer between the rigid nonextensible outer member and the rigid nonextensible inner member, the intermediate elastomer bonded to the rigid nonextensible inner member. Preferably the rigid nonextensible inner member has an outer bonding surface with the intermediate elastomer bonded to the rigid nonextensible inner member outer bonding surface. Preferably the rigid nonextensible inner member outer bonding surface is comprised of a cylindrical shell surface. Preferably the rigid nonextensible inner member comprises a cylindrical tubular inner member. Preferably the rigid nonextensible inner member comprises a cylindrical tubular inner member having a cylindrical tubular center bore with a center bore axis. Preferably the rigid nonextensible inner member comprises a cylindrical tubular inner member having a cylindrical tubular center bore with a center bore axis, and the rigid nonextensible outer member having a cylindrical tubular center bore with an inner surface, the rigid outer member center bore having a center axis, wherein the intermediate elastomer and the rigid nonextensible inner member are received in the rigid outer member center bore with the rigid nonextensible inner member center bore axis aligned with the rigid outer member center bore center axis. Preferably the rigid nonextensible outer member has a cylindrical center bore with an inner cylindrical bore surface, wherein the intermediate elastomer has an unbonded outer surface distal from the rigid inner member outer bonding surface, the intermediate elastomer unbonded outer surface engaging the rigid outer member inner cylindrical bore surface. Preferably the unbonded elastomer surface frictionally engages the rigid outer member inner cylindrical bore surface, preferably with the rigid inner member and bonded elastomer are pressfit into the bore, with the unbonded elastomer outer surface having a diameter greater than the inner cylindrical bore surface of the rigid nonextensible outer member, preferably with the unbonded elastomer surface unlubricated. Preferably lubrication of the unbonded elastomer surface interface with the inner cylindrical bore surface of the rigid outer member is inhibited to ensure frictional engagement. Preferably the intermediate elastomer is molded with outboard flanges, such elastomeric lips that have an unbonded OD that is greater than the unbonded elastomer OD outer surface that is engaging the rigid outer member inner cylindrical bore surface, with elastomeric flange OD greater than the rigid outer member inner cylindrical bore surface ID. Preferably the intermediate elastomer 40 has an intermediate elastomer thickness between the inner rigid member 38 and outer rigid member 36 that is greater than 0.05 inches (1.27 mm), preferably at least 0.06 inches (1.52 mm), and preferably at least 2 mm to give the rod end 34 the low spring rate. Preferably intermediate elastomer thickness is at least 0.1 inches (2.54 mm) to give the low spring rate, such as about 0.166 inches (4.2 mm). Preferably the rod end 34 low spring rate is less than 500,000 lbs./inch (87,000 N/mm), preferably with a static shear modulus less than 250 psi. Preferably the rod end 34 low spring rate is less than 500,000 lbs./inch, preferably <300,000 lbs./inch, preferably <250,000 lbs./inch, preferably <200,000 lbs./inch, preferably <100,000 lbs./inch, preferably <50,000 lbs./inch. Preferably the rod end 34 low spring rate is in the range from 20,000 to 100,000 lbs./inch, preferably in the range from 20,000 to 50,000 lbs./inch. Preferably the rod end low spring rate is provided by the elastomer thickness in proportion to the load area to produce a low shape factor part, with a shape factor of 0.25 to 5, with the elastomer shape factor giving the low spring rate. Preferably the no greater than 50,000 lbs/inch rod ends 34 provide the aircraft auxiliary power unit suspension system 20 with a suspended auxiliary power unit natural frequency below the about 200 Hz APU generator frequency (200±50 Hz, preferably 200±25 Hz, such as about 175 Hz) and below the about 500 Hz APU turbine frequency (500±50, preferably 500±25 Hz, such as about 520 Hz). Preferably linkages 32 include rod ends 34 on both ends of the longitudinal strut rod, preferably with the system needing a Xlbs./inch stiffness for the linkage, the two rod ends 34 with twice the stiffness 2 Xlbs./inch stiffness are utilized to provide beneficial elastomer life performance and decreased post fire deflections for the linkage, such as for a linkage system need of 20,000 lbs./inch stiffness, 40,000 lbs./inch rod ends are used on both ends (two with twice the stiffness). As shown in FIG. 2 these low spring rates are the radial spring rates for the rod end ($K_{radial}$), with the spring line of action 42 along the longitudinal length of the linkage 32, with the other spring rates of the rod end (axial, cocking, torsional) are even lower, preferably an order of magnitude lower than the radial spring rate, preferably <50,000, preferably <20,000, preferably <10,000, preferably <5,000 lbs./inch. Such as shown in FIGS. 11-14, linkages 32 with rod ends 34 preferably have low dynamic force transfer functions at the auxiliary power unit operation frequencies, preferably at both the low end generator frequency of about 176 Hz and the low end turbine frequency of about 517 Hz. For a linkage 32 with a single rod ends 34 preferably the low dynamic force transfer functions are <15%. For linkages 32 with rod ends 34 on both ends of the linkage preferably the low dynamic force transfer functions are <3%, preferably <2%. The rod end elastomer is formed from an elastomeric rubber material such as natural rubber, polyisoprene, polybutadiene, isobutylene-isoprene, ethylene-propylene, and silicone. Preferably the rod end intermediate elastomer 40 is a EPDM polymer. For linkages 32 with rod ends 34 on both ends of the linkage preferably the intermediate elastomer 40 is EPDM polymer for both inboard rod ends 35 and outboard rod ends 34. Preferably, the rod end intermediate elastomer 40 is a temperature resistant EPDM polymer, preferably comprised of EPDM polymer, semi-reinforcing carbon black, paraffinic plasticizer and a suitable anti-degradation agent for EPDM, together with a peroxide cure system. Preferably the rod ends 34 are comprised of concentric tubes, with the outer member, the elastomer, and the inner member center bore axis aligned and coincident, preferably with the aligned center bore axis nonparallel normal to the linkage longitudinal length and line of action 42. Preferably the bore axis 66,68 are not parallel or collinear with the linkage 32. Preferably such alignment orientation is maintained by attachment of the rod end to linkage rod, with a robust attachment mechanism such as by welding, crimping, or threaded attachments. Preferably the linkage rod 32 is a tube.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents.

The invention claimed is:

1. An aircraft motion control auxiliary power unit suspension system comprising:
   a first suspension linkage including a first and a second terminal end, each having a helical threaded portion having a same hand;
   a first elastomeric rod end having a helical threaded portion and a first motion control elastomer operatively interconnecting a first motion control nonelastomeric member and a second motion control nonelastomeric member, said helical threaded portion of said first elastomeric rod end having a hand corresponding to said hand of said helical threaded portion of said first terminal end of said first suspension linkage; and
   a second elastomeric rod end having a helical threaded portion and a first motion control elastomer operatively interconnecting a first motion control nonelastomeric member and a second motion control nonelastomeric member, said helical threaded portion of said second elastomeric rod end having a hand corresponding to said hand of said helical threaded portion of said second terminal end of said first suspension linkage, wherein said helical threaded portion of said first elastomeric rod end and said helical portion of said second elastomeric rod end are of said same hand and wherein the helical threaded portions of said first and second elastomeric rod ends each have at least two transitional imperfect threads.

2. The aircraft motion control auxiliary power unit suspension system of claim 1, wherein the at least two transitional imperfect threads have a gradually formed shallow depth.

3. The aircraft motion control auxiliary power unit suspension system of claim 1, wherein the at least two transitional imperfect threads have a gradually altered pitch.

4. The aircraft motion control auxiliary power unit suspension system of claim 1, wherein the first and second elastomeric rod ends each have at least three transitional imperfect threads.

5. The aircraft motion control auxiliary power unit suspension system of claim 1, wherein the first and second elastomeric rod ends each have at least four transitional imperfect threads.

6. The aircraft motion control auxiliary power unit suspension system of claim 1, wherein said first elastomeric rod end includes a non-threaded portion disposed to prevent said suspension link from moving in a first direction when said helical threaded portion of said first terminal end contacts said non-threaded portion of said first elastomeric rod end.

7. The aircraft motion control auxiliary power unit suspension system of claim 6, wherein said second elastomeric rod end includes a non-threaded portion disposed to prevent said suspension link from moving in a second direction when said helical threaded portion of said second terminal end contacts said non-threaded portion of said second elastomeric rod end.

8. The aircraft motion control auxiliary power unit suspension system of claim 1, wherein said helical threaded portions of said first and second elastomeric rod ends are right-handed.

9. The aircraft motion control auxiliary power unit suspension system of claim 1, wherein said helical threaded portions of said first and second elastomeric rod ends are left-handed.

10. The aircraft motion control auxiliary power unit suspension system of claim 1, wherein said helical threaded portions of said first and second elastomeric rod ends have a same pitch.

11. The aircraft motion control auxiliary power unit suspension system of claim 1, wherein epoxy is applied to said helical threaded portions of said first and second elastomeric rod ends during assembly.

12. The aircraft motion control auxiliary power unit suspension system of claim 1, wherein said first motion control elastomer member further includes an exterior coating surface formed from an elastomeric polymer dissolved in an organic solvent, wherein said elastomeric polymer dissolved in said solvent is applied to said first motion control elastomer member and said solvent evaporates and said elastomeric polymer crosslinks.

13. The aircraft motion control auxiliary power unit suspension system of claim 12, wherein said elastomeric polymer has glass transition temperature (Tg) that is less than zero degrees Celsius.

14. The aircraft motion control auxiliary power unit suspension system of claim 12, wherein said organic solvent is methyl acetate, n-butyl acetate, t-butyl acetate, acetone, ethyl acetate, isopropyl acetate, isobutyl acetate, tetrahydrofuran, n-methylpyrolidone, heptate, dimethylformamide, diisobutyl ketone, methyl isoamyl ketone, monochlorotoluene, naphtha, hexane, xylene, toluene, MEK, or MIBK.

15. The aircraft motion control auxiliary power unit suspension system of claim 1, wherein said elastomeric polymer comprises an ambient temperature curable coating composition in a mixture of 2-parts providing a non-volatiles content of from 4% to 25% by weight, and comprising a part (A) which comprises an organic solvent and fluoroelastomer dissolved therein, said fluoroelastomer containing crosslinkable sites in quantitative amount according to an acid number of from 2 to 6 mg base per gram, and a part (B) which comprises an organosilane comprising hydrolysable groups and a mono primary amine, wherein said ratio of amine equivalents in part B to acid equivalents in part said A ranges from 3:1 to 12:1 and wherein a cured unsupported film from said coating exhibits at least 200% elongation.

16. The aircraft motion control auxiliary power unit suspension system of claim 1, wherein the helical threaded portions of said first and second elastomeric rod ends each terminate with a stopper portion.

\* \* \* \* \*